United States Patent
Yu

(10) Patent No.: US 10,582,024 B2
(45) Date of Patent: Mar. 3, 2020

(54) INFORMATION TRANSMISSION METHOD, APPARATUS, AND SYSTEM

(71) Applicant: Huawei Technologies Co., Ltd., Shenzhen (CN)

(72) Inventor: Zheng Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 18 days.

(21) Appl. No.: 15/068,522

(22) Filed: Mar. 11, 2016

(65) Prior Publication Data

US 2016/0198024 A1  Jul. 7, 2016

Related U.S. Application Data

(63) Continuation of application No. PCT/CN2014/076522, filed on Apr. 29, 2014.

(30) Foreign Application Priority Data

Sep. 13, 2013  (WO) ................ PCT/CN2013/083502

(51) Int. Cl.
  *H04L 29/06* (2006.01)
  *H04W 76/27* (2018.01)
  (Continued)

(52) U.S. Cl.
  CPC .............. *H04L 69/22* (2013.01); *H04B 7/26* (2013.01); *H04J 11/00* (2013.01); *H04L 5/14* (2013.01); *H04W 76/27* (2018.02); *H04W 88/02* (2013.01)

(58) Field of Classification Search
  CPC ...... H04W 76/046; H04W 88/02; H04L 5/14; H04L 69/22; H04B 7/26
  (Continued)

(56) References Cited

U.S. PATENT DOCUMENTS

2010/0022250 A1  1/2010  Petrovic et al.
2010/0034135 A1  2/2010  Kim et al.
(Continued)

FOREIGN PATENT DOCUMENTS

CN  101960737 A  1/2011
CN  201893787 U  7/2011
(Continued)

OTHER PUBLICATIONS

"Discussion on CSI-RS collision with other signals," 3GPP TSG RAN WG1 Meeting #63, Jacksonville, Florida, R1-105918, 3$^{rd}$ Generation Partnership Project, Valbonne, France (Nov. 15-19, 2010).

(Continued)

*Primary Examiner* — Jae Y Lee
*Assistant Examiner* — Jean F Voltaire
(74) *Attorney, Agent, or Firm* — Leydig, Voit & Mayer, Ltd.

(57) ABSTRACT

Embodiments of the present disclosure relate to the communications field, and provide an information transmission method, apparatus, and system, which can determine a subframe used in enhanced transmission of first information, improving transmission reliability of the first information. The information transmission method includes: determining a subframe for enhanced transmission of first information, where the first information is a master information block, or the first information is a system information block (SIB) including a time division duplex (TDD) configuration, or the first information is an SIB including a multicast-broadcast single-frequency network (MBSFN) subframe configuration; and performing the enhanced transmission of the first information in the determined subframe for the enhanced transmission of the first information.

9 Claims, 14 Drawing Sheets

(51) Int. Cl.
*H04B 7/26* (2006.01)
*H04J 11/00* (2006.01)
*H04L 5/14* (2006.01)
*H04W 88/02* (2009.01)

(58) Field of Classification Search
USPC .......................................................... 370/312
See application file for complete search history.

(56) References Cited

U.S. PATENT DOCUMENTS

| | | | |
|---|---|---|---|
| 2010/0097978 A1* | 4/2010 | Palanki | H04B 7/2606 370/315 |
| 2010/0120442 A1 | 5/2010 | Zhuang et al. | |
| 2010/0273506 A1 | 10/2010 | Stern-Berkowitz et al. | |
| 2013/0094411 A1* | 4/2013 | Zhang | H04L 5/0048 370/281 |
| 2013/0114560 A1 | 5/2013 | Liu et al. | |
| 2013/0142156 A1 | 6/2013 | Mazzarese et al. | |
| 2013/0229971 A1* | 9/2013 | Siomina | H04W 24/10 370/312 |
| 2014/0010127 A1 | 1/2014 | Cheng et al. | |
| 2015/0180625 A1* | 6/2015 | Park | H04W 72/04 370/329 |
| 2015/0245323 A1* | 8/2015 | You | H04W 72/042 370/329 |

FOREIGN PATENT DOCUMENTS

| | | |
|---|---|---|
| CN | 102215182 A | 10/2011 |
| CN | 102217212 A | 10/2011 |
| CN | 102347817 A | 2/2012 |
| CN | 102651662 A | 8/2012 |
| EP | 2498436 A2 | 9/2012 |
| EP | 2999142 A1 | 3/2016 |
| JP | 2010506446 A | 2/2010 |
| JP | 2012514443 A | 6/2012 |
| WO | WO 2011103309 A2 | 8/2011 |
| WO | WO 2012121562 A3 | 9/2012 |

OTHER PUBLICATIONS

"Applicability of muting to certain messages," 3GPP TSG-RAN WG1 #63, Jacksonville, Florida, R1-106353, 3$^{rd}$ Generation Partnership Project, Valbonne, France (Nov. 15-19, 2010).
"Required system functionality TP for TR 36.888 on coverage Improvement," 3GPP TSG RAN WG1, Meeting #72, St. Julian's, Malta, R1-130198, 3$^{rd}$ Generation Partnership Project, Valbonne, France (Jan. 28-Feb. 1, 2013).
"Coverage Improvement for MTC UEs," 3GPP TSG RAN WG1 Meeting #74, Barcelona, Spain, R1-133020, 3$^{rd}$ Generation Partnership Project, Valbonne, France (Aug. 19-23, 2013).
"PBCH Coverage Enhancements for MTC UEs," 3GPP TSG RAN WG1 #74bis, Guangzhou, China, R1-134162, 3$^{rd}$ Generation Partnership Project, Valbonne, France (Oct. 7-11, 2013).
"3rd Generation Partnership Project; Technical Specification Group Radio Access Network; Evolved Universal Terrestrial Radio Access (E-UTRA); Physical Channels and Modulation (Release 11)," 3GPP TS 36.211, V11.3.0, pp. 1-108, 3rd Generation Partnership Project, Valbonne, France (Jun. 2013).
"3rd Generation Partnership Project; Technical Specification Group Radio Access Network; Evolved Universal Terrestrial Radio Access (E-UTRA); Base Station (BS) radio transmission and reception (Release 12)," 3GPP TS 36.104, V12.0.0, pp. 1-139, 3rd Generation Partnership Project, Valbonne, France (Jul. 2013).
"3rd Generation Partnership Project; Technical Specification Group Radio Access Network; Evolved Universal Terrestrial Radio Access (E-UTRA); Physical layer procedures (Release 11)," 3GPP TS 36.213, V11.3.0, pp. 1-176, 3rd Generation Partnership Project, Valbonne, France (Jun. 2013).
"3rd Generation Partnership Project; Technical Specification Group Radio Access Network; Evolved Universal Terrestrial Radio Access (E-UTRA); Radio Resource Control (RRC); Protocol specification (Release 11)," 3GPP TS 36.331, V11.4.0, pp. 1-346, 3rd Generation Partnership Project, Valbonne, France (Jun. 2013).
"Restrictive Scheduling for SIBs for MTC coverage improvement", 3GPP TSG RAN WG1 #73 R1-131867, 3rd Generation Partnership Project, Valbonne, France (May 20-24, 2013).
"System information for enhanced coverage MTC UE", 3GPP TSG-RAN WG1 Meeting #74 R1-133422, 3rd Generation Partnership Project, Valbonne, France (Aug. 19-23, 2013).
JP 2016-541774, Notice of Reasons for Rejection, dated Mar. 13, 2018.

* cited by examiner

INFORMATION TRANSMISSION METHOD, APPARATUS, AND SYSTEM

CROSS-REFERENCE TO RELATED APPLICATIONS

This application is a continuation of International Patent Application No. PCT/CN2014/076522, filed on Apr. 29, 2014, which claims priority to Chinese Patent Application No. PCT/CN2013/083502, filed on Sep. 13, 2013, both of which are hereby incorporated by reference in their entireties.

TECHNICAL FIELD

The present disclosure relates to the communications field, and in particular, to an information transmission method, apparatus, and system.

BACKGROUND

In Long Term Evolution (LTE) based cost-effective Machine Type Communication (MTC), coverage enhancement needs to be performed on coverage of an LTE network, so as to ensure that user equipment (UE) can reliably communicate with a base station when the UE is in a basement or channel quality is poor. In an existing LTE or LTE-A (LTE Advanced) system, time-domain resources are divided as radio frames, and the radio frames are numbered 0 to 1023. One radio frame includes 10 subframes, a time length of one subframe is 1 millisecond (1 ms), and subframes in each radio frame are numbered 0 to 9. In the existing LTE or LTE-A system, a physical broadcast channel (PBCH) for carrying one time of transmission of an master information block (MIB), a physical downlink control channel (PDCCH) for scheduling one time of transmission of an system information block type 1 (SIB 1), a physical downlink shared channel (PDSCH) for carrying one time of transmission of the SIB 1, a PDCCH for scheduling one time of transmission of system information (SI), and a PDSCH for carrying one time of transmission of the SI are all transmitted in one subframe.

In the case of coverage enhancement, the base station may transmit MIB information multiple times to improve transmission reliability of an MIB, and a PBCH for carrying multiple times of transmission of the MIB may be referred to as an enhanced PBCH. Similarly, the base station may transmit control information multiple times to improve transmission reliability of the control information, and a PDCCH for carrying multiple times of transmission of the control information may be referred to as an enhanced PDCCH; the base station may transmit data multiple times to improve transmission reliability of the data, and a PDSCH for carrying multiple times of transmission of the data is referred to as an enhanced PDSCH. The data herein includes, but is not limited to, an SIB 1, SI, another SIB, unicast data, a paging message, a random access response, or other common data.

In the existing LTE or LTE-A system, a time division duplex (TDD) configuration is included in an SIB 1, where which subframes are special subframes and configurations of the special subframes are determined in the TDD configuration; and an multicast-broadcast single-frequency network (MBSFN) subframe configuration is included in an SIB 2, and system information (SI) cannot be transmitted in a special subframe or an MBSFN subframe. However, in the case of coverage enhancement, UE that requires coverage enhancement cannot learn the TDD configuration and the MBSFN subframe configuration before receiving the SIB 1 and the SIB 2. Therefore, when enhanced transmission is performed on first information, a subframe used in the enhanced transmission cannot be determined, thereby lowering transmission reliability of the first information. The first information may be a master information block, an SIB including a TDD configuration, or an SIB including an MBSFN subframe configuration. The enhanced transmission may be repeated transmission, spread spectrum transmission, transmission time interval bundling transmission, power increased transmission, or retransmission.

SUMMARY

Embodiments of the present disclosure provide an information transmission method, apparatus, and system, which can determine a subframe used in enhanced transmission of first information, improving transmission reliability of the first information.

To achieve the foregoing objective, the following technical solutions are used in the embodiments of the present disclosure:

According to a first aspect, an embodiment of the present disclosure provides an information transmission method, where the method includes:

determining a subframe for enhanced transmission of first information; and repeatedly transmitting the first information multiple times in the determined subframe for the enhanced transmission of the first information, and skipping channel state information-reference signal CSI-RS transmission ontransmission of a resource element occupied by the enhanced transmission of the first information, where the first information is a master information block MIB, and a quantity of times of repeatedly transmitting the MIB in at least one radio frame is greater than one time; or the first information is a system information block type 1 SIB 1, and a quantity of times of repeatedly transmitting the SIB 1 in at least two consecutive radio frames is greater than one time; or the first information is other system information except an MIB and an SIB 1, unicast data, a paging message, a random access response RAR, a random access contention resolution message, or control information, and a quantity of times of repeatedly transmitting the first information in the determined subframe for the enhanced transmission of the first information is at least two times.

In a first possible implementation manner, according to the first aspect, for a frequency division duplex (FDD) system, the subframe for the enhanced transmission of the first information includes one or more subframes of a subframe 0, a subframe 4, a subframe 5, and a subframe 9; and for a time division duplex TDD system, the subframe for the enhanced transmission of the first information includes one or more subframes of the subframe 0, a subframe 1, the subframe 5, and a subframe 6.

In a second possible implementation manner, with reference to the first aspect or the first possible implementation manner, for the FDD system, the subframe for the enhanced transmission of the first information includes the subframe 9; or the subframe for the enhanced transmission of the first information includes the subframe 4 and the subframe 9; and for the TDD system, the subframe for the enhanced transmission of the first information includes the subframe 0; or the subframe for the enhanced transmission of the first information includes the subframe 0 and the subframe 5.

In a third possible implementation manner, with reference to the first aspect or the first possible implementation manner or the second possible implementation manner, the subframe for the enhanced transmission of the first information further includes:

for the FDD system, the subframe for the enhanced transmission of the first information further includes the subframe 0 and/or the subframe 5; and for the TDD system, the subframe for the enhanced transmission of the first information further includes the subframe 1 and/or the subframe 6.

In a fourth possible implementation manner, with reference to the first aspect or the first possible implementation manner to the third possible implementation manner, for the FDD system, the subframe for the enhanced transmission of the first information includes the subframe 0, the subframe 4, the subframe 5, and the subframe 9; and for the TDD system, the subframe for the enhanced transmission of the first information includes the subframe 0, the subframe 1, the subframe 5, and the subframe 6.

In a fifth possible implementation manner, with reference to the first aspect or the first possible implementation manner or the fourth possible implementation manner, the skipping channel state information-reference signal CSI-RS transmission ontransmission of a resource element occupied by the enhanced transmission of the first information includes:

determining a resource element occupied by the CSI-RS transmission and a subframe for the CSI-RS transmission; and if the subframe for the CSI-RS transmission collides with the subframe for the enhanced transmission of the first information, skipping transmitting the first information on the resource element occupied by the CSI-RS transmission in the determined subframe in which the enhanced transmission of the first information collides with the CSI-RS transmission.

In a sixth possible implementation manner, with reference to the first aspect or the first possible implementation manner or the fifth possible implementation manner, the skipping channel state information-reference signal CSI-RS transmission ontransmission of a resource element occupied by the enhanced transmission of the first information includes:

determining a resource element occupied by the CSI-RS transmission; and skipping transmitting the first information on the resource element occupied by the CSI-RS transmission in the determined subframe for the enhanced transmission of the first information.

In a seventh possible implementation manner, with reference to the first aspect or the first possible implementation manner or the sixth possible implementation manner, the skipping channel state information-reference signal CSI-RS transmission ontransmission of a resource element occupied by the enhanced transmission of the first information includes:

determining a subframe for the CSI-RS transmission; and skipping transmitting the first information in the subframe for the CSI-RS transmission.

In an eighth possible implementation manner, with reference to the first aspect or the first possible implementation manner to the seventh possible implementation manner, the determining a resource element occupied by the CSI-RS transmission includes:

determining an available CSI-RS configuration according to a preset rule, or setting an available CSI-RS configuration and notifying user equipment of the available CSI-RS configuration by using signaling, where the available CSI-RS configuration includes one or more CSI-RS configurations; and determining, according to the available CSI-RS configuration, the resource element occupied by the CSI-RS transmission.

In a ninth possible implementation manner, with reference to the first aspect or the first possible implementation manner to the eighth possible implementation manner, the determining a subframe for the CSI-RS transmission includes:

determining an available CSI-RS subframe configuration according to a preset rule, or setting an available CSI-RS subframe configuration and notifying user equipment of the available CSI-RS subframe configuration by using signaling, where the available CSI-RS subframe configuration includes one or more CSI-RS subframe configurations; and determining the subframe for the CSI-RS transmission according to the available CSI-RS subframe configuration.

In a tenth possible implementation manner, with reference to the first aspect or the first possible implementation manner to the ninth possible implementation manner, the signaling includes:

an MIB, a system information block SIB, Radio Resource Control RRC common signaling, RRC dedicated signaling, Media Access Control MAC signaling, or physical layer signaling.

According to a second aspect, an embodiment of the present disclosure further provides an information transmission method, where the method includes:

determining a subframe for enhanced transmission of first information; and receiving, in the determined subframe for the enhanced transmission of the first information, the first information that is repeatedly transmitted multiple times, and skipping CSI-RS transmission ontransmission of a resource element occupied by the received first information that is repeatedly transmitted multiple times, where the first information is an MIB, and a quantity of times of receiving the repeatedly transmitted MIB in at least one radio frame is greater than one time; or the first information is an SIB 1, and a quantity of times of receiving the repeatedly transmitted SIB 1 in at least two consecutive radio frames is greater than one time; or the first information is other system information except an MIB and an SIB 1, unicast data, a paging message, a random access response RAR, a random access contention resolution message, or control information, and a quantity of times of receiving the repeatedly transmitted first information in the determined subframe for the enhanced transmission of the first information is at least two times.

In a first possible implementation manner, according to the second aspect, for an FDD system, the subframe for the enhanced transmission of the first information includes one or more subframes of a subframe 0, a subframe 4, a subframe 5, and a subframe 9; and for a TDD system, the subframe for the enhanced transmission of the first information includes one or more subframes of the subframe 0, a subframe 1, the subframe 5, and a subframe 6.

In a second possible implementation manner, with reference to the second aspect or the first possible implementation manner, for the FDD system, the subframe for the enhanced transmission of the first information includes the subframe 9; or the subframe for the enhanced transmission of the first information includes the subframe 4 and the subframe 9; and for the TDD system, the subframe for the enhanced transmission of the first information includes the subframe 0; or the subframe for the enhanced transmission of the first information includes the subframe 0 and the subframe 5.

In a third possible implementation manner, with reference to the second aspect or the first possible implementation manner or the second possible implementation manner, the subframe for the enhanced transmission of the first information further includes:

for the FDD system, the subframe for the enhanced transmission of the first information further includes the subframe 0 and/or the subframe 5; and for the TDD system, the subframe for the enhanced transmission of the first information further includes the subframe 1 and/or the subframe 6.

In a fourth possible implementation manner, with reference to the second aspect or the first possible implementation manner to the third possible implementation manner, for the FDD system, the subframe for the enhanced transmission of the first information includes the subframe 0, the subframe 4, the subframe 5, and the subframe 9; and for the TDD system, the subframe for the enhanced transmission of the first information includes the subframe 0, the subframe 1, the subframe 5, and the subframe 6.

In a fifth possible implementation manner, with reference to the second aspect or the first possible implementation manner to the fourth possible implementation manner, the skipping CSI-RS transmission on transmission of a resource element occupied by the received first information that is repeatedly transmitted multiple times includes:

determining a resource element occupied by the CSI-RS transmission and a subframe for the CSI-RS transmission; and if the subframe for the CSI-RS transmission collides with the subframe for the enhanced transmission of the first information, skipping receiving the first information on the resource element occupied by the CSI-RS transmission in the determined subframe in which the enhanced transmission of the first information collides with the CSI-RS transmission.

In a sixth possible implementation manner, with reference to the second aspect or the first possible implementation manner to the fifth possible implementation manner, the skipping CSI-RS transmission on transmission of a resource element occupied by the received first information that is repeatedly transmitted multiple times includes:

determining a resource element occupied by the CSI-RS transmission; and skipping receiving the first information on the resource element occupied by the CSI-RS transmission in the determined subframe for the enhanced transmission of the first information.

In a seventh possible implementation manner, with reference to the second aspect or the first possible implementation manner to the sixth possible implementation manner, the skipping CSI-RS transmission of a resource element occupied by the received first information that is repeatedly transmitted multiple times includes:

determining a subframe for the CSI-RS transmission; and skipping receiving the first information in the subframe for the CSI-RS transmission.

In an eighth possible implementation manner, with reference to the second aspect or the first possible implementation manner to the seventh possible implementation manner, the determining a resource element occupied by the CSI-RS transmission includes:

determining an available CSI-RS configuration according to a preset rule, or receiving signaling from a base station, where the signaling is used for notifying the available CSI-RS configuration, where the available CSI-RS configuration includes one or more CSI-RS configurations; and determining, according to the available CSI-RS configuration, the resource element occupied by the CSI-RS transmission.

In a ninth possible implementation manner, with reference to the second aspect or the first possible implementation manner to the eighth possible implementation manner, the determining a subframe for the CSI-RS transmission includes:

determining an available CSI-RS subframe configuration according to a preset rule, or receiving signaling from a base station, where the signaling is used for notifying the available CSI-RS subframe configuration, where the available CSI-RS subframe configuration includes one or more CSI-RS subframe configurations; and determining the subframe for the CSI-RS transmission according to the available CSI-RS subframe configuration.

In a tenth possible implementation manner, with reference to the second aspect or the first possible implementation manner to the ninth possible implementation manner, the signaling includes:

an MIB, a system information block SIB, Radio Resource Control RRC common signaling, RRC dedicated signaling, Media Access Control MAC signaling, or physical layer signaling.

According to a third aspect, an embodiment of the present disclosure provides an information transmission apparatus, including:

a determining module, configured to determine a subframe for enhanced transmission of first information; and a transmission module, configured to repeatedly transmit the first information multiple times in the determined subframe for the enhanced transmission of the first information, and skip CSI-RS transmission of a resource element occupied by the enhanced transmission of the first information, where the first information is an MIB, and a quantity of times of repeatedly transmitting the MIB in at least one radio frame is greater than one time; or the first information is an SIB 1, and a quantity of times of repeatedly transmitting the SIB 1 in at least two consecutive radio frames is greater than one time; or the first information is other system information except an MIB and an SIB 1, unicast data, a paging message, a random access response RAR, a random access contention resolution message, or control information, and a quantity of times of repeatedly transmitting the first information in the determined subframe for the enhanced transmission of the first information is at least two times.

In a first possible implementation manner, according to the third aspect, for an FDD system, the subframe for the enhanced transmission of the first information includes one or more subframes of a subframe 0, a subframe 4, a subframe 5, and a subframe 9; and for a TDD system, the subframe for the enhanced transmission of the first information includes one or more subframes of the subframe 0, a subframe 1, the subframe 5, and a subframe 6.

In a second possible implementation manner, with reference to the third aspect or the first possible implementation manner, for the FDD system, the subframe for the enhanced transmission of the first information includes the subframe 9; or the subframe for the enhanced transmission of the first information includes the subframe 4 and the subframe 9; and for the TDD system, the subframe for the enhanced transmission of the first information includes the subframe 0; or the subframe for the enhanced transmission of the first information includes the subframe 0 and the subframe 5.

In a third possible implementation manner, with reference to the third aspect or the first possible implementation manner or the second possible implementation manner, the subframe for the enhanced transmission of the first information further includes:

for the FDD system, the subframe for the enhanced transmission of the first information further includes the subframe 0 and/or the subframe 5; and for the TDD system, the subframe for the enhanced transmission of the first information further includes the subframe 1 and/or the subframe 6.

In a fourth possible implementation manner, with reference to the third aspect or the first possible implementation manner to the third possible implementation manner, for the FDD system, the subframe for the enhanced transmission of the first information includes the subframe 0, the subframe 4, the subframe 5, and the subframe 9; and for the TDD system, the subframe for the enhanced transmission of the first information includes the subframe 0, the subframe 1, the subframe 5, and the subframe 6.

In a fifth possible implementation manner, with reference to the third aspect or the first possible implementation manner to the fourth possible implementation manner, the determining module is further configured to determine a resource element occupied by the CSI-RS transmission and a subframe for the CSI-RS transmission; and the transmission module is further configured to: if the subframe for the CSI-RS transmission collides with the subframe for the enhanced transmission of the first information, skip transmitting the first information on the resource element occupied by the CSI-RS transmission in the determined subframe in which the enhanced transmission of the first information collides with the CSI-RS transmission.

In a sixth possible implementation manner, with reference to the third aspect or the first possible implementation manner to the fifth possible implementation manner, the determining module is further configured to determine a resource element occupied by the CSI-RS transmission; and the transmission module is further configured to skip transmitting the first information on the resource element occupied by the CSI-RS transmission in the determined subframe for the enhanced transmission of the first information.

In a seventh possible implementation manner, with reference to the third aspect or the first possible implementation manner to the sixth possible implementation manner, the determining module is further configured to determine a subframe for the CSI-RS transmission; and the transmission module is further configured to skip transmitting the first information in the subframe for the CSI-RS transmission.

In an eighth possible implementation manner, with reference to the third aspect or the first possible implementation manner to the seventh possible implementation manner, the determining module is configured to determine an available CSI-RS configuration according to a preset rule, or set an available CSI-RS configuration, where the available CSI-RS configuration includes one or more CSI-RS configurations;

the determining module is configured to determine, according to the available CSI-RS configuration, the resource element occupied by the CSI-RS transmission; and the information transmission apparatus further includes:

a notification module, configured to notify user equipment of the available CSI-RS configuration by using signaling.

In a ninth possible implementation manner, with reference to the third aspect or the first possible implementation manner to the eighth possible implementation manner, the determining module is configured to determine an available CSI-RS subframe configuration according to a preset rule, or set an available CSI-RS subframe configuration, where the available CSI-RS subframe configuration includes one or more CSI-RS subframe configurations;

the determining module is configured to determine the subframe for the CSI-RS transmission according to the available CSI-RS subframe configuration; and the notification module is further configured to notify user equipment of the available CSI-RS subframe configuration by using signaling.

In a tenth possible implementation manner, with reference to the third aspect or the first possible implementation manner to the ninth possible implementation manner, the signaling includes:

an MIB, a system information block SIB, Radio Resource Control RRC common signaling, RRC dedicated signaling, Media Access Control MAC signaling, or physical layer signaling.

According to a fourth aspect, an embodiment of the present disclosure further provides an information transmission apparatus, including:

a determining unit, configured to determine a subframe for enhanced transmission of first information; and a receiving unit, configured to receive, in the determined subframe for the enhanced transmission of the first information, the first information that is repeatedly transmitted multiple times, and skip CSI-RS transmission of a resource element occupied by the received first information that is repeatedly transmitted multiple times, where the first information is an MIB, and a quantity of times of receiving the repeatedly transmitted MIB in at least one radio frame is greater than one time; or the first information is an SIB 1, and a quantity of times of receiving the repeatedly transmitted SIB 1 in at least two consecutive radio frames is greater than one time; or the first information is other system information except an MIB and an SIB 1, unicast data, a paging message, a random access response RAR, a random access contention resolution message, or control information, and a quantity of times of receiving the repeatedly transmitted first information in the determined subframe for the enhanced transmission of the first information is at least two times.

In a first possible implementation manner, according to the fourth aspect, for an FDD system, the subframe for the enhanced transmission of the first information includes one or more subframes of a subframe 0, a subframe 4, a subframe 5, and a subframe 9; and for a TDD system, the subframe for the enhanced transmission of the first information includes one or more subframes of the subframe 0, a subframe 1, the subframe 5, and a subframe 6.

In a second possible implementation manner, with reference to the fourth aspect or the first possible implementation manner, for the FDD system, the subframe for the enhanced transmission of the first information includes the subframe 9; or the subframe for the enhanced transmission of the first information includes the subframe 4 and the subframe 9; and for the TDD system, the subframe for the enhanced transmission of the first information includes the subframe 0; or the subframe for the enhanced transmission of the first information includes the subframe 0 and the subframe 5.

In a third possible implementation manner, with reference to the fourth aspect or the first possible implementation manner or the second possible implementation manner, the subframe for the enhanced transmission of the first information further includes:

for the FDD system, the subframe for the enhanced transmission of the first information further includes the subframe 0 and/or the subframe 5; and for the TDD system, the subframe for the enhanced transmission of the first information further includes the subframe 1 and/or the subframe 6.

In a fourth possible implementation manner, with reference to the fourth aspect or the first possible implementation manner to the third possible implementation manner, for the FDD system, the subframe for the enhanced transmission of the first information includes the subframe 0, the subframe 4, the subframe 5, and the subframe 9; and for the TDD system, the subframe for the enhanced transmission of the first information includes the subframe 0, the subframe 1, the subframe 5, and the subframe 6.

In a fifth possible implementation manner, with reference to the fourth aspect or the first possible implementation manner to the fourth possible implementation manner, the determining unit is further configured to determine a resource element occupied by the CSI-RS transmission and a subframe for the CSI-RS transmission; and the receiving unit is further configured to: if the subframe for the CSI-RS transmission collides with the subframe for the enhanced transmission of the first information, skip receiving the first information on the resource element occupied by the CSI-RS transmission in the determined subframe in which the enhanced transmission of the first information collides with the CSI-RS transmission.

In a sixth possible implementation manner, with reference to the fourth aspect or the first possible implementation manner to the fifth possible implementation manner, the determining unit is further configured to determine a resource element occupied by the CSI-RS transmission; and the receiving unit is further configured to skip receiving the first information on the resource element occupied by the CSI-RS transmission in the determined subframe for the enhanced transmission of the first information.

In a seventh possible implementation manner, with reference to the fourth aspect or the first possible implementation manner to the sixth possible implementation manner, the determining unit is further configured to determine a subframe for the CSI-RS transmission; and the receiving unit is further configured to skip receiving the first information in the subframe for the CSI-RS transmission.

In an eighth possible implementation manner, with reference to the fourth aspect or the first possible implementation manner to the seventh possible implementation manner, the determining unit is configured to determine an available CSI-RS configuration according to a preset rule, where the available CSI-RS configuration includes one or more CSI-RS configurations;

the receiving unit is further configured to receive signaling from a base station, where the signaling is used for notifying the available CSI-RS configuration; and the determining unit is further configured to determine, according to the available CSI-RS configuration, the resource element occupied by the CSI-RS transmission.

In a ninth possible implementation manner, with reference to the fourth aspect or the first possible implementation manner to the eighth possible implementation manner, the determining unit is configured to determine an available CSI-RS subframe configuration according to a preset rule, where the available CSI-RS subframe configuration includes one or more CSI-RS subframe configurations;

the receiving unit is further configured to receive signaling from a base station, where the signaling is used for notifying the available CSI-RS subframe configuration; and the determining unit is further configured to determine the subframe for the CSI-RS transmission according to the available CSI-RS subframe configuration.

In a tenth possible implementation manner, with reference to the fourth aspect or the first possible implementation manner to the ninth possible implementation manner, the signaling includes:

an MIB, a system information block SIB, Radio Resource Control RRC common signaling, RRC dedicated signaling, Media Access Control MAC signaling, or physical layer signaling.

According to a fifth aspect, an embodiment of the present disclosure provides a network device, including:

a processor, configured to determine a subframe for enhanced transmission of first information; and a transmitter, configured to repeatedly transmit the first information multiple times in the determined subframe for the enhanced transmission of the first information, and skip CSI-RS transmission of a resource element occupied by the enhanced transmission of the first information, where the first information is an MIB, and a quantity of times of repeatedly transmitting the MIB in at least one radio frame is greater than one time; or the first information is an SIB 1, and a quantity of times of repeatedly transmitting the SIB 1 in at least two consecutive radio frames is greater than one time; or the first information is other system information except an MIB and an SIB 1, unicast data, a paging message, a random access response RAR, a random access contention resolution message, or control information, and a quantity of times of repeatedly transmitting the first information in the determined subframe for the enhanced transmission of the first information is at least two times.

In a first possible implementation manner, according to the fifth aspect, for an FDD system, the subframe for the enhanced transmission of the first information includes one or more subframes of a subframe 0, a subframe 4, a subframe 5, and a subframe 9; and for a TDD system, the subframe for the enhanced transmission of the first information includes one or more subframes of the subframe 0, a subframe 1, the subframe 5, and a subframe 6.

In a second possible implementation manner, with reference to the fifth aspect or the first possible implementation manner,
for the FDD system,
the subframe for the enhanced transmission of the first information includes the subframe 9; or
the subframe for the enhanced transmission of the first information includes the subframe 4 and the subframe 9; and
for the TDD system,
the subframe for the enhanced transmission of the first information includes the subframe 0; or
the subframe for the enhanced transmission of the first information includes the subframe 0 and the subframe 5.

In a third possible implementation manner, with reference to the fifth aspect or the first possible implementation manner or the second possible implementation manner, the subframe for the enhanced transmission of the first information further includes:
for the FDD system, the subframe for the enhanced transmission of the first information further includes the subframe 0 and/or the subframe 5; and
for the TDD system, the subframe for the enhanced transmission of the first information further includes the subframe 1 and/or the subframe 6.

In a fourth possible implementation manner, with reference to the fifth aspect or the first possible implementation manner to the third possible implementation manner,
for the FDD system, the subframe for the enhanced transmission of the first information includes the subframe 0, the subframe 4, the subframe 5, and the subframe 9; and
for the TDD system, the subframe for the enhanced transmission of the first information includes the subframe 0, the subframe 1, the subframe 5, and the subframe 6.

In a fifth possible implementation manner, with reference to the fifth aspect or the first possible implementation manner to the fourth possible implementation manner,
the processor is further configured to determine a resource element occupied by the CSI-RS transmission and a subframe for the CSI-RS transmission; and
the transmitter is further configured to: if the subframe for the CSI-RS transmission collides with the subframe for the enhanced transmission of the first information, skip transmitting the first information on the resource element occupied by the CSI-RS transmission in the determined subframe in which the enhanced transmission of the first information collides with the CSI-RS transmission.

In a sixth possible implementation manner, with reference to the fifth aspect or the first possible implementation manner to the fifth possible implementation manner,
the processor is further configured to determine a resource element occupied by the CSI-RS transmission; and
the transmitter is further configured to skip transmitting the first information on the resource element occupied by the CSI-RS transmission in the determined subframe for the enhanced transmission of the first information.

In a seventh possible implementation manner, with reference to the fifth aspect or the first possible implementation manner to the sixth possible implementation manner,
the processor is further configured to determine a subframe for the CSI-RS transmission; and
the transmitter is further configured to skip transmitting the first information in the subframe for the CSI-RS transmission.

In an eighth possible implementation manner, with reference to the fifth aspect or the first possible implementation manner to the seventh possible implementation manner,
the processor is configured to determine an available CSI-RS configuration according to a preset rule, or set an available CSI-RS configuration, where the available CSI-RS configuration includes one or more CSI-RS configurations;
the processor is configured to determine, according to the available CSI-RS configuration, the resource element occupied by the CSI-RS transmission; and
the transmitter is further configured to notify user equipment of the available CSI-RS configuration by using signaling.

In a ninth possible implementation manner, with reference to the fifth aspect or the first possible implementation manner to the eighth possible implementation manner,
the processor is configured to determine an available CSI-RS subframe configuration according to a preset rule, or set an available CSI-RS subframe configuration, where the available CSI-RS subframe configuration includes one or more CSI-RS subframe configurations;
the processor is configured to determine the subframe for the CSI-RS transmission according to the available CSI-RS subframe configuration; and
the transmitter is further configured to notify user equipment of the available CSI-RS subframe configuration by using signaling.

In a tenth possible implementation manner, with reference to the fifth aspect or the first possible implementation manner to the ninth possible implementation manner, the signaling includes:
an MIB, a system information block SIB, Radio Resource Control RRC common signaling, RRC dedicated signaling, Media Access Control MAC signaling, or physical layer signaling.

According to a sixth aspect, an embodiment of the present disclosure further provides an information transmission device, including:
a processor, configured to determine a subframe for enhanced transmission of first information; and
a receiver, configured to receive, in the determined subframe for the enhanced transmission of the first information, the first information that is repeatedly transmitted multiple times, and skip CSI-RS transmission of a resource element occupied by the received first information that is repeatedly transmitted multiple times, where
the first information is an MIB, and a quantity of times of receiving the repeatedly transmitted MIB in at least one radio frame is greater than one time; or the first information is an SIB 1, and a quantity of times of receiving the repeatedly transmitted SIB 1 in at least two consecutive radio frames is greater than one time; or the first information is other system information except an MIB and an SIB 1, unicast data, a paging message, a random access response RAR, a random access contention resolution message, or control information, and a quantity of times of receiving the repeatedly transmitted first information in the determined subframe for the enhanced transmission of the first information is at least two times.

In a first possible implementation manner, according to the sixth aspect,
for an FDD system, the subframe for the enhanced transmission of the first information includes one or more subframes of a subframe 0, a subframe 4, a subframe 5, and a subframe 9; and for a TDD system, the subframe for the enhanced transmission of the first information includes one or more subframes of the subframe 0, a subframe 1, the subframe 5, and a subframe 6.

In a second possible implementation manner, with reference to the sixth aspect or the first possible implementation manner, for the FDD system, the subframe for the enhanced transmission of the first information includes the subframe 9; or the subframe for the enhanced transmission of the first information includes the subframe 4 and the subframe 9; and for the TDD system, the subframe for the enhanced transmission of the first information includes the subframe 0; or the subframe for the enhanced transmission of the first information includes the subframe 0 and the subframe 5.

In a third possible implementation manner, with reference to the sixth aspect or the first possible implementation manner or the second possible implementation manner, the subframe for the enhanced transmission of the first information further includes:

for the FDD system, the subframe for the enhanced transmission of the first information further includes the subframe 0 and/or the subframe 5; and for the TDD system, the subframe for the enhanced transmission of the first information further includes the subframe 1 and/or the subframe 6.

In a fourth possible implementation manner, with reference to the sixth aspect or the first possible implementation manner to the third possible implementation manner, for the FDD system, the subframe for the enhanced transmission of the first information includes the subframe 0, the subframe 4, the subframe 5, and the subframe 9; and for the TDD system, the subframe for the enhanced transmission of the first information includes the subframe 0, the subframe 1, the subframe 5, and the subframe 6.

In a fifth possible implementation manner, with reference to the sixth aspect or the first possible implementation manner to the fourth possible implementation manner, the processor is further configured to determine a resource element occupied by the CSI-RS transmission and a subframe for the CSI-RS transmission; and the receiver is further configured to: if the subframe for the CSI-RS transmission collides with the subframe for the enhanced transmission of the first information, skip receiving the first information on the resource element occupied by the CSI-RS transmission in the determined subframe in which the enhanced transmission of the first information collides with the CSI-RS transmission.

In a sixth possible implementation manner, with reference to the sixth aspect or the first possible implementation manner to the fifth possible implementation manner, the processor is further configured to determine a resource element occupied by the CSI-RS transmission; and the receiver is further configured to skip receiving the first information on the resource element occupied by the CSI-RS transmission in the determined subframe for the enhanced transmission of the first information.

In a seventh possible implementation manner, with reference to the sixth aspect or the first possible implementation manner to the sixth possible implementation manner, the processor is further configured to determine a subframe for the CSI-RS transmission; and the receiver is further configured to skip receiving the first information in the subframe for the CSI-RS transmission.

In an eighth possible implementation manner, with reference to the sixth aspect or the first possible implementation manner to the seventh possible implementation manner, the processor is configured to determine an available CSI-RS configuration according to a preset rule, where the available CSI-RS configuration includes one or more CSI-RS configurations;

the receiver is further configured to receive signaling from a base station, where the signaling is used for notifying the available CSI-RS configuration; and the processor is further configured to determine, according to the available CSI-RS configuration, the resource element occupied by the CSI-RS transmission.

In a ninth possible implementation manner, with reference to the sixth aspect or the first possible implementation manner to the eighth possible implementation manner, the processor is configured to determine an available CSI-RS subframe configuration according to a preset rule, where the available CSI-RS subframe configuration includes one or more CSI-RS subframe configurations;

the receiver is further configured to receive signaling from a base station, where the signaling is used for notifying the available CSI-RS subframe configuration; and the processor is further configured to determine the subframe for the CSI-RS transmission according to the available CSI-RS subframe configuration.

In a tenth possible implementation manner, with reference to the sixth aspect or the first possible implementation manner to the ninth possible implementation manner, the signaling includes:

an MIB, a system information block SIB, Radio Resource Control RRC common signaling, RRC dedicated signaling, Media Access Control MAC signaling, or physical layer signaling.

According to a seventh aspect, an embodiment of the present disclosure provides an information transmission system, including the base station having any feature described above and the user equipment having any feature described above.

According to an eighth aspect, an embodiment of the present disclosure provides an information transmission method, where the method includes:

determining a subframe for enhanced transmission of first information, where the first information is a master information block, or the first information is a system information block SIB including a time division duplex TDD configuration, or the first information is an SIB including a multicast-broadcast single-frequency network MBSFN subframe configuration; and performing the enhanced transmission of the first information in the determined subframe for the enhanced transmission of the first information.

In a first possible implementation manner, according to the eighth aspect, the performing the enhanced transmission of the first information in the determined subframe for the enhanced transmission of the first information includes:

if the first information is a master information block, performing the enhanced transmission of the master information block in at least one radio frame a quantity of times that is greater than one time; or if the first information is an SIB including a TDD configuration, performing the enhanced transmission of the SIB in at least two consecutive radio frames a quantity of times that is greater than one time; or if the first information is an SIB including an MBSFN subframe configuration, performing the enhanced transmission of the SIB in the determined subframe for the enhanced transmission of the first information a quantity of times that is at least two times.

In a second possible implementation manner, with reference to the eighth aspect or the first possible implementation manner, for a frequency division duplex FDD system or a half frequency division duplex Half FDD system, the subframe for the enhanced transmission of the first information includes one or more of a subframe 0, a subframe 4, a subframe 5, and a subframe 9; and for a TDD system, the subframe for the enhanced transmission of the first information includes the subframe 0 and/or the subframe 5.

In a third possible implementation manner, with reference to the eighth aspect or the first possible implementation manner or the second possible implementation manner, for the TDD system, if the first information is an SIB including an MBSFN subframe configuration and a subframe 6 is not a special subframe, the subframe for the enhanced transmission of the first information further includes the subframe 6.

In a fourth possible implementation manner, with reference to the eighth aspect or the first possible implementation manner to the third possible implementation manner, the subframe 0 is a subframe 0 in each radio frame in at least one radio frame, or a subframe 0 in each even-numbered radio frame in at least one even-numbered radio frame, or a subframe 0 in each odd-numbered radio frame in at least one odd-numbered radio frame;

the subframe 4 is a subframe 4 in each radio frame in at least one radio frame, or a subframe 4 in each even-numbered radio frame in at least one even-numbered radio frame, or a subframe 4 in each odd-numbered radio frame in at least one odd-numbered radio frame;

the subframe 5 is a subframe 5 in each radio frame in at least one radio frame, or a subframe 5 in each even-numbered radio frame in at least one even-numbered radio frame, or a subframe 5 in each odd-numbered radio frame in at least one odd-numbered radio frame;

the subframe 6 is a subframe 6 in each radio frame in at least one radio frame, or a subframe 6 in each even-numbered radio frame in at least one even-numbered radio frame, or a subframe 6 in each odd-numbered radio frame in at least one odd-numbered radio frame; and the subframe 9 is a subframe 9 in each radio frame in at least one radio frame, or a subframe 9 in each even-numbered radio frame in at least one even-numbered radio frame, or a subframe 9 in each odd-numbered radio frame in at least one odd-numbered radio frame.

In a fifth possible implementation manner, with reference to the eighth aspect or the first possible implementation manner to the fourth possible implementation manner, when the enhanced transmission of the first information is scheduled based on a control channel, additional enhanced transmission of a paging message and/or a random access response message is not performed in the determined subframe for the enhanced transmission of the first information; and when the enhanced transmission of the first information is not scheduled based on a control channel, on a small-bandwidth carrier, the additional enhanced transmission of the paging message and/or the random access response message is not performed in the determined subframe for the enhanced transmission of the first information, where the small-bandwidth carrier includes at least a carrier of 1.4 MHz and/or a carrier of 3 MHz.

In a sixth possible implementation manner, with reference to the eighth aspect or the first possible implementation manner to the fifth possible implementation manner, if the first information is an SIB including a TDD configuration, the enhanced transmission of the first information is after enhanced transmission of a master information block, and a preset first time offset exists between the enhanced transmission of the first information and the enhanced transmission of the master information block; and if the first information is an SIB including an MBSFN subframe configuration, the enhanced transmission of the first information is after enhanced transmission of an SIB including a TDD configuration, and a preset second time offset exists between the enhanced transmission of the first information and the enhanced transmission of the SIB including the TDD configuration.

In a seventh possible implementation manner, with reference to the eighth aspect or the first possible implementation manner to the sixth possible implementation manner, the method further includes:

determining a redundancy version RV, in a (rep_index+1)$^{th}$ time of enhanced transmission, of the first information, where RV index=ceil(3/2*{rep_index mod 4})mod 4, ceil(x) is a round-up function, rep_index is a number of a quantity of times of the enhanced transmission of the first information, and mod is a modulo operation; or the RV is determined in an order of 0, 2, 3, and 1 according to an index of a quantity of times of the enhanced transmission.

In an eighth possible implementation manner, with reference to the eighth aspect or the first possible implementation manner to the seventh possible implementation manner, the subframe for the enhanced transmission of the first information includes any one of or a combination of the following:

the subframe for the enhanced transmission of the first information is a subframe in an enhanced transmission opportunity of the first information or a subframe in an enhanced transmission bundle of the first information;

the subframe for the enhanced transmission of the first information is a subframe in at least one radio frame; and the subframe for the enhanced transmission of the first information is a subframe in at least one system information window.

According to a ninth aspect, an embodiment of the present disclosure further provides an information transmission method, where the method includes:

determining a subframe for enhanced transmission of first information, where the first information is a master information block, or the first information is an SIB including a TDD configuration, or the first information is an SIB including an MBSFN subframe configuration; and receiving the first information in the determined subframe for the enhanced transmission of the first information.

In a first possible implementation manner, according to the ninth aspect, the receiving the first information in the determined subframe for the enhanced transmission of the first information includes:

if the first information is a master information block, receiving the master information block in at least one radio frame a quantity of times that is greater than one time; or if the first information is an SIB including a TDD configuration, receiving the SIB in at least two consecutive radio frames a quantity of times that is greater than one time; or if the first information is an SIB including an MBSFN subframe configuration, receiving the SIB in the determined subframe for the enhanced transmission of the first information a quantity of times that is at least two times.

In a second possible implementation manner, with reference to the ninth aspect or the first possible implementation manner, for an FDD system or a Half FDD system, the subframe for the enhanced transmission of the first information includes one or more of a subframe 0, a subframe 4, a subframe 5, and a subframe 9; and for a TDD system, the subframe for the enhanced transmission of the first information includes the subframe 0 and/or the subframe 5.

In a third possible implementation manner, with reference to the ninth aspect or the first possible implementation manner or the second possible implementation manner, for the TDD system, if the first information is an SIB including an MBSFN subframe configuration and a subframe 6 is not a special subframe, the subframe for the enhanced transmission of the first information further includes the subframe 6.

In a fourth possible implementation manner, with reference to the ninth aspect or the first possible implementation manner to the third possible implementation manner, the subframe 0 is a subframe 0 in each radio frame in at least one radio frame, or a subframe 0 in each even-numbered radio frame in at least one even-numbered radio frame, or a subframe 0 in each odd-numbered radio frame in at least one odd-numbered radio frame;

the subframe 4 is a subframe 4 in each radio frame in at least one radio frame, or a subframe 4 in each even-numbered radio frame in at least one even-numbered radio frame, or a subframe 4 in each odd-numbered radio frame in at least one odd-numbered radio frame;

the subframe 5 is a subframe 5 in each radio frame in at least one radio frame, or a subframe 5 in each even-numbered radio frame in at least one even-numbered radio frame, or a subframe 5 in each odd-numbered radio frame in at least one odd-numbered radio frame;

the subframe 6 is a subframe 6 in each radio frame in at least one radio frame, or a subframe 6 in each even-numbered radio frame in at least one even-numbered radio frame, or a subframe 6 in each odd-numbered radio frame in at least one odd-numbered radio frame; and the subframe 9 is a subframe 9 in each radio frame in at least one radio frame, or a subframe 9 in each even-numbered radio frame in at least one even-numbered radio frame, or a subframe 9 in each odd-numbered radio frame in at least one odd-numbered radio frame.

In a fifth possible implementation manner, with reference to the ninth aspect or the first possible implementation manner to the fourth possible implementation manner, when the enhanced transmission of the first information is scheduled based on a control channel, a paging message and/or a random access response message on which additional enhanced transmission is performed is not received in the determined subframe for the enhanced transmission of the first information; and when the enhanced transmission of the first information is not scheduled based on a control channel, on a small-bandwidth carrier, the paging message and/or the random access response message on which the additional enhanced transmission is performed is not received in the determined subframe for the enhanced transmission of the first information, where the small-bandwidth carrier includes at least a carrier of 1.4 MHz and/or a carrier of 3 MHz.

In a sixth possible implementation manner, with reference to the ninth aspect or the first possible implementation manner to the fifth possible implementation manner, if the first information is an SIB including a TDD configuration, the receiving of the first information is after receiving of a master information block, and a preset first time offset exists between the receiving of the first information and the receiving of the master information block; and if the first information is an SIB including an MBSFN subframe configuration, the receiving of the first information is after receiving of an SIB including a TDD configuration, and a preset second time offset exists between the receiving of the first information and the receiving of the SIB including the TDD configuration.

In a seventh possible implementation manner, with reference to the ninth aspect or the first possible implementation manner to the sixth possible implementation manner, the method further includes:

determining a redundancy version RV, in a (rep_index+1)$^{th}$ time of enhanced transmission, of the first information, where RV index=ceil(3/2*{rep_index mod 4})mod 4, ceil(x) is a round-up function, rep_index is a number of a quantity of times of the enhanced transmission of the first information, and mod is a modulo operation; or the RV is determined in an order of 0, 2, 3, and 1 according to an index of a quantity of times of the enhanced transmission.

In an eighth possible implementation manner, with reference to the ninth aspect or the first possible implementation manner to the seventh possible implementation manner, the subframe for the enhanced transmission of the first information includes any one of or a combination of the following:

the subframe for the enhanced transmission of the first information is a subframe in an enhanced transmission opportunity of the first information or a subframe in an enhanced transmission bundle of the first information;

the subframe for the enhanced transmission of the first information is a subframe in at least one radio frame; and the subframe for the enhanced transmission of the first information is a subframe in at least one system information window.

According to a tenth aspect, an embodiment of the present disclosure provides an information transmission apparatus, including:

a determining module, configured to determine a subframe for enhanced transmission of first information, where the first information is a master information block, or the first information is a system information block SIB including a time division duplex TDD configuration, or the first information is an SIB including a multicast-broadcast single-frequency network MBSFN subframe configuration; and a sending module, configured to: after the determining module determines the subframe for the enhanced transmission of the first information, perform the enhanced transmission of the first information in the determined subframe for the enhanced transmission of the first information.

In a first possible implementation manner, according to the tenth aspect, the sending module is configured to: if the first information is a master information block, perform the enhanced transmission of the master information block in at least one radio frame a quantity of times that is greater than one time; if the first information is an SIB including a TDD configuration, perform the enhanced transmission of the SIB in at least two consecutive radio frames a quantity of times that is greater than one time; or if the first information is an SIB including an MBSFN subframe configuration, perform the enhanced transmission of the SIB in the determined subframe for the enhanced transmission of the first information a quantity of times that is at least two times.

In a second possible implementation manner, with reference to the tenth aspect or the first possible implementation manner, for a frequency division duplex FDD system or a half frequency division duplex Half FDD system, the subframe for the enhanced transmission of the first information includes one or more of a subframe 0, a subframe 4, a subframe 5, and a subframe 9; and for a TDD system, the subframe for the enhanced transmission of the first information includes the subframe 0 and/or the subframe 5.

In a third possible implementation manner, with reference to the tenth aspect or the first possible implementation manner or the second possible implementation manner, for the TDD system, if the first information is an SIB including an MBSFN subframe configuration and a subframe 6 is not a special subframe, the subframe for the enhanced transmission of the first information further includes the subframe 6.

In a fourth possible implementation manner, with reference to the tenth aspect or the first possible implementation manner to the third possible implementation manner, the subframe 0 is a subframe 0 in each radio frame in at least one radio frame, or a subframe 0 in each even-numbered radio frame in at least one even-numbered radio frame, or a subframe 0 in each odd-numbered radio frame in at least one odd-numbered radio frame;

the subframe 4 is a subframe 4 in each radio frame in at least one radio frame, or a subframe 4 in each even-numbered radio frame in at least one even-numbered radio frame, or a subframe 4 in each odd-numbered radio frame in at least one odd-numbered radio frame;

the subframe 5 is a subframe 5 in each radio frame in at least one radio frame, or a subframe 5 in each even-numbered radio frame in at least one even-numbered radio frame, or a subframe 5 in each odd-numbered radio frame in at least one odd-numbered radio frame;

the subframe 6 is a subframe 6 in each radio frame in at least one radio frame, or a subframe 6 in each even-numbered radio frame in at least one even-numbered radio frame, or a subframe 6 in each odd-numbered radio frame in at least one odd-numbered radio frame; and the subframe 9 is a subframe 9 in each radio frame in at least one radio frame, or a subframe 9 in each even-numbered radio frame in at least one even-numbered radio frame, or a subframe 9 in each odd-numbered radio frame in at least one odd-numbered radio frame.

In a fifth possible implementation manner, with reference to the tenth aspect or the first possible implementation manner to the fourth possible implementation manner, when the enhanced transmission of the first information is scheduled based on a control channel, additional enhanced transmission of a paging message and/or a random access response message is not performed in the determined subframe for the enhanced transmission of the first information; and when the enhanced transmission of the first information is not scheduled based on a control channel, on a small-bandwidth carrier, the additional enhanced transmission of the paging message and/or the random access response message is not performed in the determined subframe for the enhanced transmission of the first information, where the small-bandwidth carrier includes at least a carrier of 1.4 MHz and/or a carrier of 3 MHz.

In a sixth possible implementation manner, with reference to the tenth aspect or the first possible implementation manner to the fifth possible implementation manner, if the first information is an SIB including a TDD configuration, the enhanced transmission of the first information is after enhanced transmission of a master information block, and a preset first time offset exists between the enhanced transmission of the first information and the enhanced transmission of the master information block; and if the first information is an SIB including an MBSFN subframe configuration, the enhanced transmission of the first information is after enhanced transmission of an SIB including a TDD configuration, and a preset second time offset exists between the enhanced transmission of the first information and the enhanced transmission of the SIB including the TDD configuration.

In a seventh possible implementation manner, with reference to the tenth aspect or the first possible implementation manner to the sixth possible implementation manner, the determining module is further configured to determine a redundancy version RV, in a (rep_index+1)$^{th}$ time of enhanced transmission, of the first information, where RV index=ceil(3/2*{rep_index mod 4})mod 4, ceil(x) is a round-up function, rep_index is a number of a quantity of times of the enhanced transmission of the first information, and mod is a modulo operation; or the RV is determined in an order of 0, 2, 3, and 1 according to an index of a quantity of times of the enhanced transmission.

In an eighth possible implementation manner, with reference to the tenth aspect or the first possible implementation manner to the seventh possible implementation manner, the subframe for the enhanced transmission of the first information includes any one of or a combination of the following:

the subframe for the enhanced transmission of the first information is a subframe in an enhanced transmission opportunity of the first information or a subframe in an enhanced transmission bundle of the first information;

the subframe for the enhanced transmission of the first information is a subframe in at least one radio frame; and the subframe for the enhanced transmission of the first information is a subframe in at least one system information window.

According to an eleventh aspect, an embodiment of the present disclosure further provides an information transmission apparatus, including:

a determining module, configured to determine a subframe for enhanced transmission of first information, where the first information is a master information block, or the first information is an SIB including a TDD configuration, or the first information is an SIB including an MBSFN subframe configuration; and a receiving module, configured to: after the determining module determines the subframe for the enhanced transmission of the first information, receive the first information in the determined subframe for the enhanced transmission of the first information.

In a first possible implementation manner, according to the eleventh aspect, the receiving module is configured to: if the first information is a master information block, receive the master information block in at least one radio frame a quantity of times that is greater than one time; if the first information is an SIB including a TDD configuration, receive the SIB in at least two consecutive radio frames a quantity of times that is greater than one time; or if the first information is an SIB including an MBSFN subframe configuration, receive the SIB in the determined subframe for the enhanced transmission of the first information a quantity of times that is at least two times.

In a second possible implementation manner, with reference to the eleventh aspect or the first possible implementation manner, for an FDD system or a Half FDD system, the subframe for the enhanced transmission of the first information includes one or more of a subframe 0, a subframe 4, a subframe 5, and a subframe 9; and for a TDD system, the subframe for the enhanced transmission of the first information includes the subframe 0 and/or the subframe 5.

In a third possible implementation manner, with reference to the eleventh aspect or the first possible implementation manner or the second possible implementation manner, for the TDD system, if the first information is an SIB including an MBSFN subframe configuration and a subframe 6 is not a special subframe, the subframe for the enhanced transmission of the first information further includes the subframe 6.

In a fourth possible implementation manner, with reference to the eleventh aspect or the first possible implementation manner to the third possible implementation manner, the subframe 0 is a subframe 0 in each radio frame in at least one radio frame, or a subframe 0 in each even-numbered radio frame in at least one even-numbered radio frame, or a subframe 0 in each odd-numbered radio frame in at least one odd-numbered radio frame;

the subframe 4 is a subframe 4 in each radio frame in at least one radio frame, or a subframe 4 in each even-numbered radio frame in at least one even-numbered radio frame, or a subframe 4 in each odd-numbered radio frame in at least one odd-numbered radio frame;

the subframe 5 is a subframe 5 in each radio frame in at least one radio frame, or a subframe 5 in each even-numbered radio frame in at least one even-numbered radio frame, or a subframe 5 in each odd-numbered radio frame in at least one odd-numbered radio frame;

the subframe 6 is a subframe 6 in each radio frame in at least one radio frame, or a subframe 6 in each even-numbered radio frame in at least one even-numbered radio frame, or a subframe 6 in each odd-numbered radio frame in at least one odd-numbered radio frame; and the subframe 9 is a subframe 9 in each radio frame in at least one radio frame, or a subframe 9 in each even-numbered radio frame in at least one even-numbered radio frame, or a subframe 9 in each odd-numbered radio frame in at least one odd-numbered radio frame.

In a fifth possible implementation manner, with reference to the eleventh aspect or the first possible implementation manner to the fourth possible implementation manner, when the enhanced transmission of the first information is scheduled based on a control channel, a paging message and/or a random access response message on which additional enhanced transmission is performed is not received in the determined subframe for the enhanced transmission of the first information; and when the enhanced transmission of the first information is not scheduled based on a control channel, on a small-bandwidth carrier, the paging message and/or the random access response message on which the additional enhanced transmission is performed is not received in the determined subframe for the enhanced transmission of the first information, where the small-bandwidth carrier includes at least a carrier of 1.4 MHz and/or a carrier of 3 MHz.

In a sixth possible implementation manner, with reference to the eleventh aspect or the first possible implementation manner to the fifth possible implementation manner, if the first information is an SIB including a TDD configuration, the receiving of the first information is after receiving of a master information block, and a preset first time offset exists between the receiving of the first information and the receiving of the master information block; and if the first information is an SIB including an MBSFN subframe configuration, the receiving of the first information is after receiving of an SIB including a TDD configuration, and a preset second time offset exists between the receiving of the first information and the receiving of the SIB including the TDD configuration.

In a seventh possible implementation manner, with reference to the eleventh aspect or the first possible implementation manner to the sixth possible implementation manner, the determining module is further configured to determine a redundancy version RV, in a $(rep\_index+1)^{th}$ time of enhanced transmission, of the first information, where RV index=ceil(3/2*{rep_index mod 4})mod 4, ceil(x) is a round-up function, rep_index is a number of a quantity of times of the enhanced transmission of the first information, and mod is a modulo operation; or the RV is determined in an order of 0, 2, 3, and 1 according to an index of a quantity of times of the enhanced transmission.

In an eighth possible implementation manner, with reference to the eleventh aspect or the first possible implementation manner to the seventh possible implementation manner, the subframe for the enhanced transmission of the first information includes any one of or a combination of the following:

the subframe for the enhanced transmission of the first information is a subframe in an enhanced transmission opportunity of the first information or a subframe in an enhanced transmission bundle of the first information;

the subframe for the enhanced transmission of the first information is a subframe in at least one radio frame; and the subframe for the enhanced transmission of the first information is a subframe in at least one system information window.

According to a twelfth aspect, an embodiment of the present disclosure provides a network device, including:

a processor, configured to determine a subframe for enhanced transmission of first information, where the first information is a master information block, or the first information is a system information block SIB including a time division duplex TDD configuration, or the first information is an SIB including a multicast-broadcast single-frequency network MBSFN subframe configuration; and a transmitter, configured to: after the processor determines the subframe for the enhanced transmission of the first information, perform the enhanced transmission of the first information in the determined subframe for the enhanced transmission of the first information.

In a first possible implementation manner, according to the twelfth aspect, the transmitter is configured to: if the first information is a master information block, perform the enhanced transmission of the master information block in at least one radio frame a quantity of times that is greater than one time; if the first information is an SIB including a TDD configuration, perform the enhanced transmission of the SIB in at least two consecutive radio frames a quantity of times that is greater than one time; or if the first information is an SIB including an MBSFN subframe configuration, perform the enhanced transmission of the SIB in the determined subframe for the enhanced transmission of the first information a quantity of times that is at least two times.

In a second possible implementation manner, with reference to the twelfth aspect or the first possible implementation manner, for a frequency division duplex FDD system or a half frequency division duplex Half FDD system, the subframe for the enhanced transmission of the first information includes one or more of a subframe 0, a subframe 4, a subframe 5, and a subframe 9; and for a TDD system, the subframe for the enhanced transmission of the first information includes the subframe 0 and/or the subframe 5.

In a third possible implementation manner, with reference to the twelfth aspect or the first possible implementation manner or the second possible implementation manner, for the TDD system, if the first information is an SIB including an MBSFN subframe configuration and a subframe 6 is not a special subframe, the subframe for the enhanced transmission of the first information further includes the subframe 6.

In a fourth possible implementation manner, with reference to the twelfth aspect or the first possible implementation manner to the third possible implementation manner, the subframe 0 is a subframe 0 in each radio frame in at least one radio frame, or a subframe 0 in each even-numbered radio frame in at least one even-numbered radio frame, or a subframe 0 in each odd-numbered radio frame in at least one odd-numbered radio frame;

the subframe 4 is a subframe 4 in each radio frame in at least one radio frame, or a subframe 4 in each even-numbered radio frame in at least one even-numbered radio frame, or a subframe 4 in each odd-numbered radio frame in at least one odd-numbered radio frame;

the subframe 5 is a subframe 5 in each radio frame in at least one radio frame, or a subframe 5 in each even-numbered radio frame in at least one even-numbered radio frame, or a subframe 5 in each odd-numbered radio frame in at least one odd-numbered radio frame;

the subframe 6 is a subframe 6 in each radio frame in at least one radio frame, or a subframe 6 in each even-numbered radio frame in at least one even-numbered radio frame, or a subframe 6 in each odd-numbered radio frame in at least one odd-numbered radio frame; and the subframe 9 is a subframe 9 in each radio frame in at least one radio frame, or a subframe 9 in each even-numbered radio frame in at least one even-numbered radio frame, or a subframe 9 in each odd-numbered radio frame in at least one odd-numbered radio frame.

In a fifth possible implementation manner, with reference to the twelfth aspect or the first possible implementation manner to the fourth possible implementation manner, when the enhanced transmission of the first information is scheduled based on a control channel, additional enhanced transmission of a paging message and/or a random access response message is not performed in the determined subframe for the enhanced transmission of the first information; and when the enhanced transmission of the first information is not scheduled based on a control channel, on a small-bandwidth carrier, the additional enhanced transmission of the paging message and/or the random access response message is not performed in the determined subframe for the enhanced transmission of the first information, where the small-bandwidth carrier includes at least a carrier of 1.4 MHz and/or a carrier of 3 MHz.

In a sixth possible implementation manner, with reference to the twelfth aspect or the first possible implementation manner to the fifth possible implementation manner, if the first information is an SIB including a TDD configuration, the enhanced transmission of the first information is after enhanced transmission of a master information block, and a preset first time offset exists between the enhanced transmission of the first information and the enhanced transmission of the master information block; and if the first information is an SIB including an MBSFN subframe configuration, the enhanced transmission of the first information is after enhanced transmission of an SIB including a TDD configuration, and a preset second time offset exists between the enhanced transmission of the first information and the enhanced transmission of the SIB including the TDD configuration.

In a seventh possible implementation manner, with reference to the twelfth aspect or the first possible implementation manner to the sixth possible implementation manner, the processor is further configured to determine a redundancy version RV, in a $(rep\_index+1)^{th}$ time of enhanced transmission, of the first information, where RV index=ceil(3/2*{rep_index mod 4})mod 4, ceil(x) is a round-up function, rep_index is a number of a quantity of times of the enhanced transmission of the first information, and mod is a modulo operation; or the RV is determined in an order of 0, 2, 3, and 1 according to an index of a quantity of times of the enhanced transmission.

In an eighth possible implementation manner, with reference to the twelfth aspect or the first possible implementation manner to the seventh possible implementation manner, the subframe for the enhanced transmission of the first information includes any one of or a combination of the following:

the subframe for the enhanced transmission of the first information is a subframe in an enhanced transmission opportunity of the first information or a subframe in an enhanced transmission bundle of the first information;

the subframe for the enhanced transmission of the first information is a subframe in at least one radio frame; and the subframe for the enhanced transmission of the first information is a subframe in at least one system information window.

According to a thirteenth aspect, an embodiment of the present disclosure further provides an information transmission device, including:

a processor, configured to determine a subframe for enhanced transmission of first information, where the first information is a master information block, or the first information is an SIB including a TDD configuration, or the first information is an SIB including an MBSFN subframe configuration; and a receiver, configured to: after the processor determines the subframe for the enhanced transmission of the first information, receive the first information in the determined subframe for the enhanced transmission of the first information.

In a first possible implementation manner, according to the thirteenth aspect, the receiver is configured to: if the first information is a master information block, receive the master information block in at least one radio frame a quantity of times that is greater than one time; if the first information is an SIB including a TDD configuration, receive the SIB in at least two consecutive radio frames a quantity of times that is greater than one time; or if the first information is an SIB including an MBSFN subframe configuration, receive the SIB in the determined subframe for the enhanced transmission of the first information a quantity of times that is at least two times.

In a second possible implementation manner, with reference to the thirteenth aspect or the first possible implementation manner, for an FDD system or a Half FDD system, the subframe for the enhanced transmission of the first information includes one or more of a subframe 0, a subframe 4, a subframe 5, and a subframe 9; and for a TDD system, the subframe for the enhanced transmission of the first information includes the subframe 0 and/or the subframe 5.

In a third possible implementation manner, with reference to the thirteenth aspect or the first possible implementation manner or the second possible implementation manner, for the TDD system, if the first information is an SIB including an MBSFN subframe configuration and a subframe 6 is not a special subframe, the subframe for the enhanced transmission of the first information further includes the subframe 6.

In a fourth possible implementation manner, with reference to the thirteenth aspect or the first possible implementation manner to the third possible implementation manner, the subframe 0 is a subframe 0 in each radio frame in at least one radio frame, or a subframe 0 in each even-numbered radio frame in at least one even-numbered radio frame, or a subframe 0 in each odd-numbered radio frame in at least one odd-numbered radio frame;

the subframe 4 is a subframe 4 in each radio frame in at least one radio frame, or a subframe 4 in each even-numbered radio frame in at least one even-numbered radio frame, or a subframe 4 in each odd-numbered radio frame in at least one odd-numbered radio frame;

the subframe 5 is a subframe 5 in each radio frame in at least one radio frame, or a subframe 5 in each even-numbered radio frame in at least one even-numbered radio frame, or a subframe 5 in each odd-numbered radio frame in at least one odd-numbered radio frame;

the subframe 6 is a subframe 6 in each radio frame in at least one radio frame, or a subframe 6 in each even-numbered radio frame in at least one even-numbered radio frame, or a subframe 6 in each odd-numbered radio frame in at least one odd-numbered radio frame; and the subframe 9 is a subframe 9 in each radio frame in at least one radio frame, or a subframe 9 in each even-numbered radio frame in at least one even-numbered radio frame, or a subframe 9 in each odd-numbered radio frame in at least one odd-numbered radio frame.

In a fifth possible implementation manner, with reference to the thirteenth aspect or the first possible implementation manner to the fourth possible implementation manner, when the enhanced transmission of the first information is scheduled based on a control channel, a paging message and/or a random access response message on which additional enhanced transmission is performed is not received in the determined subframe for the enhanced transmission of the first information; and when the enhanced transmission of the first information is not scheduled based on a control channel, on a small-bandwidth carrier, the paging message and/or the random access response message on which the additional enhanced transmission is performed is not received in the determined subframe for the enhanced transmission of the first information, where the small-bandwidth carrier includes at least a carrier of 1.4 MHz and/or a carrier of 3 MHz.

In a sixth possible implementation manner, with reference to the thirteenth aspect or the first possible implementation manner to the fifth possible implementation manner, if the first information is an SIB including a TDD configuration, the receiving of the first information is after receiving of a master information block, and a preset first time offset exists between the receiving of the first information and the receiving of the master information block; and if the first information is an SIB including an MBSFN subframe configuration, the receiving of the first information is after receiving of an SIB including a TDD configuration, and a preset second time offset exists between the receiving of the first information and the receiving of the SIB including the TDD configuration.

In a seventh possible implementation manner, with reference to the thirteenth aspect or the first possible implementation manner to the sixth possible implementation manner, the processor is further configured to determine a redundancy version RV, in a (rep_index+1)$^{th}$ time of enhanced transmission, of the first information, where RV index=ceil(3/2*{rep_index mod 4})mod 4, ceil(x) is a round-up function, rep_index is a number of a quantity of times of the enhanced transmission of the first information, and mod is a modulo operation; or the RV is determined in an order of 0, 2, 3, and 1 according to an index of a quantity of times of the enhanced transmission.

In an eighth possible implementation manner, with reference to the thirteenth aspect or the first possible implementation manner to the seventh possible implementation manner, the subframe for the enhanced transmission of the first information includes any one of or a combination of the following:

the subframe for the enhanced transmission of the first information is a subframe in an enhanced transmission opportunity of the first information or a subframe in an enhanced transmission bundle of the first information;

the subframe for the enhanced transmission of the first information is a subframe in at least one radio frame; and the subframe for the enhanced transmission of the first information is a subframe in at least one system information window.

According to a fourteenth aspect, an embodiment of the present disclosure provides an information transmission system, including the network device having any feature described above and the information transmission device having any feature described above.

According to the information transmission method, apparatus, and system provided in the embodiments of the present disclosure, a subframe for enhanced transmission of first information is determined, where the first information is a master information block, or the first information is an SIB including a TDD configuration, or the first information is an SIB including an MBSFN subframe configuration, and the enhanced transmission of the first information is performed in the determined subframe for the enhanced transmission of the first information. According to the solutions, the subframe used in the enhanced transmission of the first information can be determined, improving transmission reliability of the first information.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

A network device described in the embodiments of the present disclosure may be a base station, or may be a network device such as a router, a gateway, or a mobility management entity. An information transmission device described in the embodiments of the present disclosure may be user equipment, or may be another device that can be configured to transmit information. The present disclosure sets no limitations thereto. For the present disclosure, specific embodiments of the present disclosure are described by using an example in which the network device is a base station and the information transmission device is user equipment. In addition, enhanced transmission mentioned in the present disclosure may be one or more types of transmission in repeated transmission, spread spectrum transmission, transmission time interval bundling transmission, power increased transmission, or retransmission, which is not limited in the present disclosure.

Embodiment 1

Figure 1:
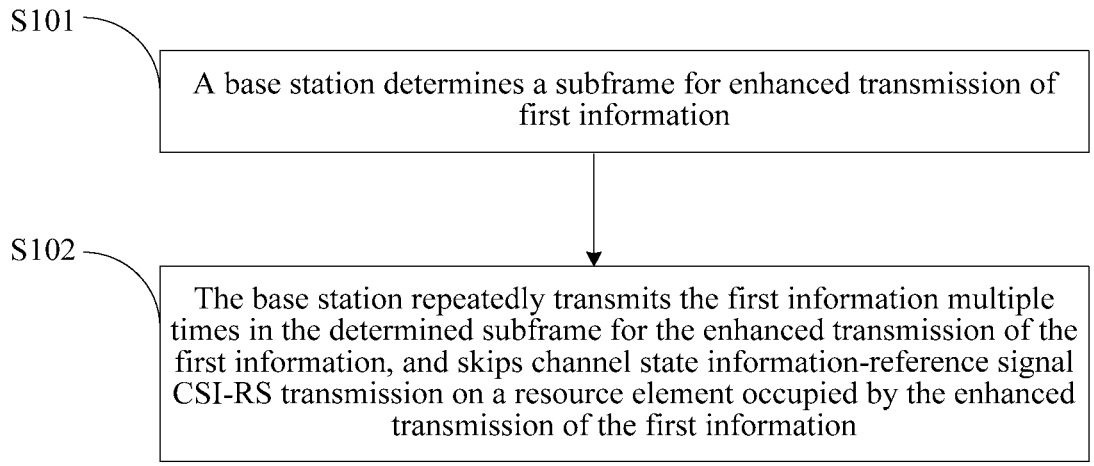
FIG. 1 is a first schematic flowchart of an information transmission method according to Embodiment 1 of the present disclosure.

This embodiment of the present disclosure provides an information transmission method. As shown in FIG. 1, the method includes:

S101: A base station determines a subframe for enhanced transmission of first information.

Coverage enhancement needs to be performed on coverage of an LTE network, so as to ensure that user equipment can reliably communicate with the base station when the user equipment is in a basement or channel quality is poor. In an existing LTE or LTE-A system, a PBCH for carrying one time of transmission of an MIB, a PDCCH for scheduling one time of transmission of an SIB 1, a PDSCH for carrying one time of transmission of the SIB 1, a PDCCH for scheduling one time of transmission of SI, and a PDSCH for carrying one time of transmission of the SI are all transmitted in one subframe. In the existing LTE or LTE-A system, the user equipment performs channel measurement by using a CSI-RS. The base station performs CSI-RS configuration and CSI-RS subframe configuration for the user equipment by using dedicated signaling, so that the user equipment learns which subframes a CSI-RS is transmitted in and also learns a configuration of the CSI-RS.

In the case of coverage enhancement, MIB information may be transmitted multiple times to improve transmission reliability of an MIB, and a PBCH for carrying multiple times of transmission of the MIB may be referred to as an enhanced PBCH. Similarly, control information may be transmitted multiple times to improve transmission reliability of the control information, and a PDCCH for carrying multiple times of transmission of the control information may be referred to as an enhanced PDCCH. Data may be transmitted multiple times to improve transmission reliability of the data, and a PDSCH for carrying multiple times of transmission of the data is referred to as an enhanced PDSCH. The data herein includes, but is not limited to, an SIB 1, SI, another SIB, unicast data, a paging message, a random access response, or other common data. In this case, UE that requires coverage enhancement does not know a CSI-RS configuration and a CSI-RS subframe configuration that are configured by the base station for Normal UE or Legacy UE, where the Normal UE band the Legacy UE both are referred to as normal UE. When the enhanced transmission of the first information is performed, where the first information may be an MIB, control information, or data, if the enhanced transmission of the first information is not limited, CSI-RS transmission may collide with the enhanced transmission of the first information, lowering transmission reliability of the first information.

This embodiment of the present disclosure provides an information transmission method, which can avoid a collision between CSI-RS transmission and enhanced transmission of first information, improving transmission reliability of the first information.

First, the base station determines the subframe for the enhanced transmission of the first information.

Specifically, a method of how the base station determines the subframe for the enhanced transmission of the first information is described in detail in the following embodiments, and details are not described herein.

S102: The base station repeatedly transmits the first information multiple times in the determined subframe for the enhanced transmission of the first information, and skips channel state information-reference signal CSI-RS transmission on a resource element occupied by the enhanced transmission of the first information.

The first information is a master information block MIB, and a quantity of times of repeatedly transmitting the MIB in at least one radio frame is greater than one time; or the first information is a system information block type 1 SIB 1, and a quantity of times of repeatedly transmitting the SIB 1 in at least two consecutive radio frames is greater than one time; or the first information is other system information except an MIB and an SIB 1, unicast data, a paging message, a random access response RAR, a random access contention resolution message, or control information, and a quantity of times of repeatedly transmitting the first information in the determined subframe for the enhanced transmission of the first information is at least two times.

After determining the subframe for the enhanced transmission of the first information, the base station repeatedly transmits the first information multiple times in the determined subframe for the enhanced transmission of the first information, and skips the channel state information-reference signal CSI-RS transmission on the resource element occupied by the enhanced transmission of the first information.

It should be noted that, according to different types of the first information, the base station repeatedly transmits the first information multiple times in the determined subframe for the enhanced transmission of the first information at different frequencies. When the first information is a master information block MIB, a quantity of times of repeatedly sending the MIB in at least one radio frame is greater than one time; or when the first information is a system information block type 1 SIB 1, a quantity of times of repeatedly sending the SIB 1 in at least two consecutive radio frames is greater than one time; or when the first information is system information, unicast data, a paging message, a random access response RAR, a random access contention resolution message, or control information except an MIB and an SIB 1, a quantity of times of repeatedly sending the first information in the determined subframe for the enhanced transmission of the first information is at least two times.

According to the information transmission method provided in this embodiment of the present disclosure, a subframe for enhanced transmission of first information is determined, and the first information is repeatedly transmitted multiple times in the determined subframe for the enhanced transmission of the first information, and CSI-RS transmission is skipped on a resource element occupied by the enhanced transmission of the first information, where the first information is a master information block MIB, and a quantity of times of repeatedly transmitting the MIB in at least one radio frame is greater than one time; or the first information is a system information block type 1 SIB 1, and a quantity of times of repeatedly transmitting the SIB 1 in at least two consecutive radio frames is greater than one time; or the first information is other system information except an MIB and an SIB 1, unicast data, a paging message, a random access response RAR, a random access contention resolution message, or control information, and a quantity of times of repeatedly transmitting the first information in the determined subframe for the enhanced transmission of the first information is at least two times. According to the solution, a collision between the CSI-RS transmission and the enhanced transmission of the first information can be avoided, improving transmission reliability of the first information.

Embodiment 2

Figure 2:
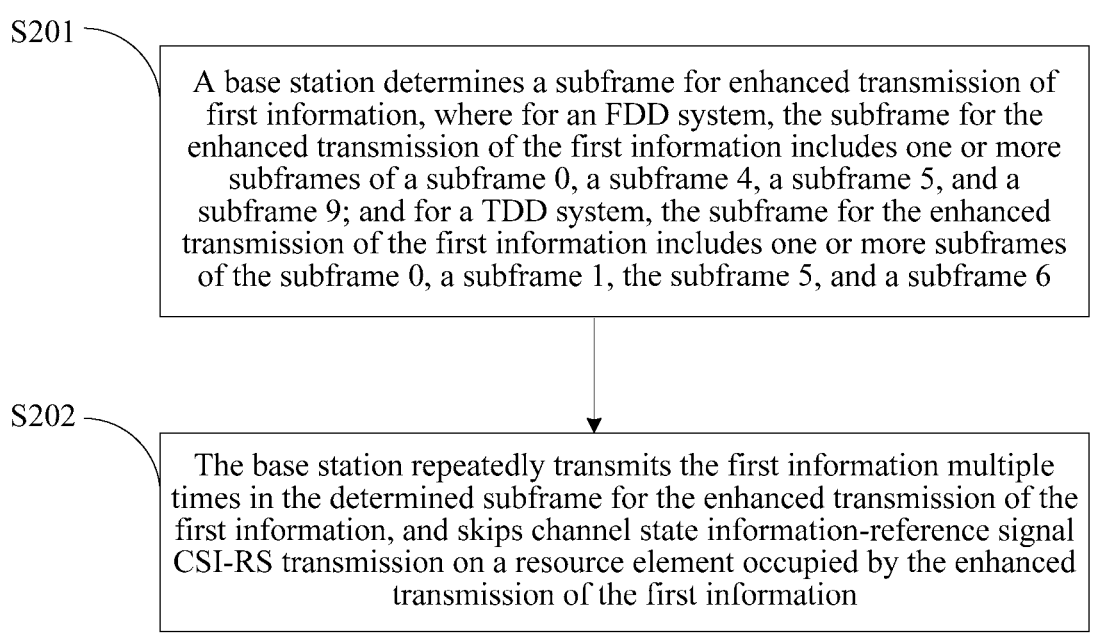
FIG. 2 is a second schematic flowchart of an information transmission method according to Embodiment 2 of the present disclosure.

This embodiment of the present disclosure provides an information transmission method. As shown in FIG. 2, the method includes:

S201: A base station determines a subframe for enhanced transmission of first information, where for an FDD (Frequency Division Duplex, frequency division duplex) system, the subframe for the enhanced transmission of the first information includes one or more subframes of a subframe 0, a subframe 4, a subframe 5, and a subframe 9; and for a TDD (Time Division Duplex, time division duplex) system, the subframe for the enhanced transmission of the first information includes one or more subframes of the subframe 0, a subframe 1, the subframe 5, and a subframe 6.

This embodiment of the present disclosure provides an information transmission method, which can avoid a collision between a subframe for CSI-RS transmission and a subframe for enhanced transmission, improving transmission reliability of first information.

First, the base station determines the subframe for the enhanced transmission of the first information.

CSI-RS transmission cannot be performed in a paging subframe determined in a cell specific paging configuration and a special subframe of the TDD. Similarly, if the CSI-RS transmission collides with transmission of a PBCH, a synchronization channel, or an SIB 1, the CSI-RS transmission cannot be performed in subframes for transmitting the PBCH, the synchronization channel, or the SIB 1, either. Therefore, the base station may choose to determine the subframe for the enhanced transmission of the first information from the foregoing subframes, so as to avoid a collision between the CSI-RS transmission and the enhanced transmission of the first information, improving transmission reliability of the first information.

In an existing LTE or LTE-A system, time-domain resources are divided as radio frames, and the radio frames are numbered 0 to 1023. One radio frame includes 10 subframes, a time length of one subframe is 1 ms, and subframes in each radio frame are numbered 0 to 9.

It should be noted that, for the FDD and TDD systems, a PBCH is transmitted in a subframe 0, and an SIB 1 is transmitted in a subframe 5 in an even-numbered radio frame. For the TDD system, a subframe 1 is surely a special subframe, and a subframe 6 may be a special subframe.

It should be noted that, for a paging message, nB is used for determining a period of a radio frame including a paging subframe, and/or a quantity of paging subframes included in one radio frame. A value of nB is 4T, 2T, T, T/2, T/4, T/8, T/16, or T/32. Therein is a discontinuous receiving period of user equipment. When nB is greater than or equal to T, each radio frame has a paging subframe and each radio frame has nB/T paging subframes. When nB is less than T, one radio frame in every (T/nB) radio frames has a paging subframe, and the radio frame including a paging subframe has only one paging subframe.

Exemplarily, when nB=4T, each radio frame includes four paging subframes; or when nB=T/4, one radio frame in every four radio frames has a paging subframe, and the radio frame including a paging subframe has only one paging subframe.

For the FDD system, if one radio frame includes one paging subframe, the subframe 9 is a paging subframe; if one radio frame includes two paging subframes, the subframe 4 and the subframe 9 are paging subframes; or if one radio frame includes four paging subframes, the subframe 0, the subframe 4, the subframe 5, and the subframe 9 are paging subframes; and for the TDD system, if one radio frame includes one paging subframe, the subframe 0 is a paging subframe; if one radio frame includes two paging subframes, the subframe 0 and the subframe 5 are paging subframes; or if one radio frame includes four paging subframes, the subframe 0, the subframe 1, the subframe 5, and the subframe 6 are paging subframes.

Therefore, this embodiment of the present disclosure provides an information transmission method, where the determining a subframe for enhanced transmission of first information may be:

for the FDD system, the subframe for the enhanced transmission of the first information includes one or more subframes of the subframe 0, the subframe 4, the subframe 5, and the subframe 9; and for the TDD system, the subframe for the enhanced transmission of the first information includes one or more subframes of the subframe 0, the subframe 1, the subframe 5, and the subframe 6.

For the FDD system, the subframe for the enhanced transmission of the first information includes the subframe 9; or the subframe for the enhanced transmission of the first information includes the subframe 4 and the subframe 9; and for the TDD system, the subframe for the enhanced transmission of the first information includes the subframe 0; or the subframe for the enhanced transmission of the first information includes the subframe 0 and the subframe 5.

It should be additionally noted that, the subframe for the enhanced transmission of the first information further includes:

for the FDD system, the subframe for the enhanced transmission of the first information further includes the subframe 0 and/or the subframe 5; and for the TDD system, the subframe for the enhanced transmission of the first information further includes the subframe 1 and/or the subframe 6.

For the FDD system, the subframe for the enhanced transmission of the first information includes the subframe 0, the subframe 4, the subframe 5, and the subframe 9; and for the TDD system, the subframe for the enhanced transmission of the first information includes the subframe 0, the subframe 1, the subframe 5, and the subframe 6.

S202: The base station repeatedly transmits the first information multiple times in the determined subframe for the enhanced transmission of the first information, and skips channel state information-reference signal CSI-RS transmission on a resource element occupied by the enhanced transmission of the first information.

The first information is a master information block MIB, and a quantity of times of repeatedly transmitting the MIB in at least one radio frame is greater than one time; or the first information is a system information block type 1 SIB 1, and a quantity of times of repeatedly transmitting the SIB 1 in at least two consecutive radio frames is greater than one time; or the first information is other system information except an MIB and an SIB 1, unicast data, a paging message, a random access response RAR, a random access contention resolution message, or control information, and a quantity of times of repeatedly transmitting the first information in the determined subframe for the enhanced transmission of the first information is at least two times.

After determining the subframe for the enhanced transmission of the first information, the base station repeatedly transmits the first information multiple times in the determined subframe for the enhanced transmission of the first information, and skips the channel state information-reference signal CSI-RS transmission on the resource element occupied by the enhanced transmission of the first information.

It should be noted that, according to different types of the first information, the base station repeatedly transmits the first information multiple times in the determined subframe for the enhanced transmission of the first information at different frequencies. When the first information is a master information block MIB, a quantity of times of repeatedly sending the MIB in at least one radio frame is greater than one time; or when the first information is a system information block type 1 SIB 1, a quantity of times of repeatedly sending the SIB 1 in at least two consecutive radio frames is greater than one time; or when the first information is system information, unicast data, a paging message, a random access response RAR, a random access contention resolution message, or control information except an MIB and an SIB 1, a quantity of times of repeatedly sending the first information in the determined subframe for the enhanced transmission of the first information is at least two times.

According to the information transmission method provided in this embodiment of the present disclosure, a subframe for enhanced transmission of first information is determined, and the first information is repeatedly transmitted multiple times in the determined subframe for the enhanced transmission of the first information, and CSI-RS transmission is skipped on a resource element occupied by the enhanced transmission of the first information, where the first information is a master information block MIB, and a quantity of times of repeatedly transmitting the MIB in at least one radio frame is greater than one time; or the first information is a system information block type 1 SIB 1, and a quantity of times of repeatedly transmitting the SIB 1 in at least two consecutive radio frames is greater than one time; or the first information is other system information except an MIB and an SIB 1, unicast data, a paging message, a random access response RAR, a random access contention resolution message, or control information, and a quantity of times of repeatedly transmitting the first information in the determined subframe for the enhanced transmission of the first information is at least two times. According to the solution, a collision between the CSI-RS transmission and the enhanced transmission of the first information can be avoided, improving transmission reliability of the first information.

Embodiment 3

Figure 3:
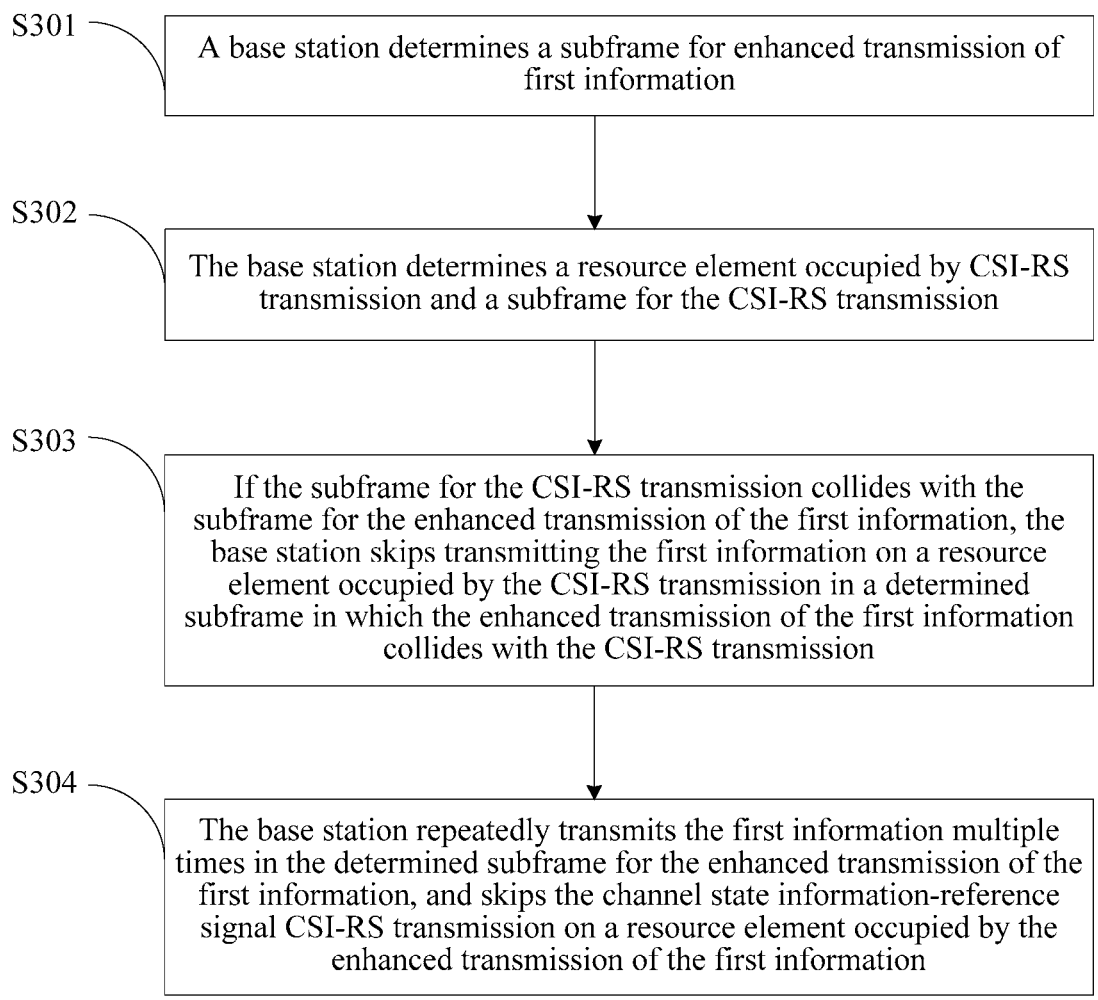
FIG. 3 is a third schematic flowchart of an information transmission method according to Embodiment 3 of the present disclosure.

This embodiment of the present disclosure provides an information transmission method. As shown in FIG. 3, the method includes:

S301: A base station determines a subframe for enhanced transmission of first information.

This embodiment of the present disclosure provides an information transmission method, which can avoid a collision between CSI-RS transmission and enhanced transmission of first information, improving transmission reliability of the first information.

First, the base station determines the subframe for the enhanced transmission of the first information.

S302: The base station determines a resource element occupied by CSI-RS transmission and a subframe for the CSI-RS transmission.

After the base station determines the subframe for the enhanced transmission of the first information, the base station needs to determine the resource element occupied by the CSI-RS transmission and the subframe for the CSI-RS transmission.

Figure 4:
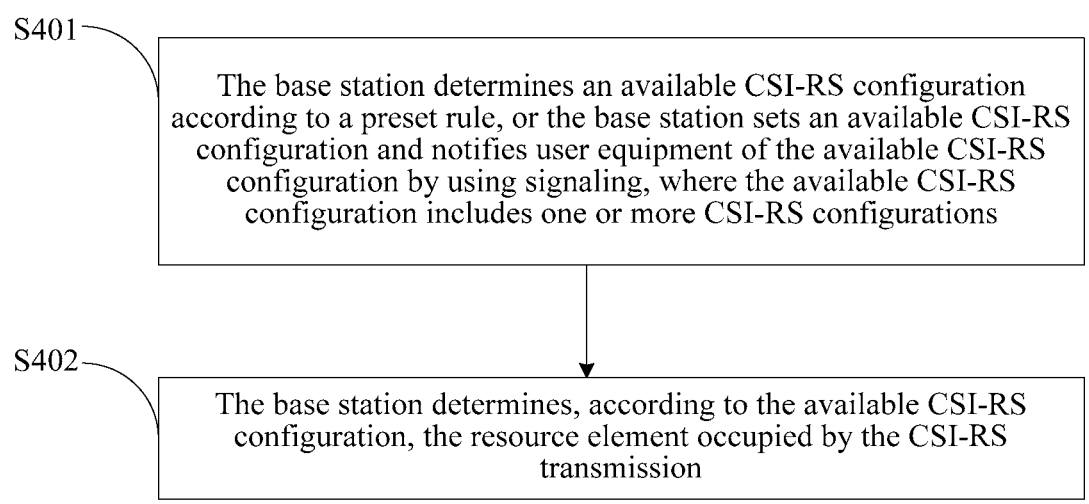
FIG. 4 is a schematic flowchart of determining, by a base station, a resource element occupied by CSI-RS transmission according to Embodiment 3 of the present disclosure.

A method of determining, by the base station, a resource element occupied by CSI-RS transmission is as shown in FIG. 4, and includes:

S401: The base station determines an available CSI-RS configuration according to a preset rule, or the base station sets an available CSI-RS configuration and notifies user equipment of the available CSI-RS configuration by using signaling, where the available CSI-RS configuration includes one or more CSI-RS configurations.

It should be noted that, there are two methods for the base station to determine an available CSI-RS configuration. If a system or a standard presets an available CSI-RS configuration, the base station determines an available CSI-RS configuration according to a preset rule. If the system or the standard does not preset an available CSI-RS configuration, the base station autonomously sets an available CSI-RS configuration, and notifies the user equipment of the set available CSI-RS configuration by using signaling.

The available CSI-RS configuration includes one or more CSI-RS configurations.

S402: The base station determines, according to the available CSI-RS configuration, the resource element occupied by the CSI-RS transmission.

After determining the available CSI-RS configuration, the base station determines, according to the available CSI-RS configuration, the resource element occupied by the CSI-RS transmission.

The method described in the present disclosure of determining, by the base station, a resource element occupied by CSI-RS transmission is also applicable in the following embodiments, and is not described in the following embodiments again.

Figure 5:
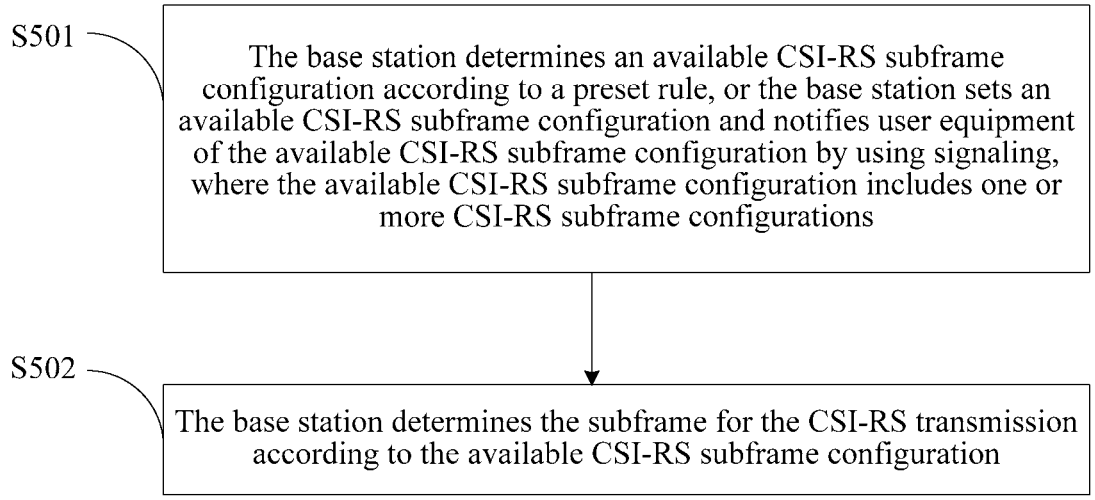
FIG. 5 is a schematic flowchart of determining, by a base station, a subframe for CSI-RS transmission according to Embodiment 3 of the present disclosure.

A method of determining, by the base station, a subframe for the CSI-RS transmission is as shown in FIG. 5, and includes:

S501: The base station determines an available CSI-RS subframe configuration according to a preset rule, or the base station sets an available CSI-RS subframe configuration and notifies user equipment of the available CSI-RS subframe configuration by using signaling, where the available CSI-RS subframe configuration includes one or more CSI-RS subframe configurations.

It should be noted that, there are two methods for the base station to determine an available CSI-RS subframe configuration. If a system or a standard presets an available CSI-RS subframe configuration, the base station determines an available CSI-RS subframe configuration according to a preset rule. If the system or the standard does not preset an available CSI-RS subframe configuration, the base station autonomously sets an available CSI-RS subframe configuration, and notifies the user equipment of the set available CSI-RS subframe configuration by using signaling.

The available CSI-RS subframe configuration includes one or more CSI-RS subframe configurations.

S502: The base station determines the subframe for the CSI-RS transmission according to the available CSI-RS subframe configuration.

After determining the available CSI-RS subframe configuration, the base station determines the subframe for the CSI-RS transmission according to the available CSI-RS subframe configuration.

The method described in the present disclosure of determining, by the base station, a subframe for the CSI-RS transmission is also applicable in the following embodiments, and is not described in the following embodiments again.

It should be noted that, the signaling mentioned in steps S401, S402, S501, and S502 includes:

an MIB, a system information block SIB, Radio Resource Control RRC common signaling, RRC dedicated signaling, Media Access Control MAC signaling, or physical layer signaling.

S303: If the subframe for the CSI-RS transmission collides with the subframe for the enhanced transmission of the first information, the base station skips transmitting the first information on the resource element occupied by the CSI-RS transmission in the determined subframe in which the enhanced transmission of the first information collides with the CSI-RS transmission.

After the base station determines the resource element occupied by the CSI-RS transmission and the subframe for the CSI-RS transmission, if the CSI-RS transmission is performed in the determined subframe for the enhanced transmission of the first information, that is, the subframe for the CSI-RS transmission collides with the subframe for the enhanced transmission of the first information, the base station skips performing multiple times of repeatedly transmitting the first information on the resource element occupied by the CSI-RS transmission in the determined subframe in which the enhanced transmission of the first information collides with the CSI-RS transmission, thereby avoiding a collision between the CSI-RS transmission and the enhanced transmission of the first information.

S304: The base station repeatedly transmits the first information multiple times in the determined subframe for the enhanced transmission of the first information, and skips the channel state information-reference signal CSI-RS transmission on a resource element occupied by the enhanced transmission of the first information.

The first information is a master information block MIB, and a quantity of times of repeatedly transmitting the MIB in at least one radio frame is greater than one time; or the first information is a system information block type 1 SIB 1, and a quantity of times of repeatedly transmitting the SIB 1 in at least two consecutive radio frames is greater than one time; or the first information is other system information except an MIB and an SIB 1, unicast data, a paging message, a random access response RAR, a random access contention resolution message, or control information, and a quantity of times of repeatedly transmitting the first information in the determined subframe for the enhanced transmission of the first information is at least two times.

After determining the subframe for the enhanced transmission of the first information, the base station repeatedly transmits the first information multiple times in the determined subframe for the enhanced transmission of the first information, and skips the channel state information-reference signal CSI-RS transmission on the resource element occupied by the enhanced transmission of the first information.

It should be noted that, according to different types of the first information, the base station repeatedly transmits the first information multiple times in the determined subframe for the enhanced transmission of the first information at different frequencies. When the first information is a master information block MIB, a quantity of times of repeatedly sending the MIB in at least one radio frame is greater than one time; or when the first information is a system information block type 1 SIB 1, a quantity of times of repeatedly sending the SIB 1 in at least two consecutive radio frames is greater than one time; or when the first information is system information, unicast data, a paging message, a random access response RAR, a random access contention resolution message, or control information except an MIB and an SIB 1, a quantity of times of repeatedly sending the first information in the determined subframe for the enhanced transmission of the first information is at least two times.

According to the information transmission method provided in this embodiment of the present disclosure, a subframe for enhanced transmission of first information is determined, and the first information is repeatedly transmitted multiple times in the determined subframe for the enhanced transmission of the first information, and CSI-RS transmission is skipped on a resource element occupied by the enhanced transmission of the first information, where the first information is a master information block MIB, and a quantity of times of repeatedly transmitting the MIB in at least one radio frame is greater than one time; or the first information is a system information block type 1 SIB 1, and a quantity of times of repeatedly transmitting the SIB 1 in at least two consecutive radio frames is greater than one time; or the first information is other system information except an MIB and an SIB 1, unicast data, a paging message, a random access response RAR, a random access contention resolution message, or control information, and a quantity of times of repeatedly transmitting the first information in the determined subframe for the enhanced transmission of the first information is at least two times. According to the solution, a collision between the CSI-RS transmission and the enhanced transmission of the first information can be avoided, improving transmission reliability of the first information.

Embodiment 4

Figure 6:
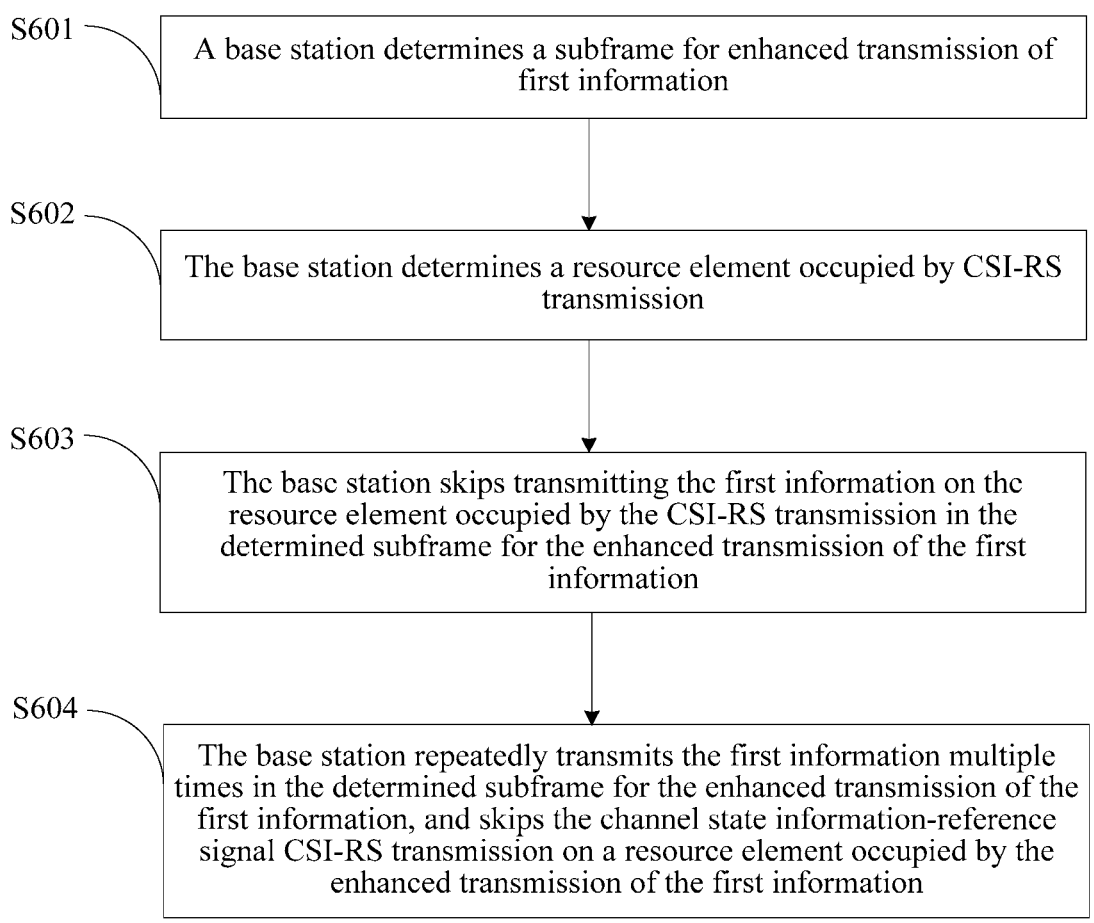
FIG. 6 is a fourth schematic flowchart of an information transmission method according to Embodiment 4 of the present disclosure.

This embodiment of the present disclosure provides an information transmission method. As shown in FIG. 6, the method includes:

S601: A base station determines a subframe for enhanced transmission of first information.

This embodiment of the present disclosure provides an information transmission method, which can avoid a collision between CSI-RS transmission and enhanced transmission of first information, improving transmission reliability of the first information.

First, the base station determines the subframe for the enhanced transmission of the first information.

S602: The base station determines a resource element occupied by CSI-RS transmission.

After the base station determines the subframe for the enhanced transmission of the first information, the base station needs to determine the resource element occupied by the CSI-RS transmission.

S603: The base station skips transmitting the first information on the resource element occupied by the CSI-RS transmission in the determined subframe for the enhanced transmission of the first information.

After determining the resource element occupied by the CSI-RS transmission, the base station skips performing multiple times of repeatedly transmitting the first information on the resource element occupied by the CSI-RS transmission in the determined subframe for the enhanced transmission of the first information, thereby avoiding a collision between the CSI-RS transmission and the enhanced transmission of the first information.

S604: The base station repeatedly transmits the first information multiple times in the determined subframe for the enhanced transmission of the first information, and skips the channel state information-reference signal CSI-RS transmission on a resource element occupied by the enhanced transmission of the first information.

The first information is a master information block MIB, and a quantity of times of repeatedly transmitting the MIB in at least one radio frame is greater than one time; or the first information is a system information block type 1 SIB 1, and a quantity of times of repeatedly transmitting the SIB 1 in at least two consecutive radio frames is greater than one time; or the first information is other system information except an MIB and an SIB 1, unicast data, a paging message, a random access response RAR, a random access contention resolution message, or control information, and a quantity of times of repeatedly transmitting the first information in the determined subframe for the enhanced transmission of the first information is at least two times.

After determining the subframe for the enhanced transmission of the first information, the base station repeatedly transmits the first information multiple times in the determined subframe for the enhanced transmission of the first information, and skips the channel state information-reference signal CSI-RS transmission on the resource element occupied by the enhanced transmission of the first information.

It should be noted that, according to different types of the first information, the base station repeatedly transmits the first information multiple times in the determined subframe for the enhanced transmission of the first information at different frequencies. When the first information is a master information block MIB, a quantity of times of repeatedly sending the MIB in at least one radio frame is greater than one time; or when the first information is a system information block type 1 SIB 1, a quantity of times of repeatedly sending the SIB 1 in at least two consecutive radio frames is greater than one time; or when the first information is system information, unicast data, a paging message, a random access response RAR, a random access contention resolution message, or control information except an MIB and an SIB 1, a quantity of times of repeatedly sending the first information in the determined subframe for the enhanced transmission of the first information is at least two times.

According to the information transmission method provided in this embodiment of the present disclosure, a subframe for enhanced transmission of first information is determined, and the first information is repeatedly transmitted multiple times in the determined subframe for the enhanced transmission of the first information, and CSI-RS transmission is skipped on a resource element occupied by the enhanced transmission of the first information, where the first information is a master information block MIB, and a quantity of times of repeatedly transmitting the MIB in at least one radio frame is greater than one time; or the first information is a system information block type 1 SIB 1, and a quantity of times of repeatedly transmitting the SIB 1 in at least two consecutive radio frames is greater than one time; or the first information is other system information except an MIB and an SIB 1, unicast data, a paging message, a random access response RAR, a random access contention resolution message, or control information, and a quantity of times of repeatedly transmitting the first information in the determined subframe for the enhanced transmission of the first information is at least two times. According to the solution, a collision between the CSI-RS transmission and the enhanced transmission of the first information can be avoided, improving transmission reliability of the first information.

Embodiment 5

Figure 7:
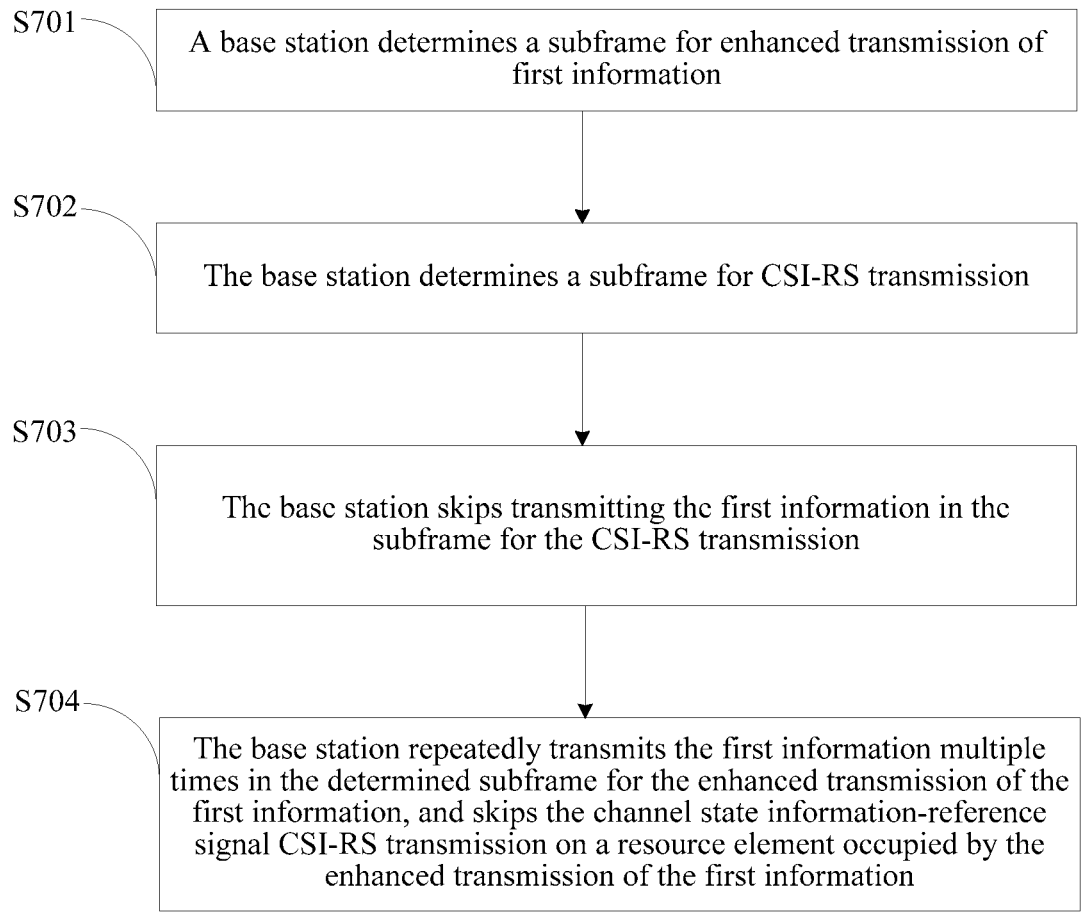
FIG. 7 is a fifth schematic flowchart of an information transmission method according to Embodiment 5 of the present disclosure.

This embodiment of the present disclosure provides an information transmission method. As shown in FIG. 7, the method includes:

S701: A base station determines a subframe for enhanced transmission of first information.

This embodiment of the present disclosure provides an information transmission method, which can avoid a collision between CSI-RS transmission and enhanced transmission of first information, improving transmission reliability of the first information.

First, the base station determines the subframe for the enhanced transmission of the first information.

S702: The base station determines a subframe for CSI-RS transmission.

After the base station determines the subframe for the enhanced transmission of the first information, the base station needs to determine the subframe for the CSI-RS transmission.

S703: The base station skips transmitting the first information in the subframe for the CSI-RS transmission.

After determining the subframe for the CSI-RS transmission, the base station skips performing multiple times of repeatedly transmitting the first information in the subframe for the CSI-RS transmission, thereby avoiding a collision between the CSI-RS transmission and the enhanced transmission of the first information.

S704: The base station repeatedly transmits the first information multiple times in the determined subframe for the enhanced transmission of the first information, and skips the channel state information-reference signal CSI-RS transmission on a resource element occupied by the enhanced transmission of the first information.

The first information is a master information block MIB, and a quantity of times of repeatedly transmitting the MIB in at least one radio frame is greater than one time; or the first information is a system information block type 1 SIB 1, and a quantity of times of repeatedly transmitting the SIB 1 in at least two consecutive radio frames is greater than one time; or the first information is other system information except an MIB and an SIB 1, unicast data, a paging message, a random access response RAR, a random access contention resolution message, or control information, and a quantity of times of repeatedly transmitting the first information in the determined subframe for the enhanced transmission of the first information is at least two times.

After determining the subframe for the enhanced transmission of the first information, the base station repeatedly transmits the first information multiple times in the determined subframe for the enhanced transmission of the first information, and skips the channel state information-reference signal CSI-RS transmission on the resource element occupied by the enhanced transmission of the first information.

It should be noted that, according to different types of the first information, the base station repeatedly transmits the first information multiple times in the determined subframe for the enhanced transmission of the first information at different frequencies. When the first information is a master information block MIB, a quantity of times of repeatedly sending the MIB in at least one radio frame is greater than one time; or when the first information is a system information block type 1 SIB 1, a quantity of times of repeatedly sending the SIB 1 in at least two consecutive radio frames is greater than one time; or when the first information is system information, unicast data, a paging message, a random access response RAR, a random access contention resolution message, or control information except an MIB and an SIB 1, a quantity of times of repeatedly sending the first information in the determined subframe for the enhanced transmission of the first information is at least two times.

According to the information transmission method provided in this embodiment of the present disclosure, a subframe for enhanced transmission of first information is determined, and the first information is repeatedly transmitted multiple times in the determined subframe for the enhanced transmission of the first information, and CSI-RS transmission is skipped on a resource element occupied by the enhanced transmission of the first information, where the first information is a master information block MIB, and a quantity of times of repeatedly transmitting the MIB in at least one radio frame is greater than one time; or the first information is a system information block type 1 SIB 1, and a quantity of times of repeatedly transmitting the SIB 1 in at least two consecutive radio frames is greater than one time; or the first information is other system information except an MIB and an SIB 1, unicast data, a paging message, a random access response RAR, a random access contention resolution message, or control information, and a quantity of times of repeatedly transmitting the first information in the determined subframe for the enhanced transmission of the first information is at least two times. According to the solution, a collision between the CSI-RS transmission and the enhanced transmission of the first information can be avoided, improving transmission reliability of the first information.

Embodiment 6

Figure 8:
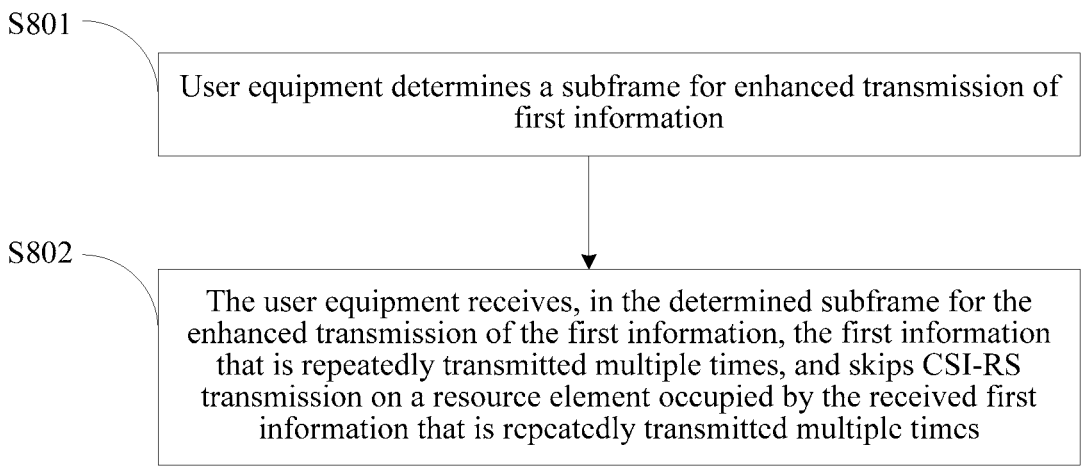
FIG. 8 is a first schematic flowchart of another information transmission method according to Embodiment 6 of the present disclosure.

This embodiment of the present disclosure provides another information transmission method. As shown in FIG. 8, the method includes:

S801: User equipment determines a subframe for enhanced transmission of first information.

Coverage enhancement needs to be performed on coverage of an LTE network, so as to ensure that the user equipment can reliably communicate with a base station when the user equipment is in a basement or channel quality is poor. In an existing LTE or LTE-A system, a PBCH for carrying one time of transmission of an MIB, a PDCCH for scheduling one time of transmission of an SIB 1, a PDSCH for carrying one time of transmission of the SIB 1, a PDCCH for scheduling one time of transmission of SI, and a PDSCH for carrying one time of transmission of the SI are all transmitted in one subframe. In the existing LTE or LTE-A system, the user equipment may perform channel measurement by using a CSI-RS. The base station performs CSI-RS configuration and CSI-RS subframe configuration for the user equipment by using dedicated signaling, so that the user equipment learns which subframes a CSI-RS is transmitted in and also learns a configuration of the CSI-RS.

In the case of coverage enhancement, MIB information may be transmitted multiple times to improve transmission reliability of an MIB, and a PBCH for carrying multiple times of transmission of the MIB may be referred to as an enhanced PBCH. Similarly, control information may be transmitted multiple times to improve transmission reliability of the control information, and a PDCCH for carrying multiple times of transmission of the control information may be referred to as an enhanced PDCCH. Data may be transmitted multiple times to improve transmission reliability of the data, and a PDSCH for carrying multiple times of transmission of the data is referred to as an enhanced PDSCH. The data herein includes, but is not limited to, an SIB 1, SI, another SIB, unicast data, a paging message, a random access response, or other common data. In this case, UE that requires coverage enhancement does not know a CSI-RS configuration and a CSI-RS subframe configuration that are configured by the base station for Normal UE or Legacy UE, where the Normal UE band the Legacy UE both are referred to as normal UE. When the enhanced transmission of the first information is performed, where the first information may be an MIB, control information, or data, if the enhanced transmission of the first information is not limited, CSI-RS transmission may collide with the enhanced transmission of the first information, lowering transmission reliability of the first information.

This embodiment of the present disclosure provides an information transmission method, which can avoid a collision between CSI-RS transmission and enhanced transmission of first information, improving transmission reliability of the first information.

First, the user equipment determines the subframe for the enhanced transmission of the first information.

a method of how the user equipment determines the subframe for the enhanced transmission of the first information is described in detail in the following embodiments, and details are not described herein.

S802: The user equipment receives, in the determined subframe for the enhanced transmission of the first information, the first information that is repeatedly transmitted multiple times, and skips CSI-RS transmission on a resource element occupied by the received first information that is repeatedly transmitted multiple times.

The first information is an MIB, and a quantity of times of receiving the repeatedly transmitted MIB in at least one radio frame is greater than one time; or the first information is an SIB 1, and a quantity of times of receiving the repeatedly transmitted SIB 1 in at least two consecutive radio frames is greater than one time; or the first information is other system information except an MIB and an SIB 1, unicast data, a paging message, a random access response RAR, a random access contention resolution message, or control information, and a quantity of times of receiving the repeatedly transmitted first information in the determined subframe for the enhanced transmission of the first information is at least two times.

After determining the subframe for the enhanced transmission of the first information, the user equipment receives, in the determined subframe for the enhanced transmission of the first information, the first information that is repeatedly transmitted multiple times, and skips the CSI-RS transmission on the resource element occupied by the received first information.

It should be noted that, according to different types of the first information, the user equipment receives, at different frequencies in the determined subframe for the enhanced transmission of the first information, the first information that is repeatedly transmitted multiple times. When the first information is an MIB, a quantity of times of repeated receiving of the MIB in at least one radio frame is greater than one time; or when the first information is an SIB 1, a quantity of times of repeated receiving of the SIB 1 in at least two consecutive radio frames is greater than one time; or when the first information is other system information except an MIB and an SIB 1, unicast data, a paging message, a random access response RAR, a random access contention resolution message, or control information, a quantity of times of repeated receiving of the first information in the determined subframe for the enhanced transmission of the first information is at least two times.

It should be noted that, according to the information transmission method provided in this embodiment of the present disclosure, after the user equipment receives, in the determined subframe for the enhanced transmission of the first information, the first information that is repeatedly transmitted multiple times, the user equipment can further combine the received first information that is repeatedly transmitted multiple times, and detect the combined first information.

According to the information transmission method provided in this embodiment of the present disclosure, a subframe for enhanced transmission of first information is determined, and the first information repeatedly transmitted multiple times is received in the determined subframe for the enhanced transmission of the first information, and CSI-RS transmission is skipped on a resource element occupied by the first information that is repeatedly transmitted multiple times, where the first information is an MIB, and a quantity of times of receiving the repeatedly transmitted MIB in at least one radio frame is greater than one time; or the first information is an SIB 1, and a quantity of times of receiving the repeatedly transmitted SIB 1 in at least two consecutive radio frames is greater than one time; or the first information is other system information except an MIB and an SIB 1, unicast data, a paging message, a random access response RAR, a random access contention resolution message, or control information, and a quantity of times of receiving the repeatedly transmitted first information in the determined subframe for the enhanced transmission of the first information is at least two times. According to the solution, a collision between the CSI-RS transmission and the enhanced transmission of the first information can be avoided, improving transmission reliability of the first information.

Embodiment 7

Figure 9:
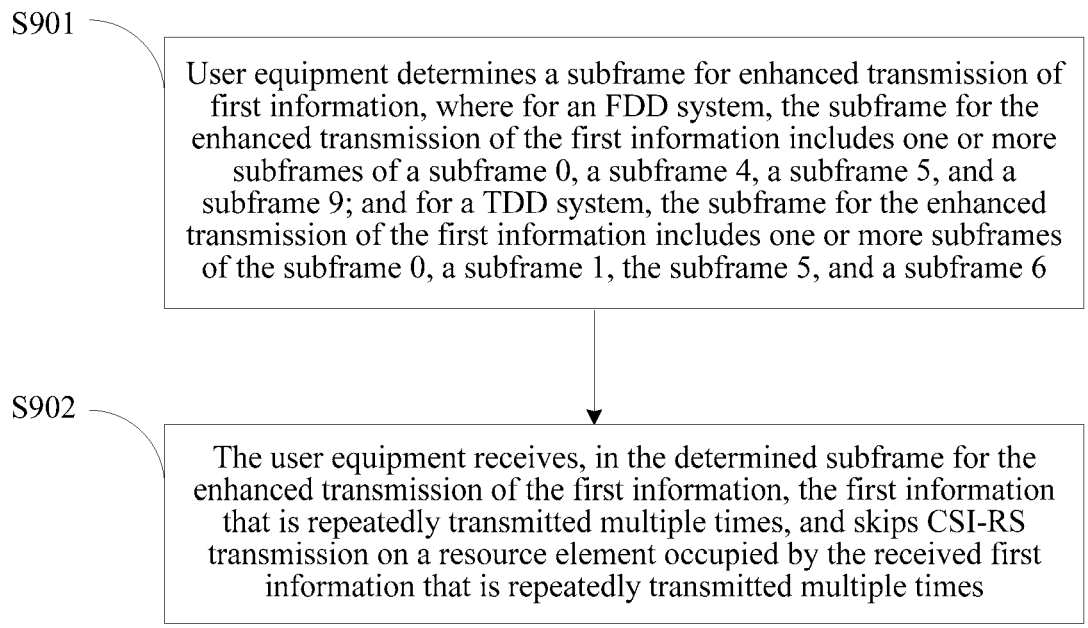
FIG. 9 is a second schematic flowchart of another information transmission method according to Embodiment 7 of the present disclosure.

This embodiment of the present disclosure provides another information transmission method. As shown in FIG. 9, the method includes:

S901: User equipment determines a subframe for enhanced transmission of first information, where for an FDD system, the subframe for the enhanced transmission of the first information includes one or more subframes of a subframe 0, a subframe 4, a subframe 5, and a subframe 9; and for a TDD system, the subframe for the enhanced transmission of the first information includes one or more subframes of the subframe 0, a subframe 1, the subframe 5, and a subframe 6.

This embodiment of the present disclosure provides an information transmission method, which can avoid a collision between a subframe for CSI-RS transmission and a subframe for enhanced transmission, improving transmission reliability of first information.

First, the user equipment determines the subframe for the enhanced transmission of the first information.

CSI-RS transmission cannot be performed in a paging subframe determined in a cell specific paging configuration and a special subframe of the TDD. Similarly, if the CSI-RS transmission collides with transmission of a PBCH, a synchronization channel, or an SIB 1, the CSI-RS transmission cannot be performed in subframes for transmitting the PBCH, the synchronization channel, or the SIB 1, either. Therefore, the user equipment may choose to determine the subframe for the enhanced transmission of the first information from the foregoing subframes, so as to avoid a collision between the CSI-RS transmission and the enhanced transmission of the first information, improving transmission reliability of the first information.

In an existing LTE or LTE-A system, time-domain resources are divided as radio frames, and the radio frames are numbered 0 to 1023. One radio frame includes 10 subframes, a time length of one subframe is 1 ms, and subframes in each radio frame are numbered 0 to 9.

It should be noted that, for the FDD and TDD systems, a PBCH is transmitted in a subframe 0, and an SIB 1 is transmitted in a subframe 5 in an even-numbered radio frame; and for the TDD system, a subframe 1 is surely a special subframe, and a subframe 6 may be a special subframe.

It should be noted that, for a paging message, nB is used for determining a period of a radio frame including a paging subframe, and/or a quantity of paging subframes included in one radio frame. A value of nB is 4T, 2T, T, T/2, T/4, T/8, T/16, or T/32. Therein is a discontinuous receiving period of the user equipment. When nB is greater than or equal to T, each radio frame has a paging subframe and each radio frame has nB/T paging subframes. When nB is less than T, one radio frame in every (T/nB) radio frames has a paging subframe, and the radio frame including a paging subframe has only one paging subframe.

Exemplarily, when nB=4T, each radio frame includes four paging subframes; or when nB=T/4, one radio frame in every four radio frames has a paging subframe, and the radio frame including a paging subframe has only one paging subframe.

For the FDD system, if one radio frame includes one paging subframe, the subframe 9 is a paging subframe; if one radio frame includes two paging subframes, the subframe 4 and the subframe 9 are paging subframes; or if one radio frame includes four paging subframes, the subframe 0, the subframe 4, the subframe 5, and the subframe 9 are paging subframes; and for the TDD system, if one radio frame includes one paging subframe, the subframe 0 is a paging subframe; if one radio frame includes two paging subframes, the subframe 0 and the subframe 5 are paging subframes; or if one radio frame includes four paging subframes, the subframe 0, the subframe 1, the subframe 5, and the subframe 6 are paging subframes.

Therefore, this embodiment of the present disclosure provides an information transmission method, where the determining a subframe for enhanced transmission of first information may be:

for the FDD system, the subframe for the enhanced transmission of the first information includes one or more subframes of the subframe 0, the subframe 4, the subframe 5, and the subframe 9; and for the TDD system, the subframe for the enhanced transmission of the first information includes one or more subframes of the subframe 0, the subframe 1, the subframe 5, and the subframe 6.

For the FDD system, the subframe for the enhanced transmission of the first information includes the subframe 9; or the subframe for the enhanced transmission of the first information includes the subframe 4 and the subframe 9; and for the TDD system, the subframe for the enhanced transmission of the first information includes the subframe 0; or the subframe for the enhanced transmission of the first information includes the subframe 0 and the subframe 5.

It should be additionally noted that, the subframe for the enhanced transmission of the first information further includes:

for the FDD system, the subframe for the enhanced transmission of the first information further includes the subframe 0 and/or the subframe 5; and for the TDD system, the subframe for the enhanced transmission of the first information further includes the subframe 1 and/or the subframe 6.

For the FDD system, the subframe for the enhanced transmission of the first information includes the subframe 0, the subframe 4, the subframe 5, and the subframe 9; and for the TDD system, the subframe for the enhanced transmission of the first information includes the subframe 0, the subframe 1, the subframe 5, and the subframe 6.

S902: The user equipment receives, in the determined subframe for the enhanced transmission of the first information, the first information that is repeatedly transmitted multiple times, and skips CSI-RS transmission on a resource element occupied by the received first information that is repeatedly transmitted multiple times.

The first information is an MIB, and a quantity of times of receiving the repeatedly transmitted MIB in at least one radio frame is greater than one time; or the first information is an SIB 1, and a quantity of times of receiving the repeatedly transmitted SIB 1 in at least two consecutive radio frames is greater than one time; or the first information is other system information except an MIB and an SIB 1, unicast data, a paging message, a random access response RAR, a random access contention resolution message, or control information, and a quantity of times of receiving the repeatedly transmitted first information in the determined subframe for the enhanced transmission of the first information is at least two times.

After determining the subframe for the enhanced transmission of the first information, the user equipment receives, in the determined subframe for the enhanced transmission of the first information, the first information that is repeatedly transmitted multiple times, and skips the CSI-RS transmission on the resource element occupied by the received first information.

It should be noted that, according to different types of the first information, the user equipment receives, at different frequencies in the determined subframe for the enhanced transmission of the first information, the first information that is repeatedly transmitted multiple times. When the first information is an MIB, a quantity of times of repeated receiving of the MIB in at least one radio frame is greater than one time; or when the first information is an SIB 1, a quantity of times of repeated receiving of the SIB 1 in at least two consecutive radio frames is greater than one time; or when the first information is system information, unicast data, a paging message, a random access response RAR, a random access contention resolution message, or control information except an MIB and an SIB 1, a quantity of times of repeated receiving of the first information in the determined subframe for the enhanced transmission of the first information is at least two times.

It should be noted that, according to the information transmission method provided in this embodiment of the present disclosure, after the user equipment receives, in the determined subframe for the enhanced transmission of the first information, the first information that is repeatedly transmitted multiple times, the user equipment can further combine and detect the received first information that is repeatedly transmitted multiple times, improving detection reliability of the first information.

According to the information transmission method provided in this embodiment of the present disclosure, a subframe for enhanced transmission of first information is determined, and the first information repeatedly transmitted multiple times is received in the determined subframe for the enhanced transmission of the first information, and CSI-RS transmission is skipped on a resource element occupied by the first information that is repeatedly transmitted multiple times, where the first information is an MIB, and a quantity of times of receiving the repeatedly transmitted MIB in at least one radio frame is greater than one time; or the first information is an SIB 1, and a quantity of times of receiving the repeatedly transmitted SIB 1 in at least two consecutive radio frames is greater than one time; or the first information is other system information except an MIB and an SIB 1, unicast data, a paging message, a random access response RAR, a random access contention resolution message, or control information, and a quantity of times of receiving the repeatedly transmitted first information in the determined subframe for the enhanced transmission of the first information is at least two times. According to the solution, a collision between the CSI-RS transmission and the enhanced transmission of the first information can be avoided, improving transmission reliability of the first information.

Embodiment 8

Figure 10:
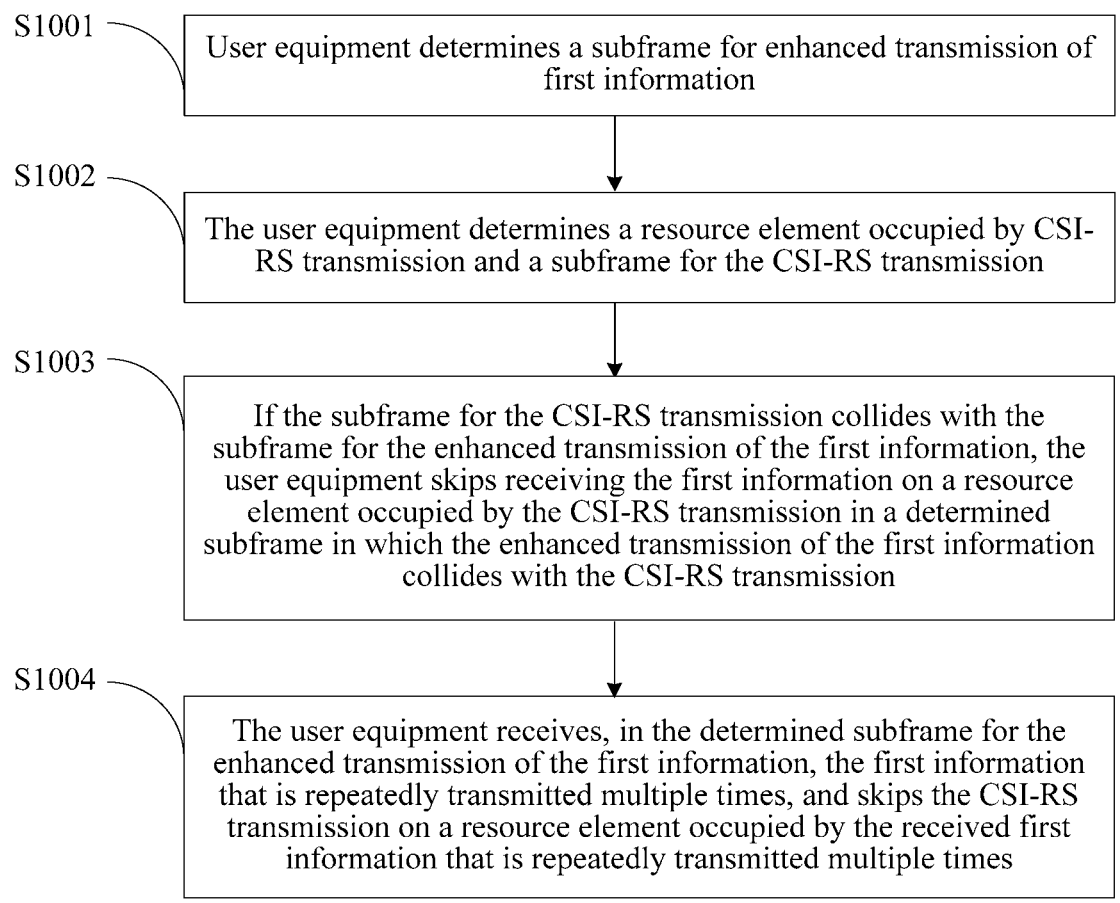
FIG. 10 is a third schematic flowchart of another information transmission method according to Embodiment 8 of the present disclosure.

This embodiment of the present disclosure provides another information transmission method. As shown in FIG. 10, the method includes:

S1001: User equipment determines a subframe for enhanced transmission of first information.

This embodiment of the present disclosure provides an information transmission method, which can avoid a collision between CSI-RS transmission and enhanced transmission of first information, improving transmission reliability of the first information.

First, the user equipment determines the subframe for the enhanced transmission of the first information.

S1002: The user equipment determines a resource element occupied by CSI-RS transmission and a subframe for the CSI-RS transmission.

After the user equipment determines the subframe for the enhanced transmission of the first information, the user equipment needs to determine the resource element occupied by the CSI-RS transmission and the subframe for the CSI-RS transmission.

Figure 11:
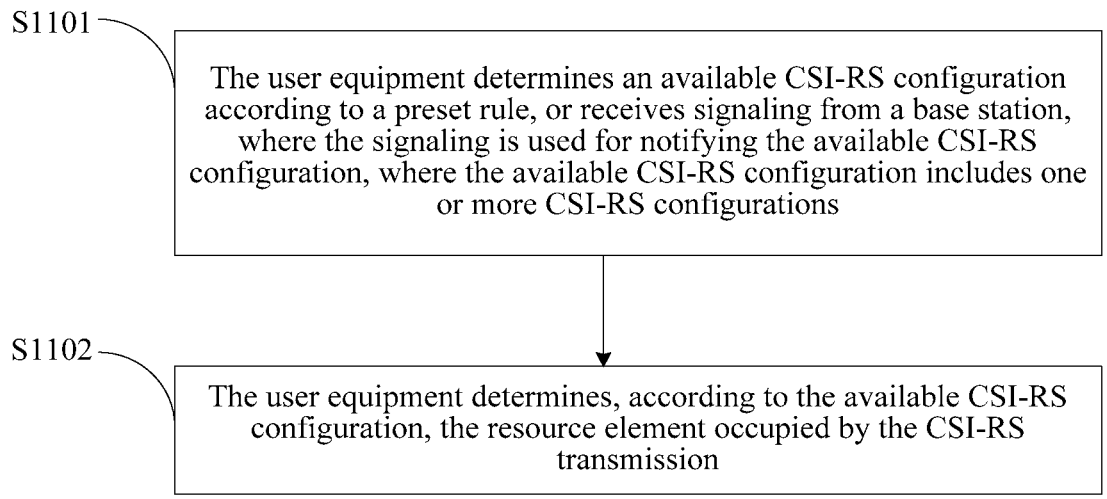
FIG. 11 is a schematic flowchart of determining, by user equipment, a resource element occupied by CSI-RS transmission according to Embodiment 8 of the present disclosure.

The determining, by the user equipment, a resource element occupied by CSI-RS transmission is as shown in FIG. 11, and includes:

S1101: The user equipment determines an available CSI-RS configuration according to a preset rule, or receives signaling from a base station, where the signaling is used for notifying the available CSI-RS configuration, where the available CSI-RS configuration includes one or more CSI-RS configurations.

It should be noted that, there are two methods for the user equipment to determine an available CSI-RS configuration. If a system or a standard presets an available CSI-RS configuration, the user equipment determines an available CSI-RS configuration according to a preset rule. If the system or the standard does not preset an available CSI-RS configuration, the user equipment receives signaling from a base station, where the signaling is used for notifying the available CSI-RS configuration.

The available CSI-RS configuration includes one or more CSI-RS configurations.

S1102: The user equipment determines, according to the available CSI-RS configuration, the resource element occupied by the CSI-RS transmission.

After determining the available CSI-RS configuration, the user equipment determines, according to the available CSI-RS configuration, the resource element occupied by the CSI-RS transmission.

The method described in the present disclosure of determining, by the user equipment, a resource element occupied by CSI-RS transmission is also applicable in the following embodiments, and is not described in the following embodiments again.

Figure 12:
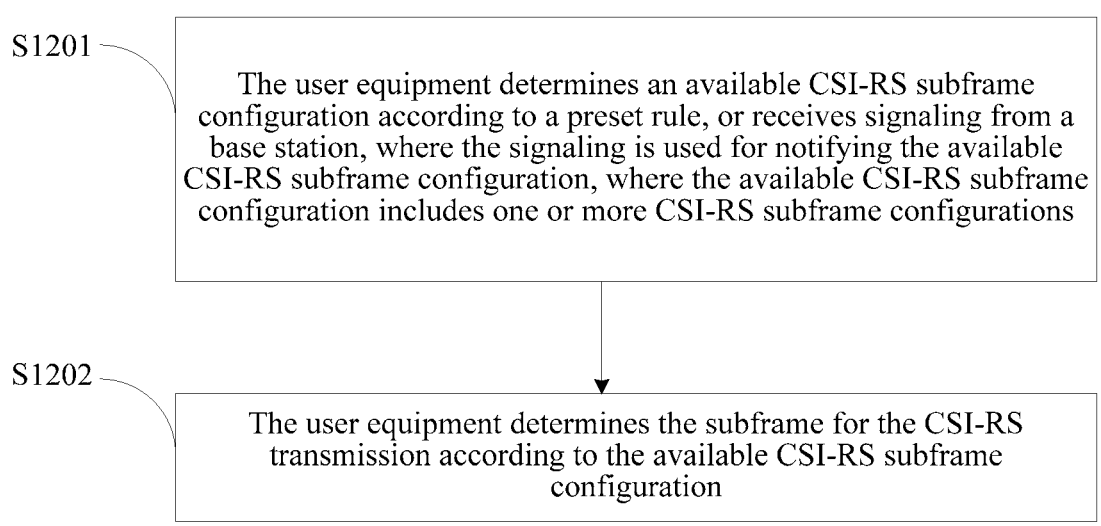
FIG. 12 is a schematic flowchart of determining, by user equipment, a subframe for CSI-RS transmission according to Embodiment 8 of the present disclosure.

The determining, by the user equipment, a subframe for the CSI-RS transmission is as shown in FIG. 12, and includes:

S1201: The user equipment determines an available CSI-RS subframe configuration according to a preset rule, or receives signaling from a base station, where the signaling is used for notifying the available CSI-RS subframe configuration, where the available CSI-RS subframe configuration includes one or more CSI-RS subframe configurations.

It should be noted that, there are two methods for the user equipment to determine an available CSI-RS subframe configuration. If a system or a standard presets an available CSI-RS subframe configuration, the user equipment determines an available CSI-RS subframe configuration according to a preset rule. If the system or the standard does not preset an available CSI-RS subframe configuration, the user equipment receives signaling from a base station, where the signaling is used for notifying the available CSI-RS subframe configuration.

The available CSI-RS subframe configuration includes one or more CSI-RS subframe configurations.

S1202: The user equipment determines the subframe for the CSI-RS transmission according to the available CSI-RS subframe configuration.

After determining the available CSI-RS subframe configuration, the user equipment determines the subframe for the CSI-RS transmission according to the available CSI-RS subframe configuration.

The method described in the present disclosure of determining, by the user equipment, a subframe for the CSI-RS transmission is also applicable in the following embodiments, and is not described in the following embodiments again.

It should be noted that, the signaling mentioned in steps S1101, S1102, S1201, and S1202 includes:

an MIB, a system information block SIB, Radio Resource Control RRC common signaling, RRC dedicated signaling, Media Access Control MAC signaling, or physical layer signaling.

S1003: If the subframe for the CSI-RS transmission collides with the subframe for the enhanced transmission of the first information, the user equipment skips receiving the first information on the resource element occupied by the CSI-RS transmission in the determined subframe in which the enhanced transmission of the first information collides with the CSI-RS transmission.

After the user equipment determines the resource element occupied by the CSI-RS transmission and the subframe for the CSI-RS transmission, if the CSI-RS transmission is performed in the determined subframe for the enhanced transmission of the first information, the user equipment skips receiving the first information on the resource element occupied by the CSI-RS transmission in the determined subframe in which the enhanced transmission of the first information collides with the CSI-RS transmission, thereby avoiding a collision between the CSI-RS transmission and the enhanced transmission of the first information.

S1004: The user equipment receives, in the determined subframe for the enhanced transmission of the first information, the first information that is repeatedly transmitted multiple times, and skips the CSI-RS transmission on a resource element occupied by the received first information that is repeatedly transmitted multiple times.

The first information is an MIB, and a quantity of times of receiving the repeatedly transmitted MIB in at least one radio frame is greater than one time; or the first information is an SIB 1, and a quantity of times of receiving the repeatedly transmitted SIB 1 in at least two consecutive radio frames is greater than one time; or the first information is other system information except an MIB and an SIB 1, unicast data, a paging message, a random access response RAR, a random access contention resolution message, or control information, and a quantity of times of receiving the repeatedly transmitted first information in the determined subframe for the enhanced transmission of the first information is at least two times.

After determining the subframe for the enhanced transmission of the first information, the user equipment receives, in the determined subframe for the enhanced transmission of the first information, the first information that is repeatedly transmitted multiple times, and skips the CSI-RS transmission on the resource element occupied by the received first information.

It should be noted that, according to different types of the first information, the user equipment receives, at different frequencies in the determined subframe for the enhanced transmission of the first information, the first information that is repeatedly transmitted multiple times. When the first information is an MIB, a quantity of times of repeated receiving of the MIB in at least one radio frame is greater than one time; or when the first information is an SIB 1, a quantity of times of repeated receiving of the SIB 1 in at least two consecutive radio frames is greater than one time; or when the first information is system information, unicast data, a paging message, a random access response RAR, a random access contention resolution message, or control information except an MIB and an SIB 1, a quantity of times of repeated receiving of the first information in the determined subframe for the enhanced transmission of the first information is at least two times.

It should be noted that, according to the information transmission method provided in this embodiment of the present disclosure, after the user equipment receives, in the determined subframe for the enhanced transmission of the first information, the first information that is repeatedly transmitted multiple times, the user equipment can further combine the received first information that is repeatedly transmitted multiple times, and detect the combined first information.

According to the information transmission method provided in this embodiment of the present disclosure, a subframe for enhanced transmission of first information is determined, and the first information repeatedly transmitted multiple times is received in the determined subframe for the enhanced transmission of the first information, and CSI-RS transmission is skipped on a resource element occupied by the first information that is repeatedly transmitted multiple times, where the first information is an MIB, and a quantity of times of receiving the repeatedly transmitted MIB in at least one radio frame is greater than one time; or the first information is an SIB 1, and a quantity of times of receiving the repeatedly transmitted SIB 1 in at least two consecutive radio frames is greater than one time; or the first information is other system information except an MIB and an SIB 1, unicast data, a paging message, a random access response RAR, a random access contention resolution message, or control information, and a quantity of times of receiving the repeatedly transmitted first information in the determined subframe for the enhanced transmission of the first information is at least two times. According to the solution, a collision between the CSI-RS transmission and the enhanced transmission of the first information can be avoided, improving transmission reliability of the first information.

Embodiment 9

Figure 13:
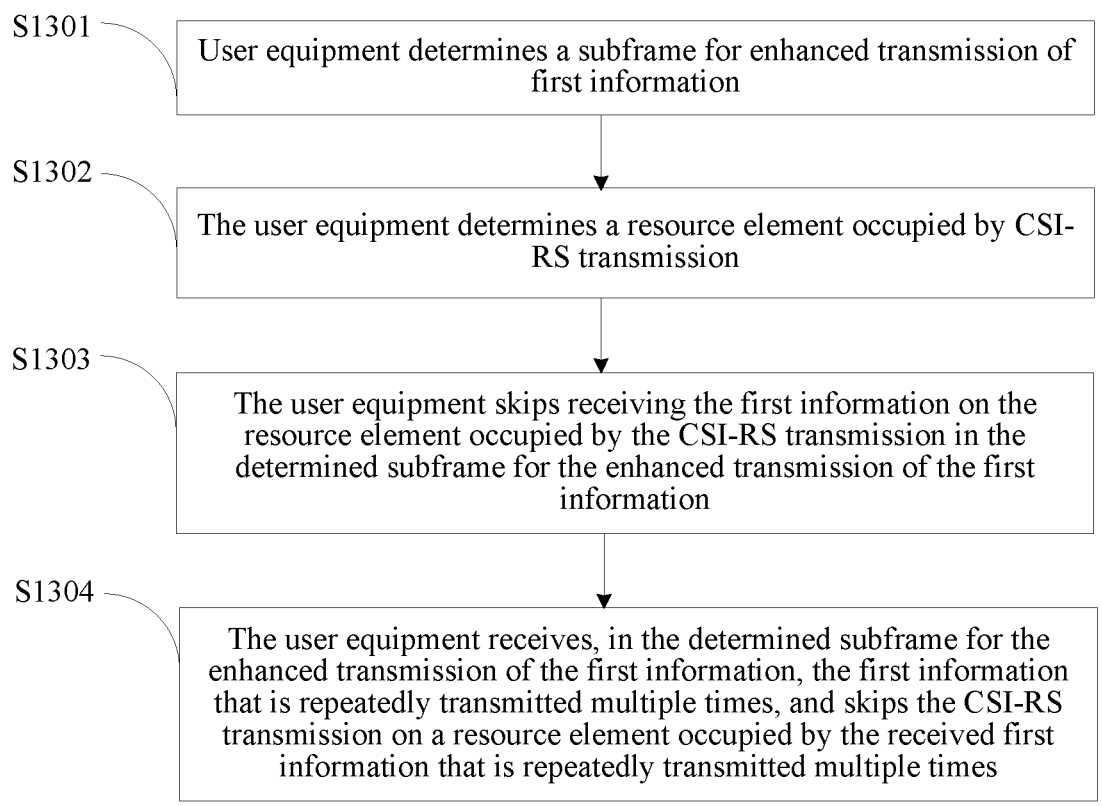
FIG. 13 is a fourth schematic flowchart of another information transmission method according to Embodiment 9 of the present disclosure.

This embodiment of the present disclosure provides another information transmission method. As shown in FIG. 13, the method includes:

S1301: User equipment determines a subframe for enhanced transmission of first information.

This embodiment of the present disclosure provides an information transmission method, which can avoid a collision between CSI-RS transmission and enhanced transmission of first information, improving transmission reliability of the first information.

First, the user equipment determines the subframe for the enhanced transmission of the first information.

S1302: The user equipment determines a resource element occupied by CSI-RS transmission.

After the user equipment determines the subframe for the enhanced transmission of the first information, the user equipment needs to determine the resource element occupied by the CSI-RS transmission.

S1303: The user equipment skips receiving the first information on the resource element occupied by the CSI-RS transmission in the determined subframe for the enhanced transmission of the first information.

After determining the resource element occupied by the CSI-RS transmission, the user equipment skips receiving the first information on the resource element occupied by the CSI-RS transmission in the determined subframe for the enhanced transmission of the first information, thereby avoiding a collision between the CSI-RS transmission and the enhanced transmission of the first information.

S1304: The user equipment receives, in the determined subframe for the enhanced transmission of the first information, the first information that is repeatedly transmitted multiple times, and skips the CSI-RS transmission on a resource element occupied by the received first information that is repeatedly transmitted multiple times.

The first information is an MIB, and a quantity of times of receiving the repeatedly transmitted MIB in at least one radio frame is greater than one time; or the first information is an SIB 1, and a quantity of times of receiving the repeatedly transmitted SIB 1 in at least two consecutive radio frames is greater than one time; or the first information is other system information except an MIB and an SIB 1, unicast data, a paging message, a random access response RAR, a random access contention resolution message, or control information, and a quantity of times of receiving the repeatedly transmitted first information in the determined subframe for the enhanced transmission of the first information is at least two times.

After determining the subframe for the enhanced transmission of the first information, the user equipment receives, in the determined subframe for the enhanced transmission of the first information, the first information that is repeatedly transmitted multiple times, and skips the CSI-RS transmission on the resource element occupied by the received first information that is repeatedly transmitted multiple times.

It should be noted that, according to different types of the first information, the user equipment receives, at different frequencies in the determined subframe for the enhanced transmission of the first information, the first information that is repeatedly transmitted multiple times. When the first information is an MIB, a quantity of times of repeated receiving of the MIB in at least one radio frame is greater than one time; or when the first information is an SIB 1, a quantity of times of repeated receiving of the SIB 1 in at least two consecutive radio frames is greater than one time; or when the first information is system information, unicast data, a paging message, a random access response RAR, a random access contention resolution message, or control information except an MIB and an SIB 1, a quantity of times of repeated receiving of the first information in the determined subframe for the enhanced transmission of the first information is at least two times.

It should be noted that, according to the information transmission method provided in this embodiment of the present disclosure, after the user equipment receives, in the determined subframe for the enhanced transmission of the first information, the first information that is repeatedly transmitted multiple times, the user equipment can further combine the received first information that is repeatedly transmitted multiple times, and detect the combined first information.

According to the information transmission method provided in this embodiment of the present disclosure, a subframe for enhanced transmission of first information is determined, and the first information repeatedly transmitted multiple times is received in the determined subframe for the enhanced transmission of the first information, and CSI-RS transmission is skipped on a resource element occupied by the first information that is repeatedly transmitted multiple times, where the first information is an MIB, and a quantity of times of receiving the repeatedly transmitted MIB in at least one radio frame is greater than one time; or the first information is an SIB 1, and a quantity of times of receiving the repeatedly transmitted SIB 1 in at least two consecutive radio frames is greater than one time; or the first information is other system information except an MIB and an SIB 1, unicast data, a paging message, a random access response RAR, a random access contention resolution message, or control information, and a quantity of times of receiving the repeatedly transmitted first information in the determined subframe for the enhanced transmission of the first information is at least two times. According to the solution, a collision between the CSI-RS transmission and the enhanced transmission of the first information can be avoided, improving transmission reliability of the first information.

Embodiment 10

Figure 14:
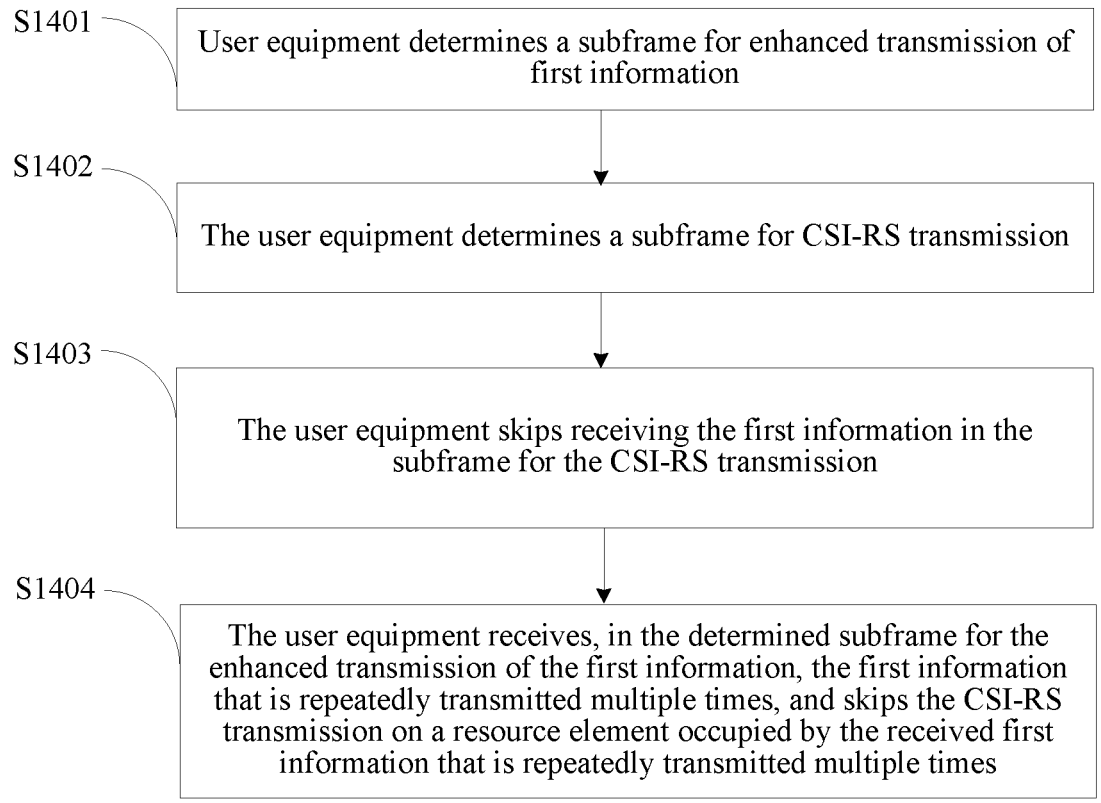
FIG. 14 is a fifth schematic flowchart of another information transmission method according to Embodiment 10 of the present disclosure.

This embodiment of the present disclosure provides another information transmission method. As shown in FIG. 14, the method includes:

S1401: User equipment determines a subframe for enhanced transmission of first information.

This embodiment of the present disclosure provides an information transmission method, which can avoid a collision between CSI-RS transmission and enhanced transmission of first information, improving transmission reliability of the first information.

First, the user equipment determines the subframe for the enhanced transmission of the first information.

S1402: The user equipment determines a subframe for CSI-RS transmission.

After the user equipment determines the subframe for the enhanced transmission of the first information, the user equipment needs to determine the subframe for the CSI-RS transmission.

S1403: The user equipment skips receiving the first information in the subframe for the CSI-RS transmission.

After determining the subframe for the CSI-RS transmission, the user equipment skips receiving the first information in the subframe for the CSI-RS transmission, thereby avoiding a collision between the CSI-RS transmission and the enhanced transmission of the first information.

S1404: The user equipment receives, in the determined subframe for the enhanced transmission of the first information, the first information that is repeatedly transmitted multiple times, and skips the CSI-RS transmission on a resource element occupied by the received first information that is repeatedly transmitted multiple times.

The first information is an MIB, and a quantity of times of receiving the repeatedly transmitted MIB in at least one radio frame is greater than one time; or the first information is an SIB 1, and a quantity of times of receiving the repeatedly transmitted SIB 1 in at least two consecutive radio frames is greater than one time; or the first information is other system information except an MIB and an SIB 1, unicast data, a paging message, a random access response RAR, a random access contention resolution message, or control information, and a quantity of times of receiving the repeatedly transmitted first information in the determined subframe for the enhanced transmission of the first information is at least two times.

After determining the subframe for the enhanced transmission of the first information, the user equipment receives, in the determined subframe for the enhanced transmission of the first information, the first information that is repeatedly transmitted multiple times, and skips the CSI-RS transmission on the resource element occupied by the received first information.

It should be noted that, according to different types of the first information, the user equipment receives, at different frequencies in the determined subframe for the enhanced transmission of the first information, the first information that is repeatedly transmitted multiple times. When the first information is an MIB, a quantity of times of repeated receiving of the MIB in at least one radio frame is greater than one time; or when the first information is an SIB 1, a quantity of times of repeated receiving of the SIB 1 in at least two consecutive radio frames is greater than one time; or when the first information is system information, unicast data, a paging message, a random access response RAR, a random access contention resolution message, or control information except an MIB and an SIB 1, a quantity of times of repeated receiving of the first information in the determined subframe for the enhanced transmission of the first information is at least two times.

It should be noted that, according to the information transmission method provided in this embodiment of the present disclosure, after the user equipment receives, in the determined subframe for the enhanced transmission of the first information, the first information that is repeatedly transmitted multiple times, the user equipment can further combine the received first information that is repeatedly transmitted multiple times, and detect the combined first information.

According to the information transmission method provided in this embodiment of the present disclosure, a subframe for enhanced transmission of first information is determined, and the first information repeatedly transmitted multiple times is received in the determined subframe for the enhanced transmission of the first information, and CSI-RS transmission is skipped on a resource element occupied by the first information that is repeatedly transmitted multiple times, where the first information is an MIB, and a quantity of times of receiving the repeatedly transmitted MIB in at least one radio frame is greater than one time; or the first information is an SIB 1, and a quantity of times of receiving the repeatedly transmitted SIB 1 in at least two consecutive radio frames is greater than one time; or the first information is other system information except an MIB and an SIB 1, unicast data, a paging message, a random access response RAR, a random access contention resolution message, or control information, and a quantity of times of receiving the repeatedly transmitted first information in the determined subframe for the enhanced transmission of the first information is at least two times. According to the solution, a collision between the CSI-RS transmission and the enhanced transmission of the first information can be avoided, improving transmission reliability of the first information.

Embodiment 11

Figure 15:
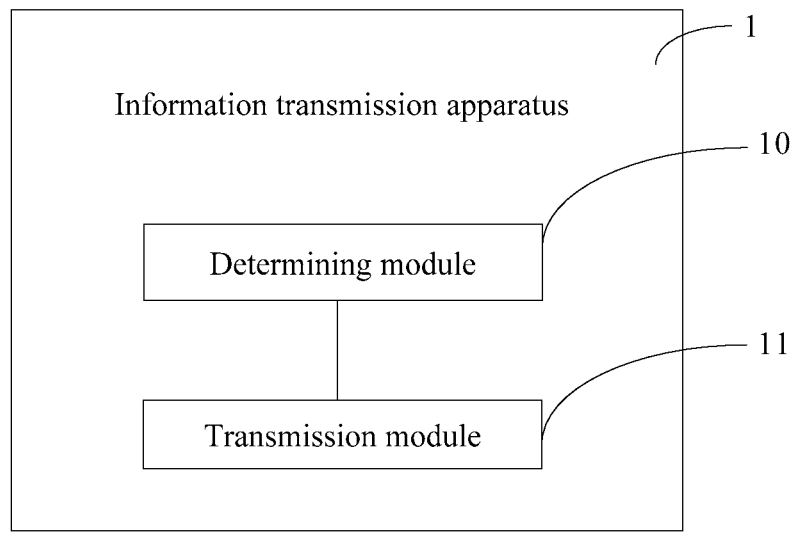
FIG. 15 is a first schematic structural diagram of an information transmission apparatus according to Embodiment 11 of the present disclosure.

This embodiment of the present disclosure provides an information transmission apparatus 1. As shown in FIG. 15, the apparatus includes:

a determining module 10, configured to determine a subframe for enhanced transmission of first information; and a transmission module 11, configured to repeatedly transmit the first information multiple times in the determined subframe for the enhanced transmission of the first information, and skip CSI-RS transmission of a resource element occupied by the enhanced transmission of the first information, where the first information is an MIB, and a quantity of times of repeatedly transmitting the MIB in at least one radio frame is greater than one time; or the first information is an SIB 1, and a quantity of times of repeatedly transmitting the SIB 1 in at least two consecutive radio frames is greater than one time; or the first information is other system information except an MIB and an SIB 1, unicast data, a paging message, a random access response RAR, a random access contention resolution message, or control information, and a quantity of times of repeatedly transmitting the first information in the determined subframe for the enhanced transmission of the first information is at least two times.

Further, for an FDD system, the subframe for the enhanced transmission of the first information includes one or more subframes of a subframe 0, a subframe 4, a subframe 5, and a subframe 9; and for a TDD system, the subframe for the enhanced transmission of the first information includes one or more subframes of the subframe 0, a subframe 1, the subframe 5, and a subframe 6.

Further, for the FDD system, the subframe for the enhanced transmission of the first information includes the subframe 9; or the subframe for the enhanced transmission of the first information includes the subframe 4 and the subframe 9; and for the TDD system, the subframe for the enhanced transmission of the first information includes the subframe 0; or the subframe for the enhanced transmission of the first information includes the subframe 0 and the subframe 5.

Further, the subframe for the enhanced transmission of the first information further includes:

for the FDD system, the subframe for the enhanced transmission of the first information further includes the subframe 0 and/or the subframe 5; and for the TDD system, the subframe for the enhanced transmission of the first information further includes the subframe 1 and/or the subframe 6.

Further, for the FDD system, the subframe for the enhanced transmission of the first information includes the subframe 0, the subframe 4, the subframe 5, and the subframe 9; and for the TDD system, the subframe for the enhanced transmission of the first information includes the subframe 0, the subframe 1, the subframe 5, and the subframe 6.

Further, the determining module 10 is further configured to determine a resource element occupied by the CSI-RS transmission and a subframe for the CSI-RS transmission; and the transmission module 11 is further configured to: if the subframe for the CSI-RS transmission collides with the subframe for the enhanced transmission of the first information, skip transmitting the first information on the resource element occupied by the CSI-RS transmission in the determined subframe in which the enhanced transmission of the first information collides with the CSI-RS transmission.

Further, the determining module 10 is further configured to determine a resource element occupied by the CSI-RS transmission; and the transmission module 11 is further configured to skip transmitting the first information on the resource element occupied by the CSI-RS transmission in the determined subframe for the enhanced transmission of the first information.

Further, the determining module 10 is further configured to determine a subframe for the CSI-RS transmission; and the transmission module 11 is further configured to skip transmitting the first information in the subframe for the CSI-RS transmission.

Figure 16:
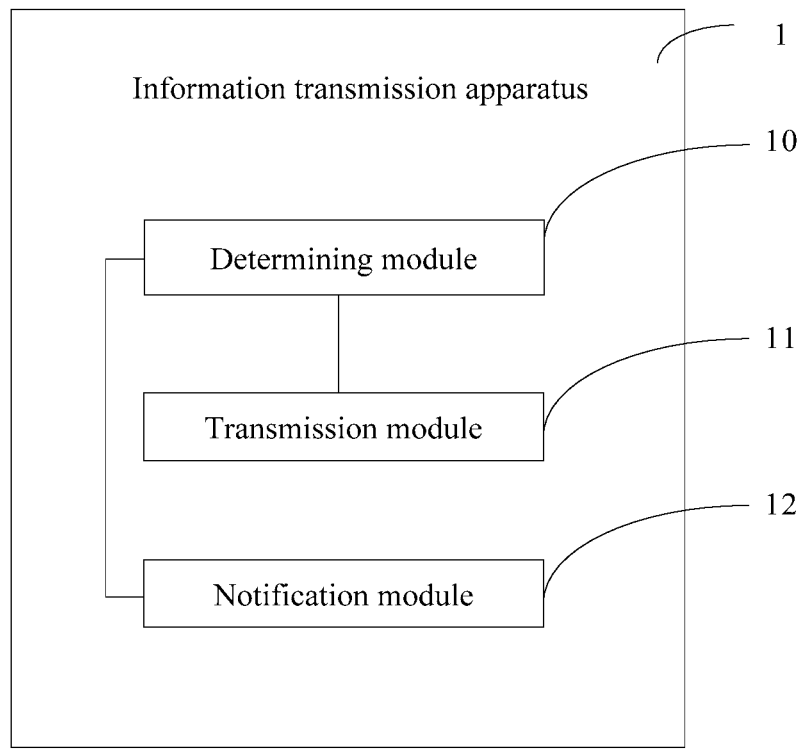
FIG. 16 is a second schematic structural diagram of an information transmission apparatus according to Embodiment 11 of the present disclosure.

Further, the determining module 10 is configured to determine an available CSI-RS configuration according to a preset rule, or set an available CSI-RS configuration, where the available CSI-RS configuration includes one or more CSI-RS configurations;

the determining module 10 is configured to determine, according to the available CSI-RS configuration, the resource element occupied by the CSI-RS transmission; and as shown in FIG. 16, the information transmission apparatus further includes:

a notification module 12, configured to notify user equipment of the available CSI-RS configuration by using signaling.

Further, the determining module 10 is configured to determine an available CSI-RS subframe configuration according to a preset rule, or set an available CSI-RS subframe configuration, where the available CSI-RS subframe configuration includes one or more CSI-RS subframe configurations;

the determining module 10 is configured to determine the subframe for the CSI-RS transmission according to the available CSI-RS subframe configuration; and the notification module 12 is further configured to notify user equipment of the available CSI-RS subframe configuration by using signaling.

Further, the signaling includes:

an MIB, a system information block SIB, Radio Resource Control RRC common signaling, RRC dedicated signaling, Media Access Control MAC signaling, or physical layer signaling.

The information transmission apparatus provided in this embodiment of the present disclosure includes a determining module, configured to determine a subframe for enhanced transmission of first information, and a transmission module, configured to repeatedly transmit the first information multiple times in the determined subframe for the enhanced transmission of the first information, and skip CSI-RS transmission of a resource element occupied by the enhanced transmission of the first information, where the first information is an MIB, and a quantity of times of repeatedly transmitting the MIB in at least one radio frame is greater than one time; or the first information is an SIB 1, and a quantity of times of repeatedly transmitting the SIB 1 in at least two consecutive radio frames is greater than one time; or the first information is other system information except an MIB and an SIB 1, unicast data, a paging message, a random access response RAR, a random access contention resolution message, or control information, and a quantity of times of repeatedly transmitting the first information in the determined subframe for the enhanced transmission of the first information is at least two times. According to the solution, a collision between the CSI-RS transmission and the enhanced transmission of the first information can be avoided, improving transmission reliability of the first information.

Embodiment 12

Figure 17:
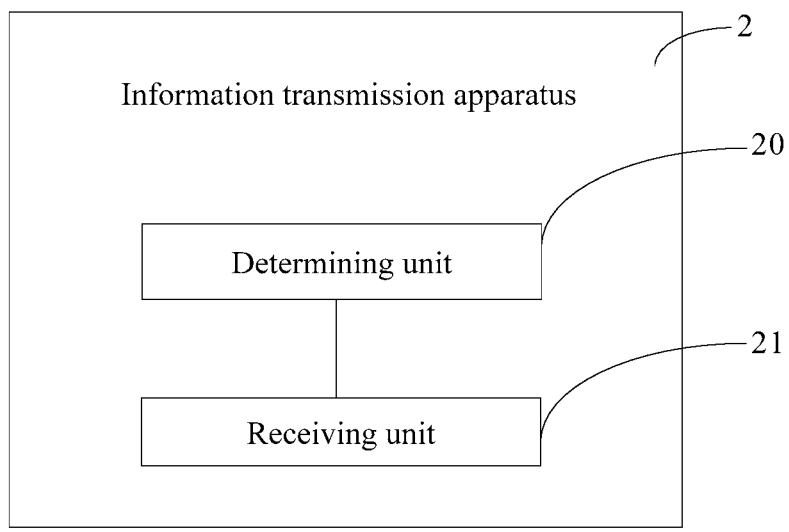
FIG. 17 is a schematic structural diagram of another information transmission apparatus according to Embodiment 12 of the present disclosure.

This embodiment of the present disclosure provides another information transmission apparatus 2. As shown in FIG. 17, the apparatus includes:

a determining unit 20, configured to determine a subframe for enhanced transmission of first information; and a receiving unit 21, configured to receive, in the determined subframe for the enhanced transmission of the first information, the first information that is repeatedly transmitted multiple times, and skip CSI-RS transmission of a resource element occupied by the received first information that is repeatedly transmitted multiple times, where the first information is an MIB, and a quantity of times of receiving the repeatedly transmitted MIB in at least one radio frame is greater than one time; or the first information is an SIB 1, and a quantity of times of receiving the repeatedly transmitted SIB 1 in at least two consecutive radio frames is greater than one time; or the first information is other system information except an MIB and an SIB 1, unicast data, a paging message, a random access response RAR, a random access contention resolution message, or control information, and a quantity of times of receiving the repeatedly transmitted first information in the determined subframe for the enhanced transmission of the first information is at least two times.

Further, for an FDD system, the subframe for the enhanced transmission of the first information includes one or more subframes of a subframe 0, a subframe 4, a subframe 5, and a subframe 9; and for a TDD system, the subframe for the enhanced transmission of the first information includes one or more subframes of the subframe 0, a subframe 1, the subframe 5, and a subframe 6.

Further, for the FDD system, the subframe for the enhanced transmission of the first information includes the subframe 9; or the subframe for the enhanced transmission of the first information includes the subframe 4 and the subframe 9; and for the TDD system, the subframe for the enhanced transmission of the first information includes the subframe 0; or the subframe for the enhanced transmission of the first information includes the subframe 0 and the subframe 5.

Further, the subframe for the enhanced transmission of the first information further includes:

for the FDD system, the subframe for the enhanced transmission of the first information further includes the subframe 0 and/or the subframe 5; and for the TDD system, the subframe for the enhanced transmission of the first information further includes the subframe 1 and/or the subframe 6.

Further, for the FDD system, the subframe for the enhanced transmission of the first information includes the subframe 0, the subframe 4, the subframe 5, and the subframe 9; and for the TDD system, the subframe for the enhanced transmission of the first information includes the subframe 0, the subframe 1, the subframe 5, and the subframe 6.

Further, the determining unit 20 is further configured to determine a resource element occupied by the CSI-RS transmission and a subframe for the CSI-RS transmission; and the receiving unit 21 is further configured to: if the subframe for the CSI-RS transmission collides with the subframe for the enhanced transmission of the first information, skip receiving the first information on the resource element occupied by the CSI-RS transmission in the determined subframe in which the enhanced transmission of the first information collides with the CSI-RS transmission.

Further, the determining unit 20 is further configured to determine a resource element occupied by the CSI-RS transmission; and the receiving unit 21 is further configured to skip receiving the first information on the resource element occupied by the CSI-RS transmission in the determined subframe for the enhanced transmission of the first information.

Further, the determining unit 20 is further configured to determine a subframe for the CSI-RS transmission; and the receiving unit 21 is further configured to skip receiving the first information in the subframe for the CSI-RS transmission.

Further, the determining unit 20 is configured to determine an available CSI-RS configuration according to a preset rule, where the available CSI-RS configuration includes one or more CSI-RS configurations;

the receiving unit 21 is further configured to receive signaling from a base station, where the signaling is used for notifying the available CSI-RS configuration; and the determining unit 20 is further configured to determine, according to the available CSI-RS configuration, the resource element occupied by the CSI-RS transmission.

Further, the determining unit 20 is configured to determine an available CSI-RS subframe configuration according to a preset rule, where the available CSI-RS subframe configuration includes one or more CSI-RS subframe configurations;

the receiving unit 21 is further configured to receive signaling from a base station, where the signaling is used for notifying the available CSI-RS subframe configuration; and the determining unit 20 is further configured to determine the subframe for the CSI-RS transmission according to the available CSI-RS subframe configuration.

Further, the signaling includes:

an MIB, a system information block SIB, Radio Resource Control RRC common signaling, RRC dedicated signaling, Media Access Control MAC signaling, or physical layer signaling.

The information transmission apparatus provided in this embodiment of the present disclosure includes a determining unit, configured to determine a subframe for enhanced transmission of first information, and a receiving unit, configured to receive, in the determined subframe for the enhanced transmission of the first information, the first information that is repeatedly transmitted multiple times, and skip CSI-RS transmission of a resource element occupied by the received first information that is repeatedly transmitted multiple times, where the first information is an MIB, and a quantity of times of receiving the repeatedly transmitted MIB in at least one radio frame is greater than one time; or the first information is an SIB 1, and a quantity of times of receiving the repeatedly transmitted SIB 1 in at least two consecutive radio frames is greater than one time; or the first information is other system information except an MIB and an SIB 1, unicast data, a paging message, a random access response RAR, a random access contention resolution message, or control information, and a quantity of times of receiving the repeatedly transmitted first information in the determined subframe for the enhanced transmission of the first information is at least two times. According to the solution, a collision between the CSI-RS transmission and the enhanced transmission of the first information can be avoided, improving transmission reliability of the first information.

Embodiment 13

Figure 18:
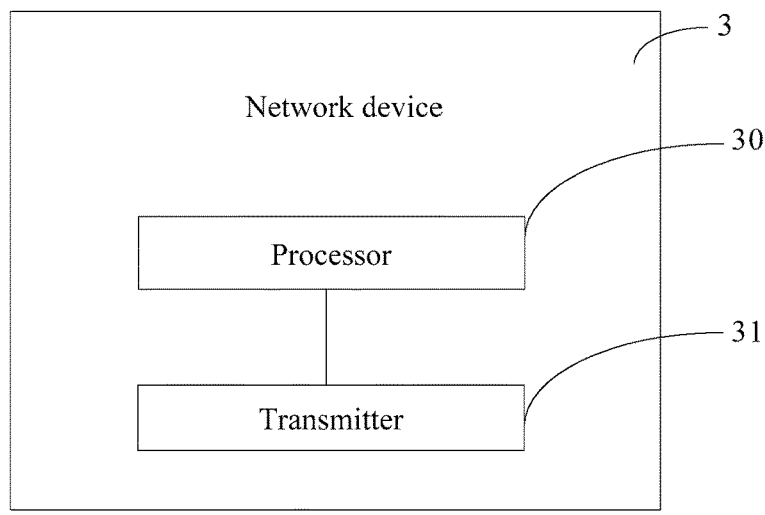
FIG. 18 is a schematic structural diagram of a network device according to Embodiment 13 of the present disclosure.

This embodiment of the present disclosure provides a network device 3. As shown in FIG. 18, the device includes:

a processor 30, configured to determine a subframe for enhanced transmission of first information; and a transmitter 31, configured to repeatedly transmit the first information multiple times in the determined subframe for the enhanced transmission of the first information, and skip CSI-RS transmission of a resource element occupied by the enhanced transmission of the first information, where the first information is an MIB, and a quantity of times of repeatedly transmitting the MIB in at least one radio frame is greater than one time; or the first information is an SIB 1, and a quantity of times of repeatedly transmitting the SIB 1 in at least two consecutive radio frames is greater than one time; or the first information is other system information except an MIB and an SIB 1, unicast data, a paging message, a random access response RAR, a random access contention resolution message, or control information, and a quantity of times of repeatedly transmitting the first information in the determined subframe for the enhanced transmission of the first information is at least two times.

Further, for an FDD system, the subframe for the enhanced transmission of the first information includes one or more subframes of a subframe 0, a subframe 4, a subframe 5, and a subframe 9; and for a TDD system, the subframe for the enhanced transmission of the first information includes one or more subframes of the subframe 0, a subframe 1, the subframe 5, and a subframe 6.

Further, for the FDD system, the subframe for the enhanced transmission of the first information includes the subframe 9; or the subframe for the enhanced transmission of the first information includes the subframe 4 and the subframe 9; and for the TDD system, the subframe for the enhanced transmission of the first information includes the subframe 0; or the subframe for the enhanced transmission of the first information includes the subframe 0 and the subframe 5.

Further, the subframe for the enhanced transmission of the first information further includes:

for the FDD system, the subframe for the enhanced transmission of the first information further includes the subframe 0 and/or the subframe 5; and for the TDD system, the subframe for the enhanced transmission of the first information further includes the subframe 1 and/or the subframe 6.

Further, for the FDD system, the subframe for the enhanced transmission of the first information includes the subframe 0, the subframe 4, the subframe 5, and the subframe 9; and for the TDD system, the subframe for the enhanced transmission of the first information includes the subframe 0, the subframe 1, the subframe 5, and the subframe 6.

Further, the processor 30 is further configured to determine a resource element occupied by the CSI-RS transmission and a subframe for the CSI-RS transmission; and the transmitter 31 is further configured to: if the subframe for the CSI-RS transmission collides with the subframe for the enhanced transmission of the first information, skip transmitting the first information on the resource element occupied by the CSI-RS transmission in the determined subframe in which the enhanced transmission of the first information collides with the CSI-RS transmission.

Further, the processor 30 is further configured to determine a resource element occupied by the CSI-RS transmission; and the transmitter 31 is further configured to skip transmitting the first information on the resource element occupied by the CSI-RS transmission in the determined subframe for the enhanced transmission of the first information.

Further, the processor 30 is further configured to determine a subframe for the CSI-RS transmission; and the transmitter 31 is further configured to skip transmitting the first information in the subframe for the CSI-RS transmission.

Further, the processor 30 is configured to determine an available CSI-RS configuration according to a preset rule, or set an available CSI-RS configuration, where the available CSI-RS configuration includes one or more CSI-RS configurations;

the processor 30 is configured to determine, according to the available CSI-RS configuration, the resource element occupied by the CSI-RS transmission; and the transmitter 31 is further configured to notify user equipment of the available CSI-RS configuration by using signaling.

Further, the processor 30 is configured to determine an available CSI-RS subframe configuration according to a preset rule, or set an available CSI-RS subframe configuration, where the available CSI-RS subframe configuration includes one or more CSI-RS subframe configurations;

the processor 30 is further configured to determine the subframe for the CSI-RS transmission according to the available CSI-RS subframe configuration; and the transmitter 31 is further configured to notify user equipment of the available CSI-RS subframe configuration by using signaling.

Further, the signaling includes:

an MIB, a system information block SIB, Radio Resource Control RRC common signaling, RRC dedicated signaling, Media Access Control MAC signaling, or physical layer signaling.

The network device provided in this embodiment of the present disclosure includes a processor, configured to determine a subframe for enhanced transmission of first information, and a transmitter, configured to repeatedly transmit the first information multiple times in the determined subframe for the enhanced transmission of the first information, and skip CSI-RS transmission of a resource element occupied by the enhanced transmission of the first information, where the first information is an MIB, and a quantity of times of repeatedly transmitting the MIB in at least one radio frame is greater than one time; or the first information is an SIB 1, and a quantity of times of repeatedly transmitting the SIB 1 in at least two consecutive radio frames is greater than one time; or the first information is other system information except an MIB and an SIB 1, unicast data, a paging message, a random access response RAR, a random access contention resolution message, or control information, and a quantity of times of repeatedly transmitting the first information in the determined subframe for the enhanced transmission of the first information is at least two times. According to the solution, a collision between the CSI-RS transmission and the enhanced transmission of the first information can be avoided, improving transmission reliability of the first information.

Embodiment 14

Figure 19:
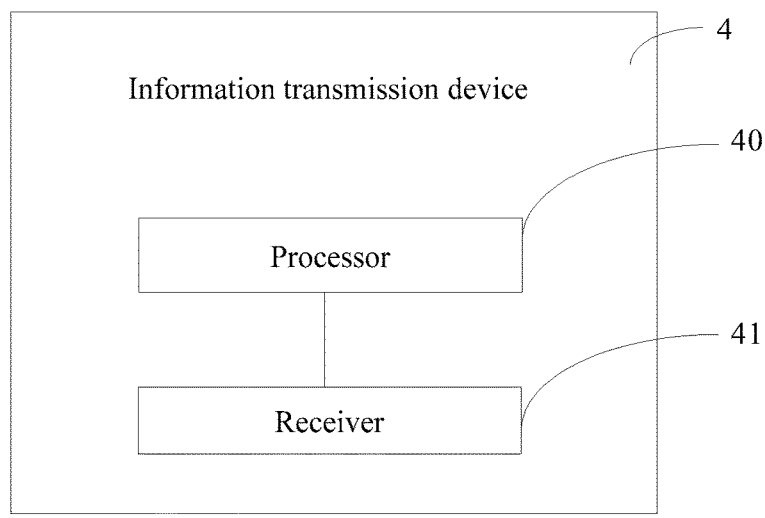
FIG. 19 is a schematic structural diagram of an information transmission device according to Embodiment 14 of the present disclosure.

This embodiment of the present disclosure provides an information transmission device 4. As shown in FIG. 19, the device includes:

a processor 40, configured to determine a subframe for enhanced transmission of first information; and a receiver 41, configured to receive, in the determined subframe for the enhanced transmission of the first information, the first information that is repeatedly transmitted multiple times, and skip CSI-RS transmission of a resource element occupied by the received first information that is repeatedly transmitted multiple times, where the first information is an MIB, and a quantity of times of receiving the repeatedly transmitted MIB in at least one radio frame is greater than one time; or the first information is an SIB 1, and a quantity of times of receiving the repeatedly transmitted SIB 1 in at least two consecutive radio frames is greater than one time; or the first information is other system information except an MIB and an SIB 1, unicast data, a paging message, a random access response RAR, a random access contention resolution message, or control information, and a quantity of times of receiving the repeatedly transmitted first information in the determined subframe for the enhanced transmission of the first information is at least two times.

Further, for an FDD system, the subframe for the enhanced transmission of the first information includes one or more subframes of a subframe 0, a subframe 4, a subframe 5, and a subframe 9; and for a TDD system, the subframe for the enhanced transmission of the first information includes one or more subframes of the subframe 0, a subframe 1, the subframe 5, and a subframe 6.

Further, for the FDD system, the subframe for the enhanced transmission of the first information includes the subframe 9; or the subframe for the enhanced transmission of the first information includes the subframe 4 and the subframe 9; and for the TDD system, the subframe for the enhanced transmission of the first information includes the subframe 0; or the subframe for the enhanced transmission of the first information includes the subframe 0 and the subframe 5.

Further, the subframe for the enhanced transmission of the first information further includes:

for the FDD system, the subframe for the enhanced transmission of the first information further includes the subframe 0 and/or the subframe 5; and for the TDD system, the subframe for the enhanced transmission of the first information further includes the subframe 1 and/or the subframe 6.

Further, for the FDD system, the subframe for the enhanced transmission of the first information includes the subframe 0, the subframe 4, the subframe 5, and the subframe 9; and for the TDD system, the subframe for the enhanced transmission of the first information includes the subframe 0, the subframe 1, the subframe 5, and the subframe 6.

Further, the processor 40 is further configured to determine a resource element occupied by the CSI-RS transmission and a subframe for the CSI-RS transmission; and the receiver 41 is further configured to: if the subframe for the CSI-RS transmission collides with the subframe for the enhanced transmission of the first information, skip receiving the first information on the resource element occupied by the CSI-RS transmission in the determined subframe in which the enhanced transmission of the first information collides with the CSI-RS transmission.

Further, the processor 40 is further configured to determine a resource element occupied by the CSI-RS transmission; and the receiver 41 is further configured to skip receiving the first information on the resource element occupied by the CSI-RS transmission in the determined subframe for the enhanced transmission of the first information.

Further, the processor 40 is further configured to determine a subframe for the CSI-RS transmission; and the receiver 41 is further configured to skip receiving the first information in the subframe for the CSI-RS transmission.

Further, the processor 40 is configured to determine an available CSI-RS configuration according to a preset rule, where the available CSI-RS configuration includes one or more CSI-RS configurations;

the receiver 41 is further configured to receive signaling from a base station, where the signaling is used for notifying the available CSI-RS configuration; and the processor 40 is further configured to determine, according to the available CSI-RS configuration, the resource element occupied by the CSI-RS transmission.

Further, the processor 40 is configured to determine an available CSI-RS subframe configuration according to a preset rule, where the available CSI-RS subframe configuration includes one or more CSI-RS subframe configurations;

the receiver 41 is further configured to receive signaling from a base station, where the signaling is used for notifying the available CSI-RS subframe configuration; and the processor 40 is further configured to determine the subframe for the CSI-RS transmission according to the available CSI-RS subframe configuration.

Further, the signaling includes:

an MIB, a system information block SIB, Radio Resource Control RRC common signaling, RRC dedicated signaling, Media Access Control MAC signaling, or physical layer signaling.

The information transmission device provided in this embodiment of the present disclosure includes a processor, configured to determine a subframe for enhanced transmission of first information, and a receiver, configured to receive, in the determined subframe for the enhanced transmission of the first information, the first information that is repeatedly transmitted multiple times, and skip CSI-RS transmission of a resource element occupied by the received first information that is repeatedly transmitted multiple times, where the first information is an MIB, and a quantity of times of receiving the repeatedly transmitted MIB in at least one radio frame is greater than one time; or the first information is an SIB 1, and a quantity of times of receiving the repeatedly transmitted SIB 1 in at least two consecutive radio frames is greater than one time; or the first information is other system information except an MIB and an SIB 1, unicast data, a paging message, a random access response RAR, a random access contention resolution message, or control information, and a quantity of times of receiving the repeatedly transmitted first information in the determined subframe for the enhanced transmission of the first information is at least two times. According to the solution, a collision between the CSI-RS transmission and the enhanced transmission of the first information can be avoided, improving transmission reliability of the first information.

Embodiment 15

This embodiment of the present disclosure further provides an information transmission system, including the base station having any feature described above and the user equipment having any feature described above.

The information transmission system provided in this embodiment of the present disclosure includes the base station having any feature described above and the user equipment having any feature described above. According to the solution, a collision between CSI-RS transmission and enhanced transmission of first information can be avoided, improving transmission reliability of the first information.

Embodiment 16

Figure 20:
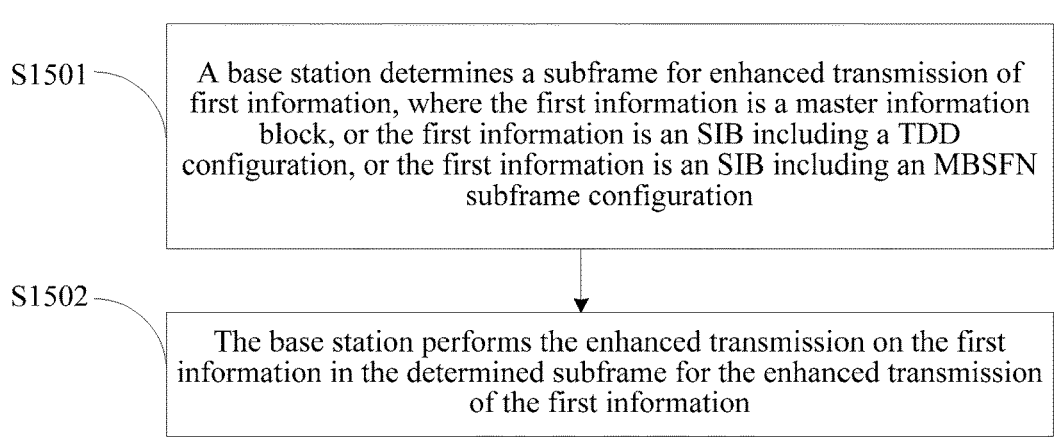
FIG. 20 is a schematic flowchart of an information transmission method according to Embodiment 16 of the present disclosure.

This embodiment of the present disclosure provides an information transmission method. As shown in FIG. 20, the method includes:

S1501: A base station determines a subframe for enhanced transmission of first information, where the first information is a master information block, or the first information is an SIB including a TDD configuration, or the first information is an SIB including an MBSFN subframe configuration.

In the prior art, in the case of coverage enhancement, UE that requires coverage enhancement cannot learn a TDD configuration and an MBSFN subframe configuration before receiving an SIB 1 and an SIB 2. Therefore, when enhanced transmission is performed on first information, a subframe used in the enhanced transmission cannot be determined, thereby lowering transmission reliability of the first information. This embodiment of the present disclosure provides an information transmission method, which can determine a subframe used in enhanced transmission of first information, improving transmission reliability of the first information.

First, the base station determines the subframe for the enhanced transmission of the first information.

The first information is a master information block, or the first information is an SIB including a TDD configuration, or the first information is an SIB including an MBSFN subframe configuration.

It should be noted that, the SIB including the TDD configuration is not limited to only the SIB 1, and may also be another SIB x including the TDD configuration; similarly, the SIB including the MBSFN subframe configuration is not limited to only the SIB 2, either, and may also be another SIB y including the TDD configuration, where x and y both are positive integers. Generally, a value of x of the SIB x including the TDD configuration is not equal to a value of y of the SIB y including the MBSFN subframe configuration, but particularly, the value of x may also be equal to the value of y, which is not limited in the present disclosure.

It should be further noted that, the subframe for the enhanced transmission of the first information includes any one of or a combination of the following, and there are at least one subframe for the enhanced transmission of the first information:

the subframe for the enhanced transmission of the first information is a subframe in an enhanced transmission opportunity of the first information or a subframe in an enhanced transmission bundle of the first information;

the subframe for the enhanced transmission of the first information is a subframe in at least one radio frame; and the subframe for the enhanced transmission of the first information is a subframe in at least one system information window.

Particularly, for an FDD system or a Half FDD system, the subframe for the enhanced transmission of the first information includes one or more of a subframe 0, a subframe 4, a subframe 5, and a subframe 9; and for a TDD system, the subframe for the enhanced transmission of the first information includes the subframe 0 and/or the subframe 5.

Further, for the TDD system, if the first information is an SIB including an MBSFN subframe configuration and a subframe 6 is not a special subframe, the subframe for the enhanced transmission of the first information further includes the subframe 6.

The subframe 0 is a subframe 0 in each radio frame in at least one radio frame, or a subframe 0 in each even-numbered radio frame in at least one even-numbered radio frame, or a subframe 0 in each odd-numbered radio frame in at least one odd-numbered radio frame;

the subframe 4 is a subframe 4 in each radio frame in at least one radio frame, or a subframe 4 in each even-numbered radio frame in at least one even-numbered radio frame, or a subframe 4 in each odd-numbered radio frame in at least one odd-numbered radio frame;

the subframe 5 is a subframe 5 in each radio frame in at least one radio frame, or a subframe 5 in each even-numbered radio frame in at least one even-numbered radio frame, or a subframe 5 in each odd-numbered radio frame in at least one odd-numbered radio frame;

the subframe 6 is a subframe 6 in each radio frame in at least one radio frame, or a subframe 6 in each even-numbered radio frame in at least one even-numbered radio frame, or a subframe 6 in each odd-numbered radio frame in at least one odd-numbered radio frame; and the subframe 9 is a subframe 9 in each radio frame in at least one radio frame, or a subframe 9 in each even-numbered radio frame in at least one even-numbered radio frame, or a subframe 9 in each odd-numbered radio frame in at least one odd-numbered radio frame.

S1502: The base station performs the enhanced transmission of the first information in the determined subframe for the enhanced transmission of the first information.

After determining the subframe for the enhanced transmission of the first information, the base station performs the enhanced transmission of the first information in the determined subframe for the enhanced transmission of the first information.

It should be noted that, when the base station performs the enhanced transmission of the first information in the determined subframe for the enhanced transmission of the first information, according to different types of the first information, specific manners of transmitting the first information are different. If the first information is a master information block, the base station performs the enhanced transmission of the master information block in at least one radio frame a quantity of times that is greater than one time; if the first information is an SIB including a TDD configuration, the base station performs the enhanced transmission of the SIB in at least two consecutive radio frames a quantity of times that is greater than one time; or if the first information is an SIB including an MBSFN subframe configuration, the base station performs the enhanced transmission of the SIB in the determined subframe for the enhanced transmission of the first information a quantity of times that is at least two times.

It should be additionally noted that, for the enhanced transmission of the first information provided in this embodiment of the present disclosure, the mentioned quantity of times of the enhanced transmission includes initial transmission of the first information. For example, the enhanced transmission being 1 indicates that the first information is transmitted only one time, that is, there is no additional repeatedly transmitting the first information; and the enhanced transmission being 2 indicates that the first information is transmitted two times, that is, there is additional one time of repeatedly transmitting the first information.

This embodiment of the present disclosure provides an information transmission method, where a subframe for enhanced transmission of first information is determined, where the first information is a master information block, or the first information is an SIB including a TDD configuration, or the first information is an SIB including an MBSFN subframe configuration, and the enhanced transmission of the first information is performed in the determined subframe for the enhanced transmission of the first information. According to the solution, the subframe used in the enhanced transmission of the first information can be determined, improving transmission reliability of the first information.

Embodiment 17

Figure 21:
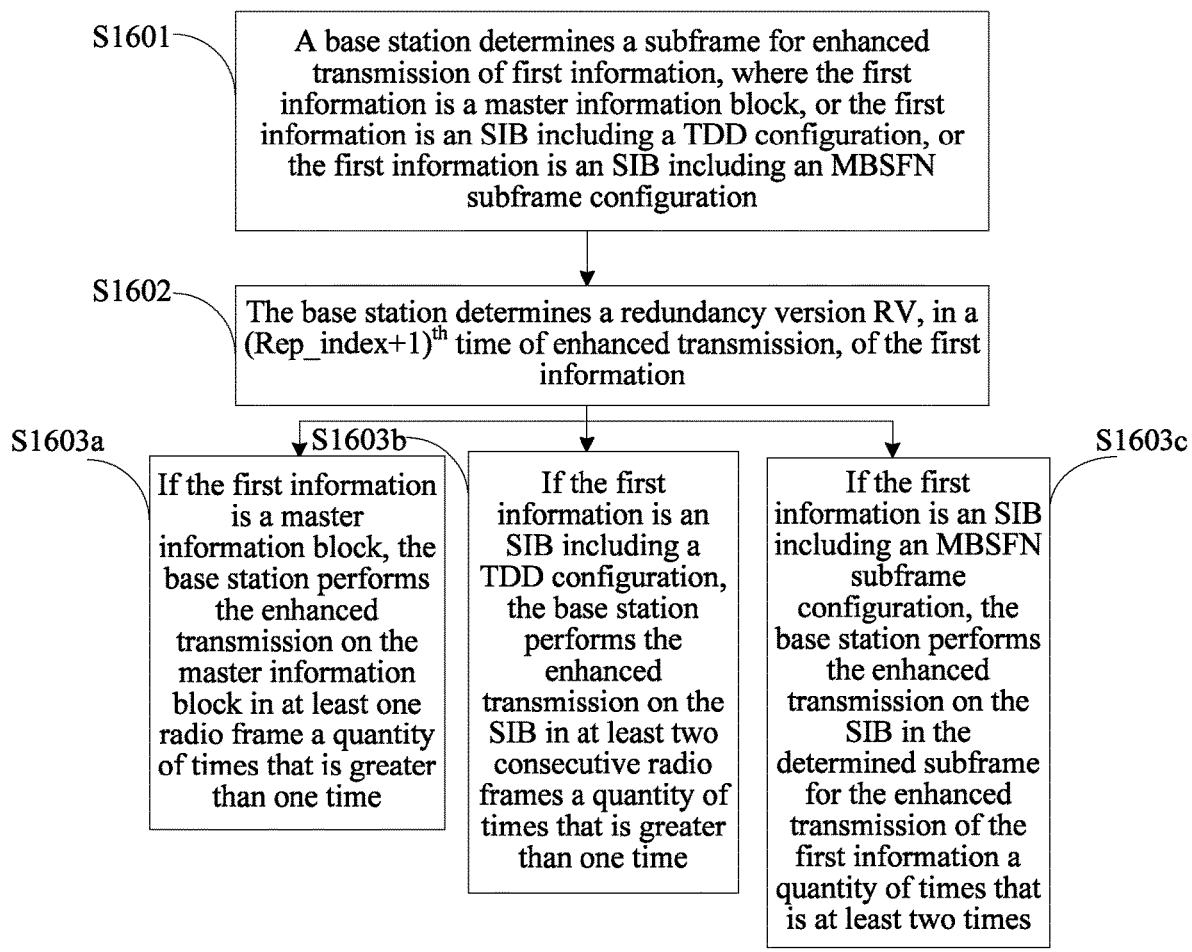
FIG. 21 is a schematic flowchart of an information transmission method according to Embodiment 17 of the present disclosure.

This embodiment of the present disclosure provides an information transmission method. As shown in FIG. 21, the method includes:

S1601: A base station determines a subframe for enhanced transmission of first information, where the first information is a master information block, or the first information is an SIB including a TDD configuration, or the first information is an SIB including an MBSFN subframe configuration.

This embodiment of the present disclosure provides an information transmission method, which can determine a subframe used in enhanced transmission of first information, improving transmission reliability of the first information.

First, the base station determines the subframe for the enhanced transmission of the first information. The first information is a master information block, or the first information is an SIB including a TDD configuration, or the first information is an SIB including an MBSFN subframe configuration.

It should be noted that, the SIB including the TDD configuration is not limited to only the SIB 1, and may also be another SIB x including the TDD configuration; similarly, the SIB including the MBSFN subframe configuration is not limited to only the SIB 2, either, and may also be another SIB y including the TDD configuration, where x and y both are positive integers. Generally, a value of x of the SIB x including the TDD configuration is not equal to a value of y of the SIB y including the MBSFN subframe configuration, but particularly, the value of x may also be equal to the value of y, which is not limited in the present disclosure.

It should be further noted that, the subframe for the enhanced transmission of the first information includes any one of or a combination of the following:

the subframe for the enhanced transmission of the first information is a subframe in an enhanced transmission opportunity of the first information or a subframe in an enhanced transmission bundle of the first information;

the subframe for the enhanced transmission of the first information is a subframe in at least one radio frame; and the subframe for the enhanced transmission of the first information is a subframe in at least one system information window.

Particularly, for an FDD system or a Half FDD system, the subframe for the enhanced transmission of the first information includes one or more of a subframe 0, a subframe 4, a subframe 5, and a subframe 9; and for a TDD system, the subframe for the enhanced transmission of the first information includes the subframe 0 and/or the subframe 5.

Further, for the TDD system, if the first information is an SIB including an MBSFN subframe configuration and a subframe 6 is not a special subframe, the subframe for the enhanced transmission of the first information further includes the subframe 6.

In an existing LTE or LTE-A system, time-domain resources are divided as radio frames, and the radio frames are numbered 0 to 1023. One radio frame includes 10 subframes, a time length of one subframe is 1 ms, and subframes in each radio frame are numbered 0 to 9.

For the FDD system or the Half FDD system, it can be determined that the subframe 0, the subframe 4, the subframe 5, and the subframe 9 are surely not MBSFN subframes; therefore, the subframe for the enhanced transmission of the first information is surely one or more of the subframe 0, the subframe 4, the subframe 5, and the subframe 9. For the TDD system, the subframe 0, the subframe 1, the subframe 5, and the subframe 6 are surely not MBSFN subframes, but the subframe 1 is surely a special subframe and the subframe 6 may be a special subframe; therefore, the subframe for the enhanced transmission of the first information is surely the subframe 0 and/or the subframe 5 and may further include the subframe 6.

Exemplarily, for the TDD system, if the subframe 0, the subframe 1, a subframe 2, and the subframe 6 are subframes in uplink and downlink configurations of the TDD system, the subframe 6 is also a special subframe. Therefore, the subframe for the enhanced transmission of the first information can only be the subframe 0 and/or the subframe 5. If a subframe 3, the subframe 4, and the subframe 5 are subframes in uplink and downlink configurations of the TDD system, and the subframe 6 is a subframe in only the downlink configuration of the TDD system, the subframe 6 is not a special subframe. Therefore, the subframe for the enhanced transmission of the first information may be one or more of the subframe 0, the subframe 5, and the subframe 6.

The subframe 0 is a subframe 0 in each radio frame in at least one radio frame, or a subframe 0 in each even-numbered radio frame in at least one even-numbered radio frame, or a subframe 0 in each odd-numbered radio frame in at least one odd-numbered radio frame;

the subframe 4 is a subframe 4 in each radio frame in at least one radio frame, or a subframe 4 in each even-numbered radio frame in at least one even-numbered radio frame, or a subframe 4 in each odd-numbered radio frame in at least one odd-numbered radio frame;

the subframe 5 is a subframe 5 in each radio frame in at least one radio frame, or a subframe 5 in each even-numbered radio frame in at least one even-numbered radio frame, or a subframe 5 in each odd-numbered radio frame in at least one odd-numbered radio frame;

the subframe 6 is a subframe 6 in each radio frame in at least one radio frame, or a subframe 6 in each even-numbered radio frame in at least one even-numbered radio frame, or a subframe 6 in each odd-numbered radio frame in at least one odd-numbered radio frame; and the subframe 9 is a subframe 9 in each radio frame in at least one radio frame, or a subframe 9 in each even-numbered radio frame in at least one even-numbered radio frame, or a subframe 9 in each odd-numbered radio frame in at least one odd-numbered radio frame.

S1602: The base station determines a redundancy version RV, in a (rep_index+1)$^{th}$ time of enhanced transmission, of the first information.

RV index=ceil(3/2*{rep_index mod 4})mod 4, ceil(x) is a round-up function, rep_index is a number of a quantity of times of the enhanced transmission of the first information, and mod is a modulo operation; or the RV is determined in an order of 0, 2, 3, and 1 according to an index of a quantity of times of the enhanced transmission.

After the base station determines the subframe for the enhanced transmission of the first information, a redundancy version RV of the first information during the enhanced transmission of the first information varies according to a quantity of times of the enhanced transmission of the first information, so that a format stipulated by the redundancy version RV is used for the first information, and the enhanced transmission of the first information is performed in the determined subframe for the enhanced transmission of the first information.

S1603: The base station performs the enhanced transmission of the first information in the determined subframe for the enhanced transmission of the first information.

step S1603 of performing, by the base station, the enhanced transmission of the first information in the determined subframe for the enhanced transmission of the first information may include steps S1603a to S1603c:

S1603a: If the first information is a master information block, the base station performs the enhanced transmission of the master information block in at least one radio frame a quantity of times that is greater than one time.

S1603b: If the first information is an SIB including a TDD configuration, the base station performs the enhanced transmission of the SIB in at least two consecutive radio frames a quantity of times that is greater than one time.

S1603c: If the first information is an SIB including an MBSFN subframe configuration, the base station performs the enhanced transmission of the SIB in the determined subframe for the enhanced transmission of the first information a quantity of times that is at least two times.

It should be noted that, to avoid a collision between the enhanced transmission of the first information and enhanced transmission of a paging message and/or a random access response message, when the enhanced transmission of the first information is scheduled based on a control channel, additional enhanced transmission of a paging message and/or a random access response message is not performed in the determined subframe for the enhanced transmission of the first information; and when the enhanced transmission of the first information is not scheduled based on a control channel, on a small-bandwidth carrier, the additional enhanced transmission of the paging message and/or the random access response message is not performed in the determined subframe for the enhanced transmission of the first information, where the small-bandwidth carrier includes at least a carrier of 1.4 MHz and/or a carrier of 3 MHz.

It should be further noted that, according to types of the first information, a priority relationship exists between the enhanced transmission of the first information and enhanced transmission of other information:

if the first information is an SIB including a TDD configuration, the enhanced transmission of the first information is after enhanced transmission of a master information block, and a preset first time offset exists between the enhanced transmission of the first information and the enhanced transmission of the master information block; and if the first information is an SIB including an MBSFN subframe configuration, the enhanced transmission of the first information is after enhanced transmission of an SIB including a TDD configuration, and a preset second time offset exists between the enhanced transmission of the first information and the enhanced transmission of the SIB including the TDD configuration, where the preset first time offset and the preset second time offset both are constant time offset values, and the preset first time offset may be equal to the preset second time offset, or the preset first time offset may be not equal to the preset second time offset, which is not limited in the present disclosure.

This embodiment of the present disclosure provides an information transmission method, where a subframe for enhanced transmission of first information is determined, where the first information is a master information block, or the first information is a system information block SIB including a time division duplex TDD configuration, or the first information is an SIB including a multicast-broadcast single-frequency network MBSFN subframe configuration, and the enhanced transmission of the first information is performed in the determined subframe for the enhanced transmission of the first information. According to the solution, the subframe used in the enhanced transmission of the first information can be determined, improving transmission reliability of the first information.

Embodiment 18

Figure 22:
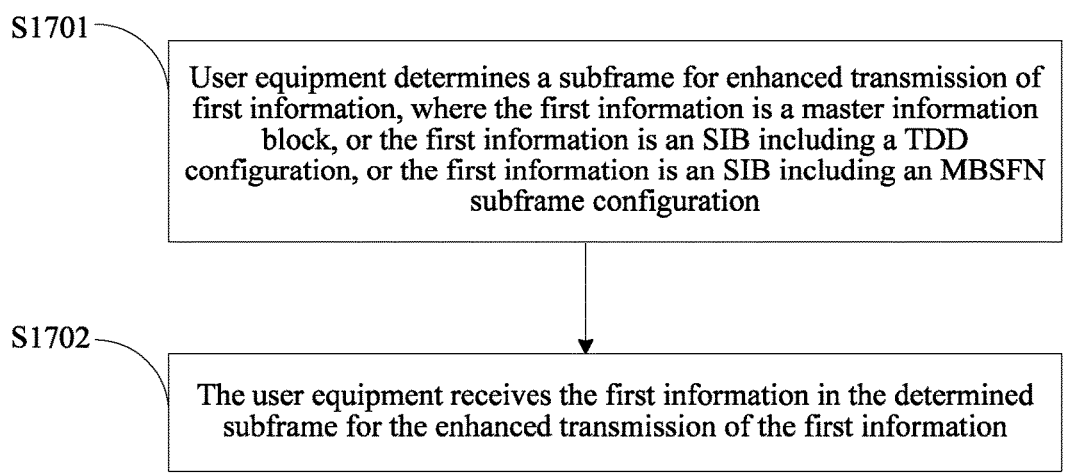
FIG. 22 is a schematic flowchart of an information transmission method according to Embodiment 18 of the present disclosure.

This embodiment of the present disclosure provides an information transmission method. As shown in FIG. 22, the method includes:

S1701: User equipment determines a subframe for enhanced transmission of first information, where the first information is a master information block, or the first information is an SIB including a TDD configuration, or the first information is an SIB including an MBSFN subframe configuration.

This embodiment of the present disclosure provides an information transmission method, which can determine a subframe used in enhanced transmission of first information, improving transmission reliability of the first information.

First, the user equipment determines the subframe for the enhanced transmission of the first information.

The first information is a master information block, or the first information is an SIB including a TDD configuration, or the first information is an SIB including an MBSFN subframe configuration.

It should be noted that, the SIB including the TDD configuration is not limited to only the SIB 1, and may also be another SIB x including the TDD configuration; similarly, the SIB including the MBSFN subframe configuration is not limited to only the SIB 2, either, and may also be another SIB y including the TDD configuration, where x and y both are positive integers. Generally, a value of x of the SIB x including the TDD configuration is not equal to a value of y of the SIB y including the MBSFN subframe configuration, but particularly, the value of x may also be equal to the value of y, which is not limited in the present disclosure.

It should be further noted that, the subframe for the enhanced transmission of the first information includes any one of or a combination of the following, and there are at least one subframe for the enhanced transmission of the first information:

the subframe for the enhanced transmission of the first information is a subframe in an enhanced transmission opportunity of the first information or a subframe in an enhanced transmission bundle of the first information;

the subframe for the enhanced transmission of the first information is a subframe in at least one radio frame; and the subframe for the enhanced transmission of the first information is a subframe in at least one system information window.

Particularly, for an FDD system or a Half FDD system, the subframe for the enhanced transmission of the first information includes one or more of a subframe 0, a subframe 4, a subframe 5, and a subframe 9; and for a TDD system, the subframe for the enhanced transmission of the first information includes the subframe 0 and/or the subframe 5.

Further, for the TDD system, if the first information is an SIB including an MBSFN subframe configuration and a subframe 6 is not a special subframe, the subframe for the enhanced transmission of the first information further includes the subframe 6.

The subframe 0 is a subframe 0 in each radio frame in at least one radio frame, or a subframe 0 in each even-numbered radio frame in at least one even-numbered radio frame, or a subframe 0 in each odd-numbered radio frame in at least one odd-numbered radio frame;

the subframe 4 is a subframe 4 in each radio frame in at least one radio frame, or a subframe 4 in each even-numbered radio frame in at least one even-numbered radio frame, or a subframe 4 in each odd-numbered radio frame in at least one odd-numbered radio frame;

the subframe 5 is a subframe 5 in each radio frame in at least one radio frame, or a subframe 5 in each even-numbered radio frame in at least one even-numbered radio frame, or a subframe 5 in each odd-numbered radio frame in at least one odd-numbered radio frame;

the subframe 6 is a subframe 6 in each radio frame in at least one radio frame, or a subframe 6 in each even-numbered radio frame in at least one even-numbered radio frame, or a subframe 6 in each odd-numbered radio frame in at least one odd-numbered radio frame; and the subframe 9 is a subframe 9 in each radio frame in at least one radio frame, or a subframe 9 in each even-numbered radio frame in at least one even-numbered radio frame, or a subframe 9 in each odd-numbered radio frame in at least one odd-numbered radio frame.

S1702: The user equipment receives the first information in the determined subframe for the enhanced transmission of the first information.

After determining the subframe for the enhanced transmission of the first information, the user equipment receives the first information in the determined subframe for the enhanced transmission of the first information.

It should be noted that, when the user equipment receives the first information in the determined subframe for the enhanced transmission of the first information, according to different types of the first information, specific manners of receiving the first information are different. If the first information is a master information block, the user equipment receives the master information block in at least one radio frame a quantity of times that is greater than one time; if the first information is an SIB including a TDD configuration, the user equipment receives the SIB in at least two consecutive radio frames a quantity of times that is greater than one time; or if the first information is an SIB including an MBSFN subframe configuration, the user equipment receives the SIB in the determined subframe for the enhanced transmission of the first information a quantity of times that is at least two times.

It should be additionally noted that, for the enhanced transmission of the first information provided in this embodiment of the present disclosure, the mentioned quantity of times of the enhanced transmission includes initial transmission of the first information. For example, the enhanced transmission being 1 indicates that the first information is transmitted only one time, that is, there is no additional repeatedly transmitting the first information; and the enhanced transmission being 2 indicates that the first information is transmitted two times, that is, there is additional one time of repeatedly transmitting the first information.

This embodiment of the present disclosure provides an information transmission method, where a subframe for enhanced transmission of first information is determined, where the first information is a master information block, or the first information is an SIB including a TDD configuration, or the first information is an SIB including an MBSFN subframe configuration, and the first information is received in the determined subframe for the enhanced transmission of the first information. According to the solution, the subframe used in the enhanced transmission of the first information can be determined, improving transmission reliability of the first information.

Embodiment 19

Figure 23:
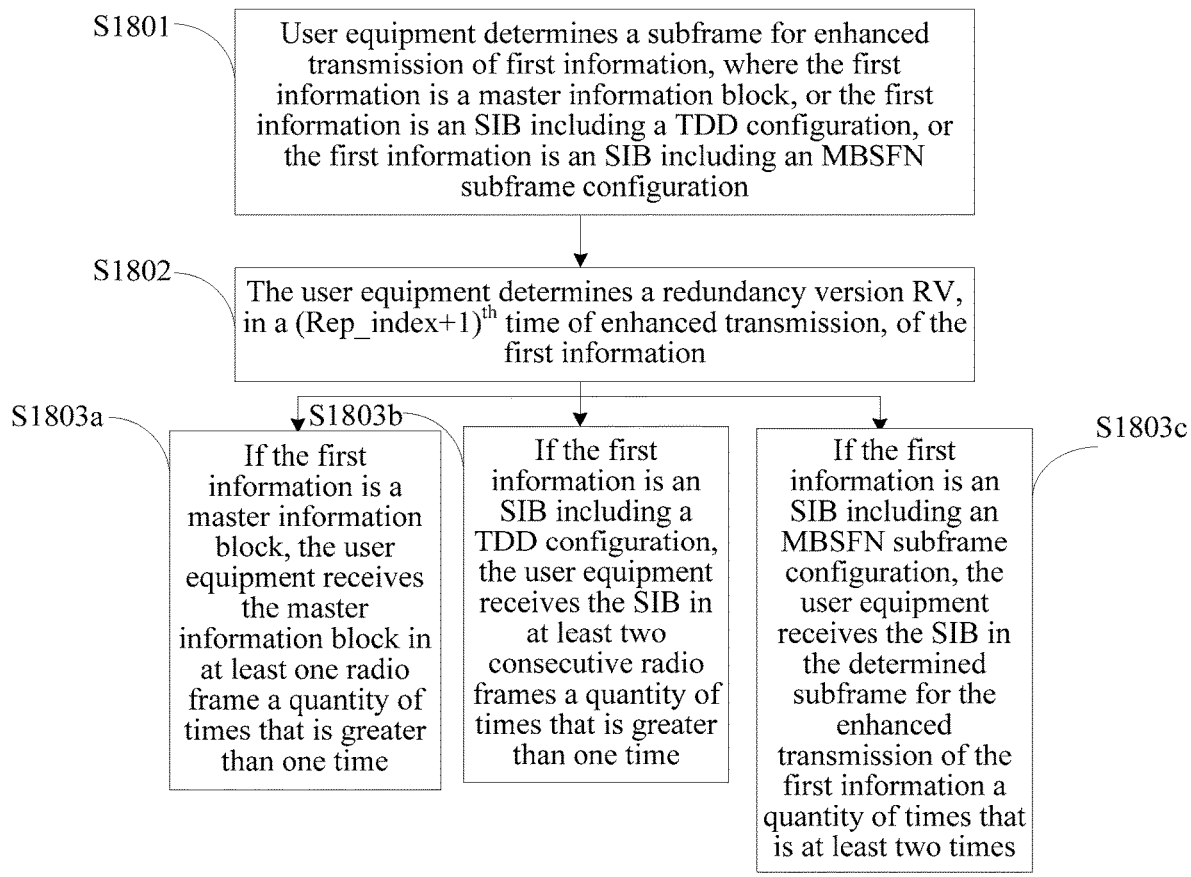
FIG. 23 is a schematic flowchart of an information transmission method according to Embodiment 19 of the present disclosure.

This embodiment of the present disclosure provides an information transmission method. As shown in FIG. 23, the method includes:

S1801: User equipment determines a subframe for enhanced transmission of first information, where the first information is a master information block, or the first information is an SIB including a TDD configuration, or the first information is an SIB including an MBSFN subframe configuration.

This embodiment of the present disclosure provides an information transmission method, which can determine a subframe used in enhanced transmission of first information, improving transmission reliability of the first information.

First, the user equipment determines the subframe for the enhanced transmission of the first information. The first information is a master information block, or the first information is an SIB including a TDD configuration, or the first information is an SIB including an MBSFN subframe configuration.

It should be noted that, the SIB including the TDD configuration is not limited to only the SIB 1, and may also be another SIB x including the TDD configuration; similarly, the SIB including the MBSFN subframe configuration is not limited to only the SIB 2, either, and may also be another SIB y including the TDD configuration, where x and y both are positive integers. Generally, a value of x of the SIB x including the TDD configuration is not equal to a value of y of the SIB y including the MBSFN subframe configuration, but particularly, the value of x may also be equal to the value of y, which is not limited in the present disclosure.

It should be further noted that, the subframe for the enhanced transmission of the first information includes any one of or a combination of the following:

the subframe for the enhanced transmission of the first information is a subframe in an enhanced transmission opportunity of the first information or a subframe in an enhanced transmission bundle of the first information;

the subframe for the enhanced transmission of the first information is a subframe in at least one radio frame; and the subframe for the enhanced transmission of the first information is a subframe in at least one system information window.

Particularly, for an FDD system or a Half FDD system, the subframe for the enhanced transmission of the first information includes one or more of a subframe 0, a subframe 4, a subframe 5, and a subframe 9; and for a TDD system, the subframe for the enhanced transmission of the first information includes the subframe 0 and/or the subframe 5.

Further, for the TDD system, if the first information is an SIB including an MBSFN subframe configuration and a subframe 6 is not a special subframe, the subframe for the enhanced transmission of the first information further includes the subframe 6.

In an existing LTE or LTE-A system, time-domain resources are divided as radio frames, and the radio frames are numbered 0 to 1023. One radio frame includes 10 subframes, a time length of one subframe is 1 ms, and subframes in each radio frame are numbered 0 to 9.

For the FDD system or the Half FDD system, it can be determined that the subframe 0, the subframe 4, the subframe 5, and the subframe 9 are surely not MBSFN subframes; therefore, the subframe for the enhanced transmission of the first information is surely one or more of the subframe 0, the subframe 4, the subframe 5, and the subframe 9. For the TDD system, the subframe 0, the subframe 1, the subframe 5, and the subframe 6 are surely not MBSFN subframes, but the subframe 1 is surely a special subframe and the subframe 6 may be a special subframe; therefore, the subframe for the enhanced transmission of the first information is surely the subframe 0 and/or the subframe 5 and may further include the subframe 6.

Exemplarily, for the TDD system, if the subframe 0, the subframe 1, a subframe 2, and the subframe 6 are subframes in uplink and downlink configurations of the TDD system, the subframe 6 is also a special subframe. Therefore, the subframe for the enhanced transmission of the first information can only be the subframe 0 and/or the subframe 5. If a subframe 3, the subframe 4, and the subframe 5 are subframes in uplink and downlink configurations of the TDD system, and the subframe 6 is a subframe in only the downlink configuration of the TDD system, the subframe 6 is not a special subframe. Therefore, the subframe for the enhanced transmission of the first information may be one or more of the subframe 0, the subframe 5, and the subframe 6.

The subframe 0 is a subframe 0 in each radio frame in at least one radio frame, or a subframe 0 in each even-numbered radio frame in at least one even-numbered radio frame, or a subframe 0 in each odd-numbered radio frame in at least one odd-numbered radio frame;

the subframe 4 is a subframe 4 in each radio frame in at least one radio frame, or a subframe 4 in each even-numbered radio frame in at least one even-numbered radio frame, or a subframe 4 in each odd-numbered radio frame in at least one odd-numbered radio frame;

the subframe 5 is a subframe 5 in each radio frame in at least one radio frame, or a subframe 5 in each even-numbered radio frame in at least one even-numbered radio frame, or a subframe 5 in each odd-numbered radio frame in at least one odd-numbered radio frame;

the subframe 6 is a subframe 6 in each radio frame in at least one radio frame, or a subframe 6 in each even-numbered radio frame in at least one even-numbered radio frame, or a subframe 6 in each odd-numbered radio frame in at least one odd-numbered radio frame; and the subframe 9 is a subframe 9 in each radio frame in at least one radio frame, or a subframe 9 in each even-numbered radio frame in at least one even-numbered radio frame, or a subframe 9 in each odd-numbered radio frame in at least one odd-numbered radio frame.

S1802: The user equipment determines a redundancy version RV, in a (rep_index+1)$^{th}$ time of enhanced transmission, of the first information.

RV index=ceil(3/2*{rep_index mod 4})mod 4, ceil(x) is a round-up function, rep_index is a number of a quantity of times of the enhanced transmission of the first information, and mod is a modulo operation; or the RV is determined in an order of 0, 2, 3, and 1 according to an index of a quantity of times of the enhanced transmission.

After the user equipment determines the subframe for the enhanced transmission of the first information, a redundancy version RV of the first information during the enhanced transmission of the first information varies according to a quantity of times of the enhanced transmission of the first information, so that a format stipulated by the redundancy version RV is used for the first information, and the first information is received in the determined subframe for the enhanced transmission of the first information.

S1803: The user equipment receives the first information in the determined subframe for the enhanced transmission of the first information.

step S1803 of receiving, by the user equipment, the first information in the determined subframe for the enhanced transmission of the first information may include steps S1803a to S1803c:

S1803a: If the first information is a master information block, the user equipment receives the master information block in at least one radio frame a quantity of times that is greater than one time.

S1803b: If the first information is an SIB including a TDD configuration, the user equipment receives the SIB in at least two consecutive radio frames a quantity of times that is greater than one time.

S1803c: If the first information is an SIB including an MBSFN subframe configuration, the user equipment receives the SIB in the determined subframe for the enhanced transmission of the first information a quantity of times that is at least two times.

It should be noted that, to avoid a collision between the enhanced transmission of the first information and enhanced transmission of a paging message and/or a random access response message, when the enhanced transmission of the first information is scheduled based on a control channel, a paging message and/or a random access response message on which additional enhanced transmission is performed is not received in the determined subframe for the enhanced transmission of the first information; and when the enhanced transmission of the first information is not scheduled based on a control channel, on a small-bandwidth carrier, the paging message and/or the random access response message on which the additional enhanced transmission is performed is not received in the determined subframe for the enhanced transmission of the first information, where the small-bandwidth carrier includes at least a carrier of 1.4 MHz and/or a carrier of 3 MHz.

It should be further noted that, according to types of the first information, a priority relationship exists between the enhanced transmission of the first information and enhanced transmission of other information:

if the first information is an SIB including a TDD configuration, the receiving of the first information is after receiving of a master information block, and a preset first time offset exists between the receiving of the first information and the receiving of the master information block; and if the first information is an SIB including an MBSFN subframe configuration, the receiving of the first information is after receiving of an SIB including a TDD configuration, and a preset second time offset exists between the receiving of the first information and the receiving of the SIB including the TDD configuration, where the preset first time offset and the preset second time offset both are constant time offset values, and the preset first time offset may be equal to the preset second time offset, or the preset first time offset may be not equal to the preset second time offset, which is not limited in the present disclosure.

This embodiment of the present disclosure provides an information transmission method, where a subframe for enhanced transmission of first information is determined, where the first information is a master information block, or the first information is an SIB including a TDD configuration, or the first information is an SIB including an MBSFN subframe configuration, and the first information is received in the determined subframe for the enhanced transmission of the first information. According to the solution, the subframe used in the enhanced transmission of the first information can be determined, improving transmission reliability of the first information.

Embodiment 20

Figure 24:
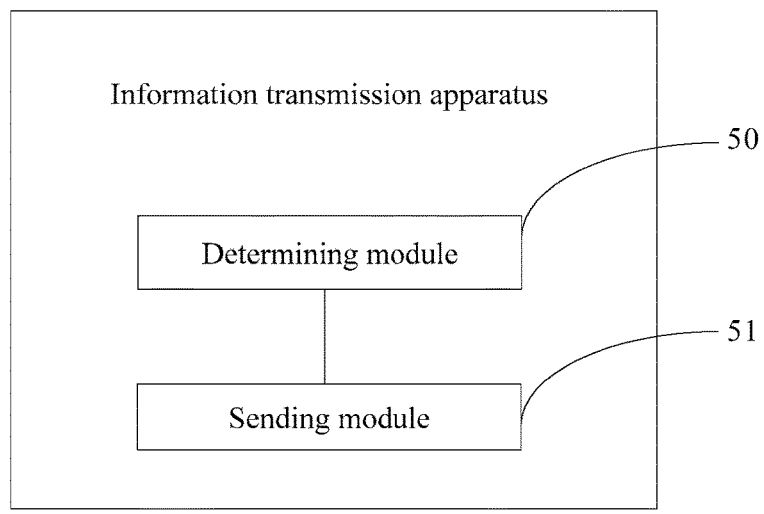
FIG. 24 is a schematic structural diagram of an information transmission apparatus according to Embodiment 20 of the present disclosure.

This embodiment of the present disclosure provides an information transmission apparatus. As shown in FIG. 24, the information transmission apparatus includes a determining module 50 and a sending module 51, where the determining module 50 is configured to determine a subframe for enhanced transmission of first information, where the first information is a master information block, or the first information is a system information block SIB including a time division duplex TDD configuration, or the first information is an SIB including a multicast-broadcast single-frequency network MBSFN subframe configuration; and the sending module 51 is configured to: after the determining module 50 determines the subframe for the enhanced transmission of the first information, perform the enhanced transmission of the first information in the determined subframe for the enhanced transmission of the first information.

Further, the sending module 51 is configured to: if the first information is a master information block, perform the enhanced transmission of the master information block in at least one radio frame a quantity of times that is greater than one time; if the first information is an SIB including a TDD configuration, perform the enhanced transmission of the SIB in at least two consecutive radio frames a quantity of times that is greater than one time; or if the first information is an SIB including an MBSFN subframe configuration, perform the enhanced transmission of the SIB in the determined subframe for the enhanced transmission of the first information a quantity of times that is at least two times.

Further, for a frequency division duplex FDD system or a half frequency division duplex Half FDD system, the subframe for the enhanced transmission of the first information includes one or more of a subframe 0, a subframe 4, a subframe 5, and a subframe 9; and for a TDD system, the subframe for the enhanced transmission of the first information includes the subframe 0 and/or the subframe 5.

Further, for the TDD system, if the first information is an SIB including an MBSFN subframe configuration and a subframe 6 is not a special subframe, the subframe for the enhanced transmission of the first information further includes the subframe 6.

Further, the subframe 0 is a subframe 0 in each radio frame in at least one radio frame, or a subframe 0 in each even-numbered radio frame in at least one even-numbered radio frame, or a subframe 0 in each odd-numbered radio frame in at least one odd-numbered radio frame;

the subframe 4 is a subframe 4 in each radio frame in at least one radio frame, or a subframe 4 in each even-numbered radio frame in at least one even-numbered radio frame, or a subframe 4 in each odd-numbered radio frame in at least one odd-numbered radio frame;

the subframe 5 is a subframe 5 in each radio frame in at least one radio frame, or a subframe 5 in each even-numbered radio frame in at least one even-numbered radio frame, or a subframe 5 in each odd-numbered radio frame in at least one odd-numbered radio frame;

the subframe 6 is a subframe 6 in each radio frame in at least one radio frame, or a subframe 6 in each even-numbered radio frame in at least one even-numbered radio frame, or a subframe 6 in each odd-numbered radio frame in at least one odd-numbered radio frame; and the subframe 9 is a subframe 9 in each radio frame in at least one radio frame, or a subframe 9 in each even-numbered radio frame in at least one even-numbered radio frame, or a subframe 9 in each odd-numbered radio frame in at least one odd-numbered radio frame.

Further, when the enhanced transmission of the first information is scheduled based on a control channel, additional enhanced transmission of a paging message and/or a random access response message is not performed in the determined subframe for the enhanced transmission of the first information; and when the enhanced transmission of the first information is not scheduled based on a control channel, on a small-bandwidth carrier, the additional enhanced transmission of the paging message and/or the random access response message is not performed in the determined subframe for the enhanced transmission of the first information, where the small-bandwidth carrier includes at least a carrier of 1.4 MHz and/or a carrier of 3 MHz.

Further, if the first information is an SIB including a TDD configuration, the enhanced transmission of the first information is after enhanced transmission of a master information block, and a preset first time offset exists between the enhanced transmission of the first information and the enhanced transmission of the master information block; and if the first information is an SIB including an MBSFN subframe configuration, the enhanced transmission of the first information is after enhanced transmission of an SIB including a TDD configuration, and a preset second time offset exists between the enhanced transmission of the first information and the enhanced transmission of the SIB including the TDD configuration, where Further, the determining module 50 is further configured to determine a redundancy version RV, in a $(rep\_index+1)^{th}$ time of enhanced transmission, of the first information, where RV index=ceil(3/2*{rep_index mod 4})mod 4, ceil(x) is a round-up function, rep_index is a number of a quantity of times of the enhanced transmission of the first information, and mod is a modulo operation; or the RV is determined in an order of 0, 2, 3, and 1 according to an index of a quantity of times of the enhanced transmission.

Further, the subframe for the enhanced transmission of the first information includes any one of or a combination of the following:

the subframe for the enhanced transmission of the first information is a subframe in an enhanced transmission opportunity of the first information or a subframe in an enhanced transmission bundle of the first information;

the subframe for the enhanced transmission of the first information is a subframe in at least one radio frame; and the subframe for the enhanced transmission of the first information is a subframe in at least one system information window.

This embodiment of the present disclosure provides an information transmission apparatus, including a determining module and a sending module, where the determining module is configured to determine a subframe for enhanced transmission of first information, where the first information is a master information block, or the first information is a system information block SIB including a time division duplex TDD configuration, or the first information is an SIB including a multicast-broadcast single-frequency network MBSFN subframe configuration; and the sending module is configured to: after the determining module determines the subframe for the enhanced transmission of the first information, perform the enhanced transmission of the first information in the determined subframe for the enhanced transmission of the first information. According to the solution, the subframe used in the enhanced transmission of the first information can be determined, improving transmission reliability of the first information.

Embodiment 21

Figure 25:
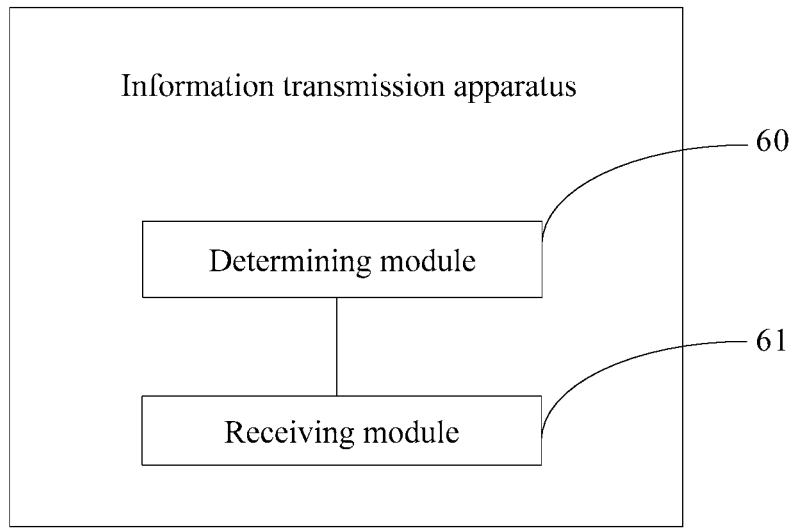
FIG. 25 is a schematic structural diagram of an information transmission apparatus according to Embodiment 21 of the present disclosure.

This embodiment of the present disclosure provides another information transmission apparatus. As shown in FIG. 25, the information transmission apparatus includes a determining module 60 and a receiving module 61, where the determining module 60 is configured to determine a subframe for enhanced transmission of first information, where the first information is a master information block, or the first information is an SIB including a TDD configuration, or the first information is an SIB including an MBSFN subframe configuration; and the receiving module 61 is configured to: after the determining module 60 determines the subframe for the enhanced transmission of the first information, receive the first information in the determined subframe for the enhanced transmission of the first information.

Further, the receiving module 61 is configured to: if the first information is a master information block, receive the master information block in at least one radio frame a quantity of times that is greater than one time; if the first information is an SIB including a TDD configuration, receive the SIB in at least two consecutive radio frames a quantity of times that is greater than one time; or if the first information is an SIB including an MBSFN subframe configuration, receive the SIB in the determined subframe for the enhanced transmission of the first information a quantity of times that is at least two times.

Further, for an FDD system or a Half FDD system, the subframe for the enhanced transmission of the first information includes one or more of a subframe 0, a subframe 4, a subframe 5, and a subframe 9; and for a TDD system, the subframe for the enhanced transmission of the first information includes the subframe 0 and/or the subframe 5.

Further, for the TDD system, if the first information is an SIB including an MBSFN subframe configuration and a subframe 6 is not a special subframe, the subframe for the enhanced transmission of the first information further includes the subframe 6.

Further, the subframe 0 is a subframe 0 in each radio frame in at least one radio frame, or a subframe 0 in each even-numbered radio frame in at least one even-numbered radio frame, or a subframe 0 in each odd-numbered radio frame in at least one odd-numbered radio frame;

the subframe 4 is a subframe 4 in each radio frame in at least one radio frame, or a subframe 4 in each even-numbered radio frame in at least one even-numbered radio frame, or a subframe 4 in each odd-numbered radio frame in at least one odd-numbered radio frame;

the subframe 5 is a subframe 5 in each radio frame in at least one radio frame, or a subframe 5 in each even-numbered radio frame in at least one even-numbered radio frame, or a subframe 5 in each odd-numbered radio frame in at least one odd-numbered radio frame;

the subframe 6 is a subframe 6 in each radio frame in at least one radio frame, or a subframe 6 in each even-numbered radio frame in at least one even-numbered radio frame, or a subframe 6 in each odd-numbered radio frame in at least one odd-numbered radio frame; and the subframe 9 is a subframe 9 in each radio frame in at least one radio frame, or a subframe 9 in each even-numbered radio frame in at least one even-numbered radio frame, or a subframe 9 in each odd-numbered radio frame in at least one odd-numbered radio frame.

Further, when the enhanced transmission of the first information is scheduled based on a control channel, a paging message and/or a random access response message on which additional enhanced transmission is performed is not received in the determined subframe for the enhanced transmission of the first information; and when the enhanced transmission of the first information is not scheduled based on a control channel, on a small-bandwidth carrier, the paging message and/or the random access response message on which the additional enhanced transmission is performed is not received in the determined subframe for the enhanced transmission of the first information, where the small-bandwidth carrier includes at least a carrier of 1.4 MHz and/or a carrier of 3 MHz.

Further, if the first information is an SIB including a TDD configuration, the receiving of the first information is after receiving of a master information block, and a preset first time offset exists between the receiving of the first information and the receiving of the master information block; and if the first information is an SIB including an MBSFN subframe configuration, the receiving of the first information is after receiving of an SIB including a TDD configuration, and a preset second time offset exists between the receiving of the first information and the receiving of the SIB including the TDD configuration.

Further, the determining module 60 is further configured to determine a redundancy version RV, in a $(rep\_index+1)^{th}$ time of enhanced transmission, of the first information, where RV index=ceil(3/2*{rep_index mod 4})mod 4, ceil(x) is a round-up function, rep_index is a number of a quantity of times of the enhanced transmission of the first information, and mod is a modulo operation; or the RV is determined in an order of 0, 2, 3, and 1 according to an index of a quantity of times of the enhanced transmission.

Further, the subframe for the enhanced transmission of the first information includes any one of or a combination of the following:

the subframe for the enhanced transmission of the first information is a subframe in an enhanced transmission opportunity of the first information or a subframe in an enhanced transmission bundle of the first information;

the subframe for the enhanced transmission of the first information is a subframe in at least one radio frame; and the subframe for the enhanced transmission of the first information is a subframe in at least one system information window.

This embodiment of the present disclosure provides an information transmission apparatus, including a determining module and a receiving module, where the determining module is configured to determine a subframe for enhanced transmission of first information, where the first information is a master information block, or the first information is an SIB including a TDD configuration, or the first information is an SIB including an MBSFN subframe configuration; and the receiving module is configured to: after the determining module determines the subframe for the enhanced transmission of the first information, receive the first information in the determined subframe for the enhanced transmission of the first information. According to the solution, the subframe used in the enhanced transmission of the first information can be determined, improving transmission reliability of the first information.

Embodiment 22

Figure 26:
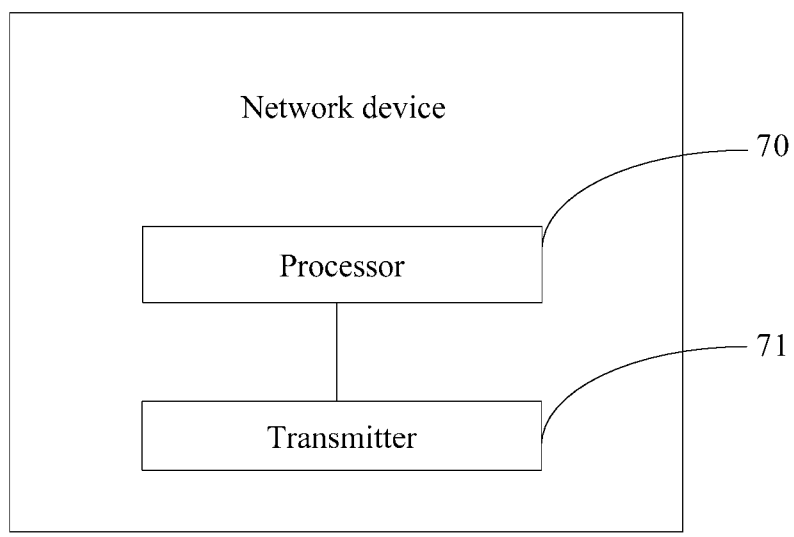
FIG. 26 is a schematic structural diagram of a network device according to Embodiment 22 of the present disclosure.

This embodiment of the present disclosure provides a network device. As shown in FIG. 26, the network device includes a processor 70 and a transmitter 71, where the processor 70 is configured to determine a subframe for enhanced transmission of first information, where the first information is a master information block, or the first information is a system information block SIB including a time division duplex TDD configuration, or the first information is an SIB including a multicast-broadcast single-frequency network MBSFN subframe configuration; and the transmitter 71 is configured to: after the processor 70 determines the subframe for the enhanced transmission of the first information, perform the enhanced transmission of the first information in the determined subframe for the enhanced transmission of the first information.

Further, the transmitter 71 is configured to: if the first information is a master information block, perform the enhanced transmission of the master information block in at least one radio frame a quantity of times that is greater than one time; if the first information is an SIB including a TDD configuration, perform the enhanced transmission of the SIB in at least two consecutive radio frames a quantity of times that is greater than one time; or if the first information is an SIB including an MBSFN subframe configuration, perform the enhanced transmission of the SIB in the determined subframe for the enhanced transmission of the first information a quantity of times that is at least two times.

Further, for an FDD system or a Half FDD system, the subframe for the enhanced transmission of the first information includes one or more of a subframe 0, a subframe 4, a subframe 5, and a subframe 9; and for a TDD system, the subframe for the enhanced transmission of the first information includes the subframe 0 and/or the subframe 5.

Further, for the TDD system, if the first information is an SIB including an MBSFN subframe configuration and a subframe 6 is not a special subframe, the subframe for the enhanced transmission of the first information further includes the subframe 6.

Further, the subframe 0 is a subframe 0 in each radio frame in at least one radio frame, or a subframe 0 in each even-numbered radio frame in at least one even-numbered radio frame, or a subframe 0 in each odd-numbered radio frame in at least one odd-numbered radio frame;

the subframe 4 is a subframe 4 in each radio frame in at least one radio frame, or a subframe 4 in each even-numbered radio frame in at least one even-numbered radio frame, or a subframe 4 in each odd-numbered radio frame in at least one odd-numbered radio frame;

the subframe 5 is a subframe 5 in each radio frame in at least one radio frame, or a subframe 5 in each even-numbered radio frame in at least one even-numbered radio frame, or a subframe 5 in each odd-numbered radio frame in at least one odd-numbered radio frame;

the subframe 6 is a subframe 6 in each radio frame in at least one radio frame, or a subframe 6 in each even-numbered radio frame in at least one even-numbered radio frame, or a subframe 6 in each odd-numbered radio frame in at least one odd-numbered radio frame; and the subframe 9 is a subframe 9 in each radio frame in at least one radio frame, or a subframe 9 in each even-numbered radio frame in at least one even-numbered radio frame, or a subframe 9 in each odd-numbered radio frame in at least one odd-numbered radio frame.

Further, when the enhanced transmission of the first information is scheduled based on a control channel, additional enhanced transmission of a paging message and/or a random access response message is not performed in the determined subframe for the enhanced transmission of the first information; and when the enhanced transmission of the first information is not scheduled based on a control channel, on a small-bandwidth carrier, the additional enhanced transmission of the paging message and/or the random access response message is not performed in the determined subframe for the enhanced transmission of the first information, where the small-bandwidth carrier includes at least a carrier of 1.4 MHz and/or a carrier of 3 MHz.

Further, if the first information is an SIB including a TDD configuration, the enhanced transmission of the first information is after enhanced transmission of a master information block, and a preset first time offset exists between the enhanced transmission of the first information and the enhanced transmission of the master information block; and if the first information is an SIB including an MBSFN subframe configuration, the enhanced transmission of the first information is after enhanced transmission of an SIB including a TDD configuration, and a preset second time offset exists between the enhanced transmission of the first information and the enhanced transmission of the SIB including the TDD configuration.

Further, the processor 70 is further configured to determine a redundancy version RV, in a (rep_index+1)$^{th}$ time of enhanced transmission, of the first information, where RV index=ceil(3/2*{rep_index mod 4})mod 4, ceil(x) is a round-up function, rep_index is a number of a quantity of times of the enhanced transmission of the first information, and mod is a modulo operation; or the RV is determined in an order of 0, 2, 3, and 1 according to an index of a quantity of times of the enhanced transmission.

Further, the subframe for the enhanced transmission of the first information includes any one of or a combination of the following:

the subframe for the enhanced transmission of the first information is a subframe in an enhanced transmission opportunity of the first information or a subframe in an enhanced transmission bundle of the first information;

the subframe for the enhanced transmission of the first information is a subframe in at least one radio frame; and the subframe for the enhanced transmission of the first information is a subframe in at least one system information window.

This embodiment of the present disclosure provides a network device, including a processor and a transmitter, where the processor is configured to determine a subframe for enhanced transmission of first information, where the first information is a master information block, or the first information is a system information block SIB including a time division duplex TDD configuration, or the first information is an SIB including a multicast-broadcast single-frequency network MBSFN subframe configuration; and the transmitter is configured to: after the processor determines the subframe for the enhanced transmission of the first information, perform the enhanced transmission of the first information in the determined subframe for the enhanced transmission of the first information. According to the solution, the subframe used in the enhanced transmission of the first information can be determined, improving transmission reliability of the first information.

Embodiment 23

Figure 27:
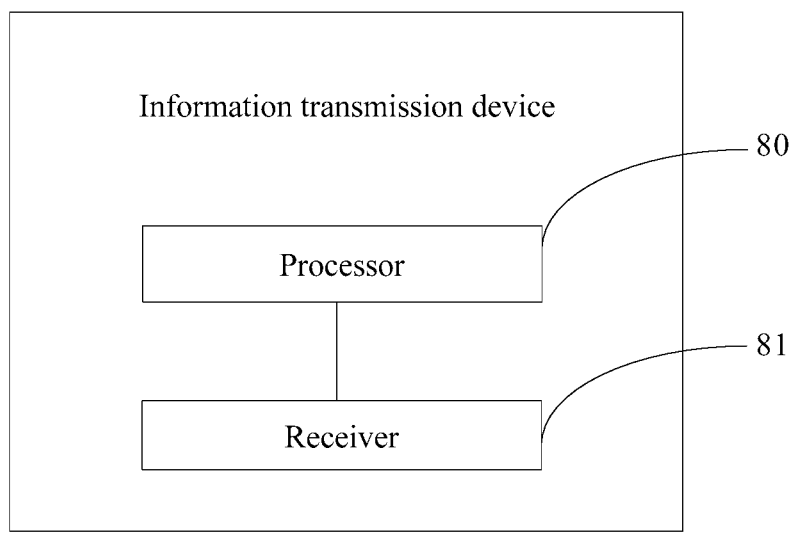
FIG. 27 is a schematic structural diagram of an information transmission device according to Embodiment 23 of the present disclosure.

This embodiment of the present disclosure provides an information transmission device. As shown in FIG. 27, the information transmission device includes a processor 80 and a receiver 81, where the processor 80 is configured to determine a subframe for enhanced transmission of first information, where the first information is a master information block, or the first information is an SIB including a TDD configuration, or the first information is an SIB including an MBSFN subframe configuration; and the receiver 81 is configured to: after the processor 80 determines the subframe for the enhanced transmission of the first information, receive the first information in the determined subframe for the enhanced transmission of the first information.

Further, the receiver 81 is configured to: if the first information is a master information block, receive the master information block in at least one radio frame a quantity of times that is greater than one time; if the first information is an SIB including a TDD configuration, receive the SIB in at least two consecutive radio frames a quantity of times that is greater than one time; or if the first information is an SIB including an MBSFN subframe configuration, receive the SIB in the determined subframe for the enhanced transmission of the first information a quantity of times that is at least two times.

Further, for an FDD system or a Half FDD system, the subframe for the enhanced transmission of the first information includes one or more of a subframe 0, a subframe 4, a subframe 5, and a subframe 9; and for a TDD system, the subframe for the enhanced transmission of the first information includes the subframe 0 and/or the subframe 5.

Further, for the TDD system, if the first information is an SIB including an MBSFN subframe configuration and a subframe 6 is not a special subframe, the subframe for the enhanced transmission of the first information further includes the subframe 6.

Further, the subframe 0 is a subframe 0 in each radio frame in at least one radio frame, or a subframe 0 in each even-numbered radio frame in at least one even-numbered radio frame, or a subframe 0 in each odd-numbered radio frame in at least one odd-numbered radio frame;

the subframe 4 is a subframe 4 in each radio frame in at least one radio frame, or a subframe 4 in each even-numbered radio frame in at least one even-numbered radio frame, or a subframe 4 in each odd-numbered radio frame in at least one odd-numbered radio frame;

the subframe 5 is a subframe 5 in each radio frame in at least one radio frame, or a subframe 5 in each even-numbered radio frame in at least one even-numbered radio frame, or a subframe 5 in each odd-numbered radio frame in at least one odd-numbered radio frame;

the subframe 6 is a subframe 6 in each radio frame in at least one radio frame, or a subframe 6 in each even-numbered radio frame in at least one even-numbered radio frame, or a subframe 6 in each odd-numbered radio frame in at least one odd-numbered radio frame; and the subframe 9 is a subframe 9 in each radio frame in at least one radio frame, or a subframe 9 in each even-numbered radio frame in at least one even-numbered radio frame, or a subframe 9 in each odd-numbered radio frame in at least one odd-numbered radio frame.

Further, when the enhanced transmission of the first information is scheduled based on a control channel, a paging message and/or a random access response message on which additional enhanced transmission is performed is not received in the determined subframe for the enhanced transmission of the first information; and when the enhanced transmission of the first information is not scheduled based on a control channel, on a small-bandwidth carrier, the paging message and/or the random access response message on which the additional enhanced transmission is performed is not received in the determined subframe for the enhanced transmission of the first information, where the small-bandwidth carrier includes at least a carrier of 1.4 MHz and/or a carrier of 3 MHz.

Further, if the first information is an SIB including a TDD configuration, the receiving of the first information is after receiving of a master information block, and a preset first time offset exists between the receiving of the first information and the receiving of the master information block; and if the first information is an SIB including an MBSFN subframe configuration, the receiving of the first information is after receiving of an SIB including a TDD configuration, and a preset second time offset exists between the receiving of the first information and the receiving of the SIB including the TDD configuration.

Further, the processor 80 is further configured to determine a redundancy version RV, in a (rep_index+1)$^{th}$ time of enhanced transmission, of the first information, where RV index=ceil(3/2*{rep_index mod 4})mod 4, ceil(x) is a round-up function, rep_index is a number of a quantity of times of the enhanced transmission of the first information, and mod is a modulo operation; or the RV is determined in an order of 0, 2, 3, and 1 according to an index of a quantity of times of the enhanced transmission.

Further, the subframe for the enhanced transmission of the first information includes any one of or a combination of the following:

the subframe for the enhanced transmission of the first information is a subframe in an enhanced transmission opportunity of the first information or a subframe in an enhanced transmission bundle of the first information;

the subframe for the enhanced transmission of the first information is a subframe in at least one radio frame; and the subframe for the enhanced transmission of the first information is a subframe in at least one system information window.

This embodiment of the present disclosure provides an information transmission device, including a processor and a receiver, where the processor is configured to determine a subframe for enhanced transmission of first information, where the first information is a master information block, or the first information is an SIB including a TDD configuration, or the first information is an SIB including an MBSFN subframe configuration; and the receiver is configured to: after the processor determines the subframe for the enhanced transmission of the first information, receive the first information in the determined subframe for the enhanced transmission of the first information. According to the solution, the subframe used in the enhanced transmission of the first information can be determined, improving transmission reliability of the first information.

Embodiment 24

This embodiment of the present disclosure provides an information transmission system, including the network device having any feature described above and the information transmission device having any feature described above.

The information transmission system provided in this embodiment of the present disclosure includes the network device having any feature described above and the information transmission device having any feature described above. According to the solution, the subframe used in the enhanced transmission of the first information can be determined, improving transmission reliability of the first information.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed apparatus and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An information transmission method comprising:
    transmitting first information multiple times in at least one subframe in at least one radio frame,
        wherein at least one of the transmissions of the first information does not transmit the first information on a resource element of the subframe occupied by an information channel state information reference signal (CSI-RS),
        wherein (a) the first information is a master information block (MIB), and a quantity of times of repeatedly transmitting the MIB in one or more subframes of the at least one radio frame is greater than one, or (b) the first information is a system information block type 1 (SIB 1), and a quantity of times of repeatedly transmitting the SIB 1 in each of the subframes of at least two consecutive radio frames is greater than one, and
    wherein for a frequency division duplex (FDD) system, the subframe for the transmission of the first information is:
        a) a subframe 9; or
        b) a subframe 4 and the subframe 9; or
        c) the subframe 4; or
        d) the subframe 9 and a subframe 0;
    wherein the subframe for the transmission of the first information is determined from an applicable paging subframe for a cell specific paging configuration.

2. The information transmission method according to claim 1, further comprises:
    determining an available CSI-RS configuration according to a preset rule, or setting an available CSI-RS configuration and notifying user equipment of the available CSI-RS configuration by using signaling, wherein the available CSI-RS configuration comprises one or more CSI-RS configurations; and
    determining, according to the available CSI-RS configuration, the resource element occupied by the CSI-RS transmission.

3. A network device comprising:
    a processor; and
    a transmitter configured to transmit first information multiple times at least one subframe in at least one radio frame,
        wherein at least one of the transmissions of the first information does not transmit the first information on a resource element of the subframe occupied by an information channel state information-reference signal (CSI-RS);
        wherein (a) the first information is a master information block (MIB), and a quantity of times of repeatedly transmitting the MIB in one or more subframes of the at least one radio frame is greater than one or (b) the first information is a system information block type 1 (SIB 1), and a quantity of times of repeatedly transmitting the SIB 1 in subframes of each of the at least two consecutive radio frames is greater than one;
    wherein for a frequency division duplex (FDD) system, the subframe for the transmission of the first information is
        a) a subframe 9, or
        b) a subframe 4 and the subframe 9, or
        c) a subframe 4, or
        d) the subframe 9 and a subframe 0;
    wherein the subframe for the transmission of the first information is determined from an applicable paging subframe for a cell specific paging configuration.

4. The network device according to claim 3, further comprising:
    the processor is configured to determine an available CSI-RS configuration according to a preset rule, or set an available CSI-RS configuration, wherein the available CSI-RS configuration comprises one or more CSI-RS configurations; determine, according to the available CSI-RS configuration, the resource element occupied by the CSI-RS transmission;

the transmitter is further configured to notify user equipment of the available CSI-RS configuration by using signaling.

5. The network device according to claim 3, wherein the signaling comprises:
an MIB, a system information block (SIB), radio resource control (RRC) common signaling, RRC dedicated signaling, media access control (MAC) signaling, or physical layer signaling.

6. An information transmission device comprising:
a receiver configured to receive first information in at least one subframe, where the transmission is transmitted multiple times;
a processor;
wherein at least one of the transmissions of the first information does not transmit the first information on a resource element of the subframe occupied by an information channel state information-reference signal (CSI-RS);
wherein (a) the first information is a master information block (MIB), and a quantity of times of receiving the repeatedly transmitted MIB in the at least one or more subframes of one radio frame is greater than one, or (b) the first information is a system information block type 1 (SIB 1), and a quantity of times of receiving the repeatedly transmitted SIB 1 in subframes of each of the at least two consecutive radio frames is greater than one;
wherein for a frequency division duplex (FDD) system, the subframe for the transmission of the first information is:
a subframe 9; or
a subframe 4 and the subframe 9; or
the subframe 4; or
the subframe 9 and a subframe 0;
wherein the subframe for the transmission of the first information is determined from an applicable paging subframe for a cell specific paging configuration.

7. The information transmission device according to claim 6, further comprising:
the processor is configured to determine an available CSI-RS configuration according to a preset rule, wherein the available CSI-RS configuration comprises one or more CSI-RS configurations;
the receiver is further configured to receive signaling from a base station, wherein the signaling is used for notifying the available CSI-RS configuration; and
the processor is further configured to determine, according to the available CSI-RS configuration, the resource element occupied by the CSI-RS transmission.

8. The information transmission device according to claim 5, wherein the signaling comprises:
an MIB, a system information block (SIB), radio resource control (RRC) common signaling, RRC dedicated signaling, media access control (MAC) signaling, or physical layer signaling.

9. An information transmission method comprising:
receiving first information multiple times at least one subframe in at least one radio frame wherein at least one of the transmissions of the first information does not transmit the first information on a resource element of the subframe occupied by an information channel state information-reference signal (CSI-RS);
wherein (a) the first information is a master information block (MIB), and a quantity of times of repeatedly transmitting the MIB in one or more subframes of the at least one radio frame is greater than one, or (b) the first information is a system information block type 1 (SIB 1), and a quantity of times of repeatedly transmitting the SIB 1 in subframes of each of the at least two consecutive radio frames is greater than one;
wherein for a frequency division duplex (FDD) system, the subframe for the transmission of the first information is:
a) the subframe 9; or
b) the subframe 9 and a subframe 4; or
c) the subframe 4;
d) the subframe 9 and a subframe 0;
wherein the subframe for the transmission of the first information is determined from an applicable paging subframe for a cell specific paging configuration.

* * * * *